(12) United States Patent
Tripathi et al.

(10) Patent No.: US 11,838,807 B2
(45) Date of Patent: Dec. 5, 2023

(54) SIGNALING AND TRIGGER MECHANISMS FOR HANDOVER

(71) Applicant: Samsung Electronics Co., Ltd., Suwon-si (KR)

(72) Inventors: Nishithkumar D. Tripathi, Parker, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 17/394,277

(22) Filed: Aug. 4, 2021

(65) Prior Publication Data
US 2022/0046490 A1 Feb. 10, 2022

Related U.S. Application Data

(60) Provisional application No. 63/143,997, filed on Feb. 1, 2021, provisional application No. 63/141,088, filed on Jan. 25, 2021, provisional application No. 63/141,066, filed on Jan. 25, 2021, provisional application No. 63/092,106, filed on Oct. 15, 2020, provisional application No. 63/070,624, filed on Aug. 26, 2020, provisional application No. 63/062,884,
(Continued)

(51) Int. Cl.
*H04W 36/00* (2009.01)

(52) U.S. Cl.
CPC ... *H04W 36/0055* (2013.01); *H04W 36/0083* (2013.01)

(58) Field of Classification Search
CPC .............. H04W 36/0055; H04W 36/0083
See application file for complete search history.

(56) References Cited

U.S. PATENT DOCUMENTS

| 10,231,153 | B2 | 3/2019 | Wu et al. |
| 2011/0310844 | A1* | 12/2011 | Rexhepi ............ H04W 36/0066 455/436 |
| 2018/0109994 | A1* | 4/2018 | Lee ...................... H04W 48/12 |

(Continued)

FOREIGN PATENT DOCUMENTS

KR 10-2020-0060501 A 5/2020

OTHER PUBLICATIONS

International Search Report and Written Opinion of the International Searching Authority in connection with International Application No. PCT/KR2021/010453 dated Nov. 5, 2021, 6 pages.
(Continued)

*Primary Examiner* — Barry W Taylor

(57) ABSTRACT

Methods and apparatuses for signaling and trigger mechanisms for handover in a wireless communication system. A method for operating a user equipment (UE) includes receiving system information and information corresponding to different classes for handover signaling; transmitting a capability information including information indicating support of enhanced signaling mechanisms; receiving configuration information including measurement information and handover information based on the capability information; determining completion of handover based on the configuration information; and transmitting a completion of handover indication using a non-Radio Resource Control mechanism based on the completion of handover determination.

17 Claims, 25 Drawing Sheets

Related U.S. Application Data filed on Aug. 7, 2020, provisional application No. 63/062,142, filed on Aug. 6, 2020.

(56) References Cited

U.S. PATENT DOCUMENTS

| | | |
|---|---|---|
| 2019/0182000 A1 | 6/2019 | Futaki |
| 2020/0112909 A1 | 4/2020 | Wang et al. |
| 2020/0260508 A1* | 8/2020 | He .................... H04W 4/70 |
| 2020/0314914 A1* | 10/2020 | Roy .................... H04W 24/10 |
| 2021/0045054 A1* | 2/2021 | Liu .................... H04W 48/20 |
| 2022/0085874 A1* | 3/2022 | Shrestha ............ H04W 48/20 |
| 2022/0312544 A1* | 9/2022 | Ljung ............... H04W 52/0229 |
| 2022/0360381 A1* | 11/2022 | Lei .................... H04L 5/0032 |
| 2022/0408281 A1* | 12/2022 | Zhao ................ H04W 52/0258 |

OTHER PUBLICATIONS

3GPP TR 38.811 V15.3.0 (Jul. 2020); Technical Report; 3rd Generation Partnership Project; Technical Specification Group Radio Access Network; Study on New Radio (NR) to support non-terrestrial networks; (Release 15), Jul. 2020,127 pages.

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"5G; NR; Multiplexing and channel coding (3GPP TS 38.212 version 15.8.0 Release 15)", ETSI TS 138 212 V15.8.0, Jan. 2020, 106 pages.

"5G; NR; Physical channels and modulation (3GPP TS 38.211 version 15.8.0 Release 15)", ETSI TS 138 211 V15.8.0, Jan. 2020, 100 pages.

"5G; NR; Medium Access Control (MAC) protocol specification (3GPP TS 38.321 version 16.2.1 Release 16)", ETSI TS 138 321 V16.2.1, Nov. 2020, 156 pages.

"5G; NR; Radio Resource Control (RRC); Protocol specification (3GPP TS 38.331 version 16.2.0 Release 16)", ETSI TS 138 331 V16.2.0, Nov. 2020, 908 pages.

Extended European Search Report dated Sep. 29, 2023 regarding Application No. 21853283.6, 5 pages.

* cited by examiner

600

Example Triggering and Reporting Quantities: UE Location, RSRP, and Handover Timer

┆

Information Elements or Message Fields

Examples: GEO, LEO with fixed-Earth beams, LEO with moving beams

┆

NTN Type

Information Classification Examples: Cell/Beam-specific, Group-specific, UE-specific Information Transmission Examples: Cell/Beam-broadcast (existing or enhanced), Groupcast/Multicast, Unicast, Multi-User Signaling

┆

Information Classification and Information Transmission

⇒ gNB Signaling Management ⇐

FIG.6

SIGNALING AND TRIGGER MECHANISMS FOR HANDOVER

CROSS-REFERENCE TO RELATED APPLICATIONS AND CLAIM OF PRIORITY

The present application claims priority to U.S. Provisional Patent Application No. 63/062,142, filed on Aug. 6, 2020, U.S. Provisional Patent Application No. 63/062,884, filed on Aug. 7, 2020, U.S. Provisional Patent Application No. 63/070,624, filed on Aug. 26, 2020, U.S. Provisional Patent Application No. 63/092,106, filed on Oct. 15, 2020, U.S. Provisional Patent Application No. 63/141,066, filed on Jan. 25, 2021, U.S. Provisional Patent Application No. 63/141,088, filed on Jan. 25, 2021, and U.S. Provisional Patent Application No. 63/143,997, filed on Feb. 1, 2021. The contents of the above-identified patent documents are incorporated herein by reference.

TECHNICAL FIELD

The present disclosure relates generally to wireless communication systems and, more specifically, the present disclosure relates to signaling and trigger mechanisms for handover.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to signaling and trigger mechanisms for handover. Furthermore, while some elements of the disclosure are useful for both a terrestrial network(TN) and a non-terrestrial network (NTN), certain elements significantly enhance the performance of an NTN.

In one embodiment, a user equipment (UE) is provided. The UE includes a transceiver configured to receive system information and information corresponding to different classes for handover signaling; transmit a capability information including information indicating support of enhanced signaling mechanisms; and receive configuration information including measurement information and handover information based on the capability information. The UE also includes a processor operably connected to the transceiver. The processor is configured to determine completion of handover based on the configuration information. The transceiver is further configured to transmit a completion of handover indication using a non-Radio Resource Control mechanism based on the completion of handover determination.

In another embodiment, a BS is provided. The BS includes a processor configured to: generate system information and information corresponding to different classes for handover signaling; and generate configuration information including measurement information and handover information based on received capability information. The BS also includes a transceiver operably connected to the transceiver. The transceiver is configured to: receive the capability information including information indicating support of enhanced signaling mechanisms; transmit the system information; transmit the configuration information; and receive a completion of handover indication using a non-Radio Resource Control mechanism.

In yet another embodiment, a method for operating a UE is provided. The method includes receiving system information and information corresponding to different classes for handover signaling; transmitting a capability information including information indicating support of enhanced signaling mechanisms; receiving configuration information including measurement information and handover information based on the capability information; determining completion of handover based on the configuration information; and transmitting a completion of handover indication using a non-Radio Resource Control mechanism based on the completion of handover determination.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example of an overall signaling framework for an NTN according to embodiments of the present disclosure;

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP, TR 38.811 v15.2.0, "Study on NR to support non-terrestrial networks"; 3GPP, TR 38.821 v16.0.0, "Solutions for NR to support non-terrestrial networks (NTN)"; 3GPP, TS 38.212 v15.8.0, "5G; NR; Multiplexing and channel coding"; 3GPP, TS 38.211 v15.8.0, "5G; NR; Physical channels and modulation"; 3GPP TS 38.321 v16.2.0, "NR; Medium Access Control (MAC) protocol specification"; and 3GPP TS 38.331 v16.2.0, "NR; Radio Resource Control (RRC) Protocol Specification."

Figure 1:
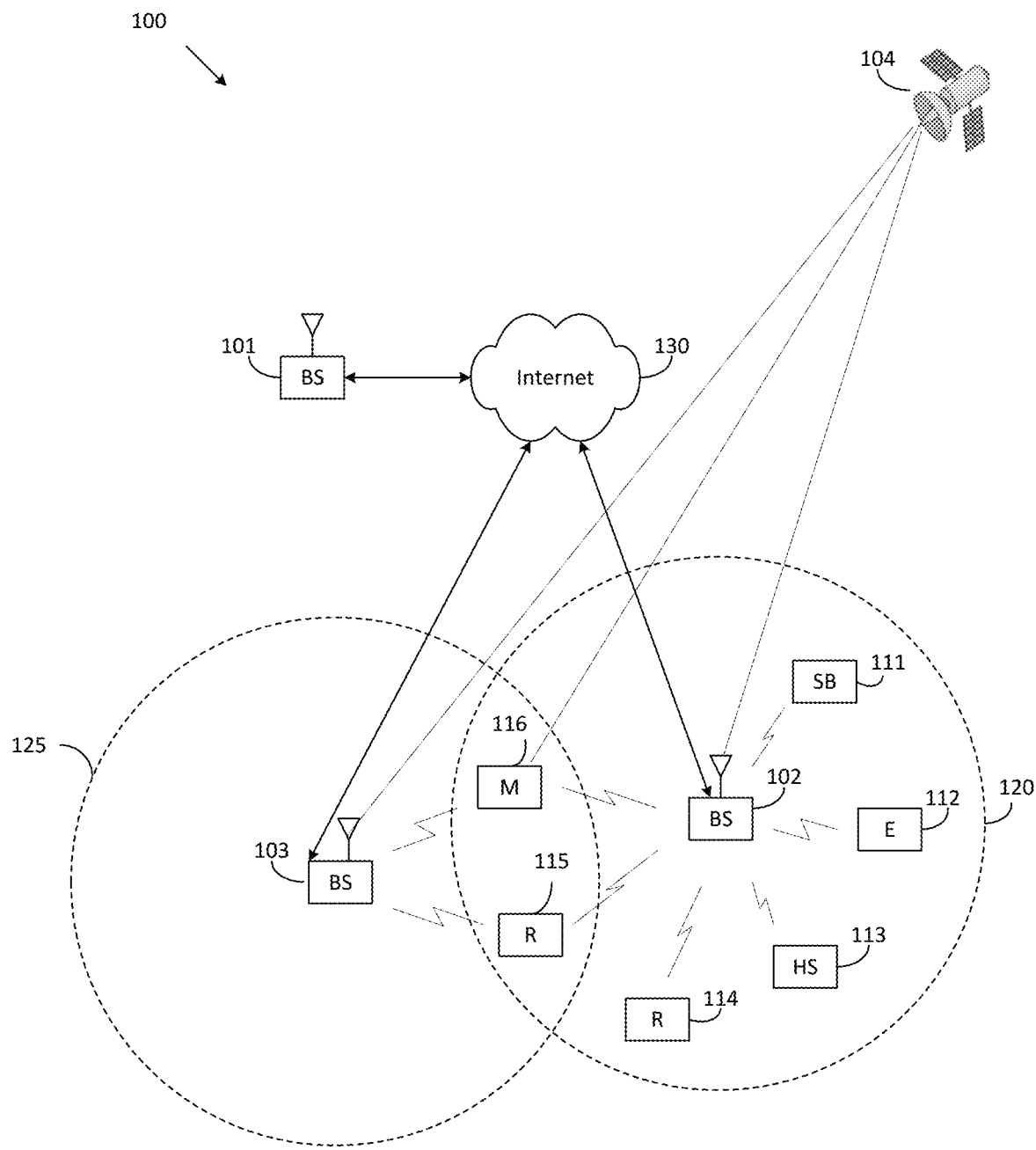
FIG. 1 illustrates an example wireless network according to embodiments of the present disclosure.
Figure 2:
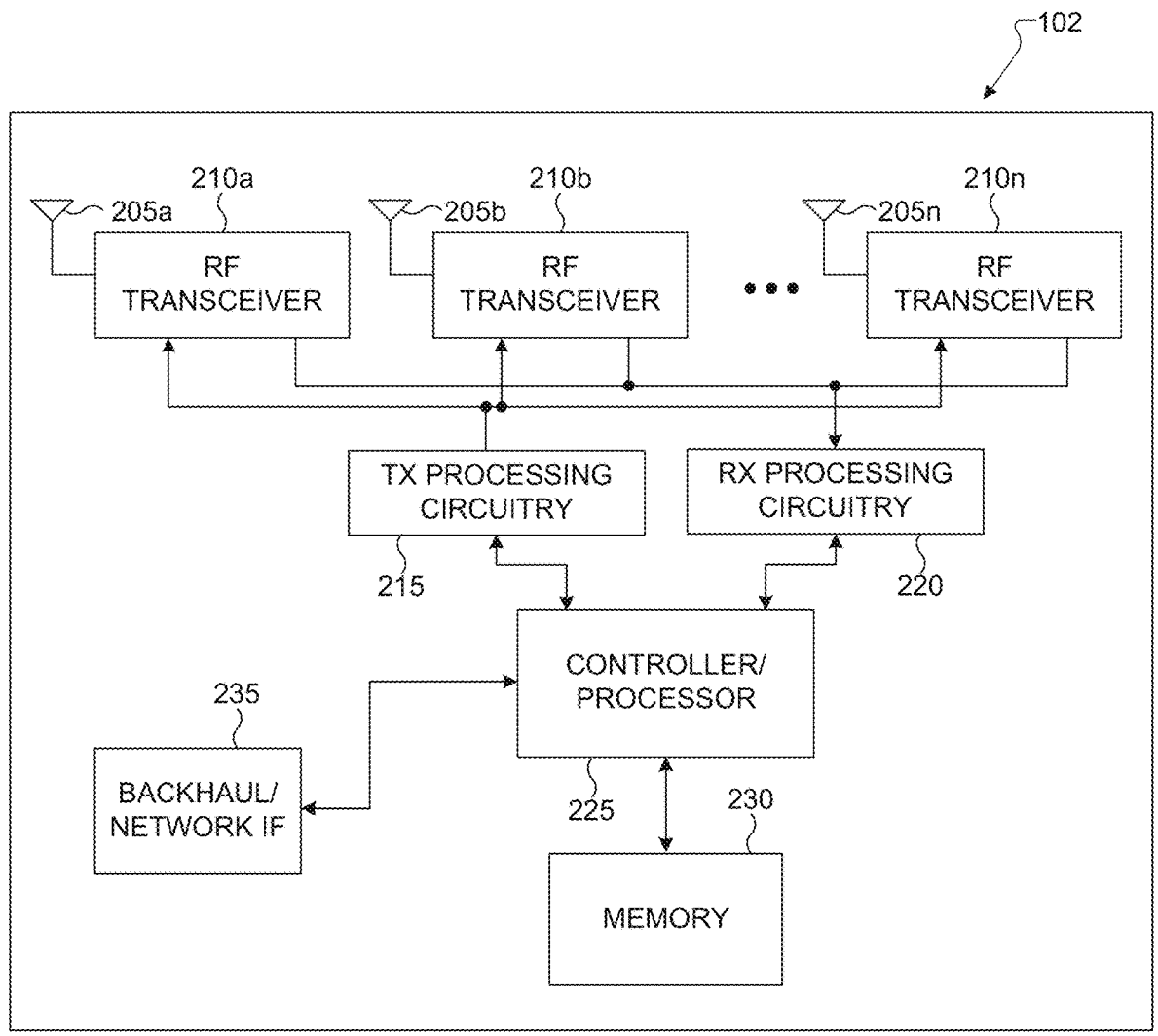
FIG. 2 illustrates an example gNB according to embodiments of the present disclosure.
Figure 3:
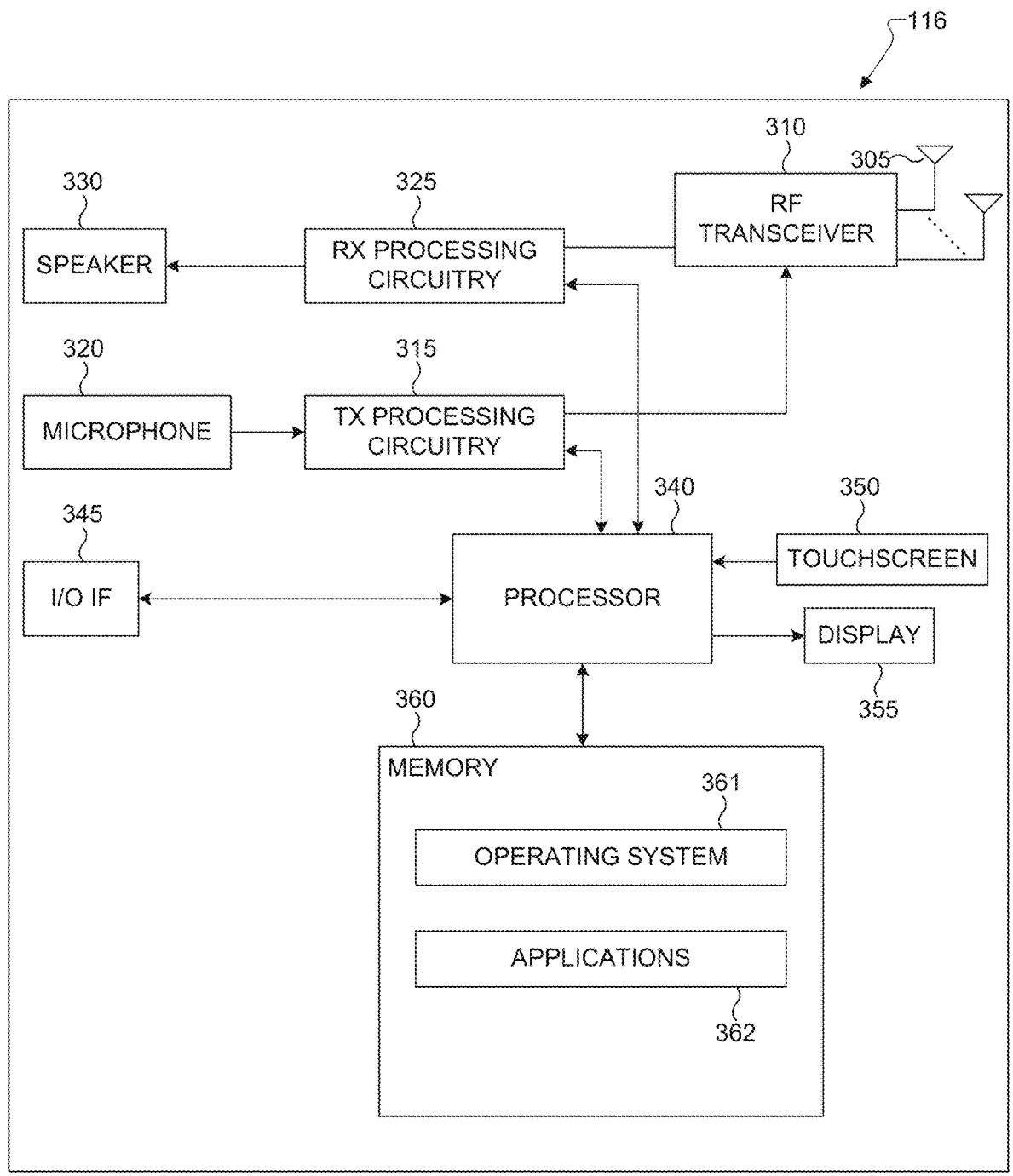
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for receiving system information and information corresponding to different classes for handover signaling; transmitting a capability information including information indicating support of enhanced signaling mechanisms; receiving configuration information including measurement information and handover information based on the capability information; determining completion of handover based on the configuration information; and transmitting a completion of handover indication using a non-Radio Resource Control mechanism based on the completion of handover determination. One or more of the gNB s 101-103 includes circuitry, programing, or a combination thereof, for generating system information and information corresponding to different classes for handover signaling; generating configuration information including measurement information and handover information based on received capability information; receiving the capability information including information indicating support of enhanced signaling mechanisms; transmitting the system information; transmitting the configuration information; and receiving a completion of handover indication using a non-Radio Resource Control mechanism.

As discussed in greater detail below, the wireless network 100 may have communications facilitated via one or more communication satellite(s) 104 that may be in obit over the earth. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving system information and information corresponding to different classes for handover signaling; transmitting a capability information including information indicating support of enhanced signaling mechanisms; receiving configuration information including measurement information and handover information based on the capability information; determining completion of handover based on the configuration information; and transmitting a completion of handover indication using a non-Radio Resource Control mechanism based on the completion of handover determination. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
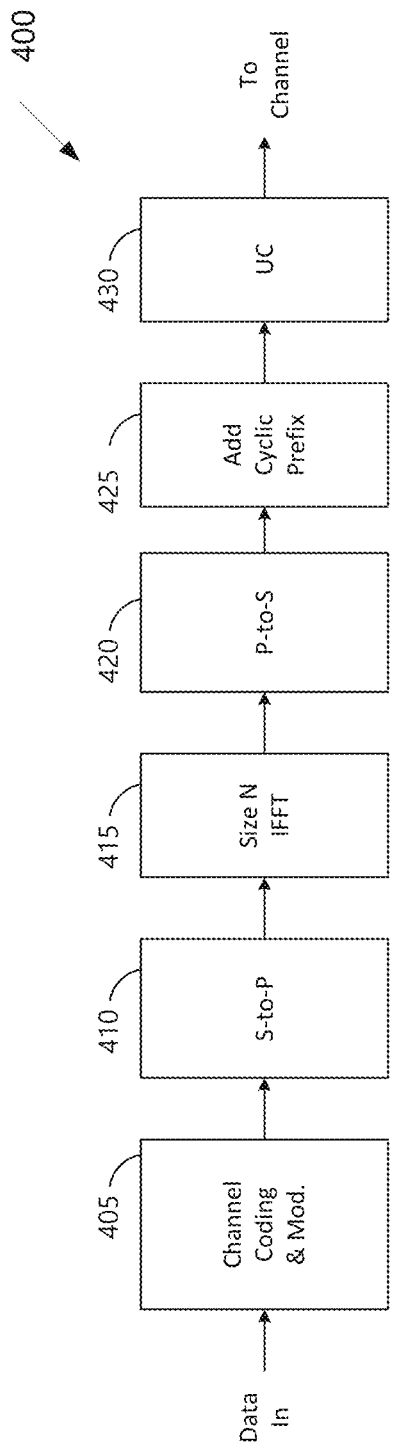
FIGS. 4 and 5 illustrate example wireless transmit and receive paths according to embodiments of the present disclosure.
Figure 5:
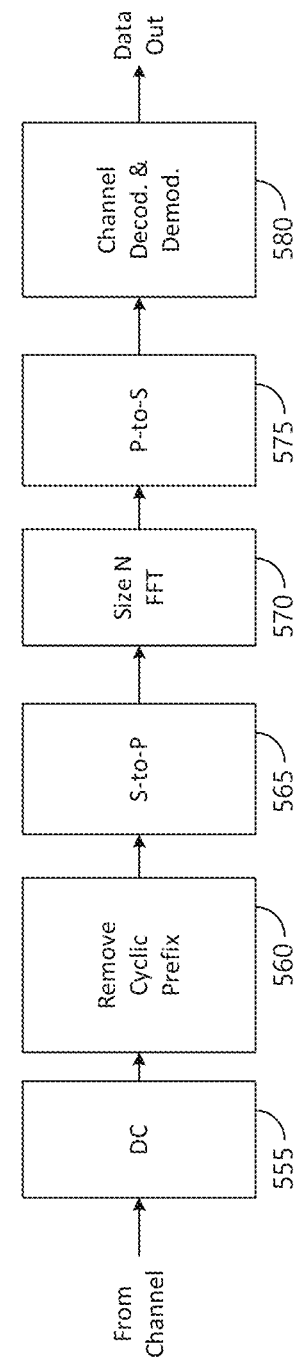

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A non-terrestrial network (NTN) refers to a network, or segment of networks using RF resources on board a communication satellite (or unmanned aircraft system platform) (e.g., communication satellite(s) 104). Considering the capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications, etc.

Hundreds or thousands of UEs may need to be handed over from one cell to another every second based on the cell size, number of UEs per cell, and the NTN type.

Transmissions of unicast and dedicated UE-specific handover signaling messages would consume a significant amount of radio resources in a short time period. This may delay handover signaling messages depending upon the available channel bandwidth, PDCCH capacity, and RRC message sizes. Furthermore, since such dedicated signaling messages are needed for many users within a short time period, the combined signaling load for the handover users will be very high, and fewer radio resources would be left for user traffic. The achievable user throughput and cell throughput will be adversely affected.

While this disclosure focuses on an NTN and introduces enhancements to the signaling mechanisms to significantly reduce the overall handover signaling load, the concepts can also be utilized for a terrestrial network.

FIG. 6 illustrates an example of an overall signaling framework for an NTN 600 according to an embodiment of the present disclosure. The embodiment of the example overall signaling framework for an NTN 600 illustrated in FIG. 6 is for illustration only. FIG. 6 does not limit the scope of this disclosure to any particular implementation of the example overall signaling framework for an NTN 600.

As illustrated in FIG. 6, a gNB receives information regarding message fields or information elements and NTN type, and transmits information regarding information classification and information transmission. For example, the information regarding message fields or information elements may include triggering and reporting quantities such as UE location, RSRP, and handover timer. The NTN type may include GEO, LEO with fixed-earth beams, or LEO with moving beams. The information regarding information classification may include cell/beam specific information, group-specific information, or UE specific information, and the information regarding information transmission may include cell/beam broadcast (existing or enhanced), groupcast/multicast, unicast, or multi-user signaling.

Figure 7:
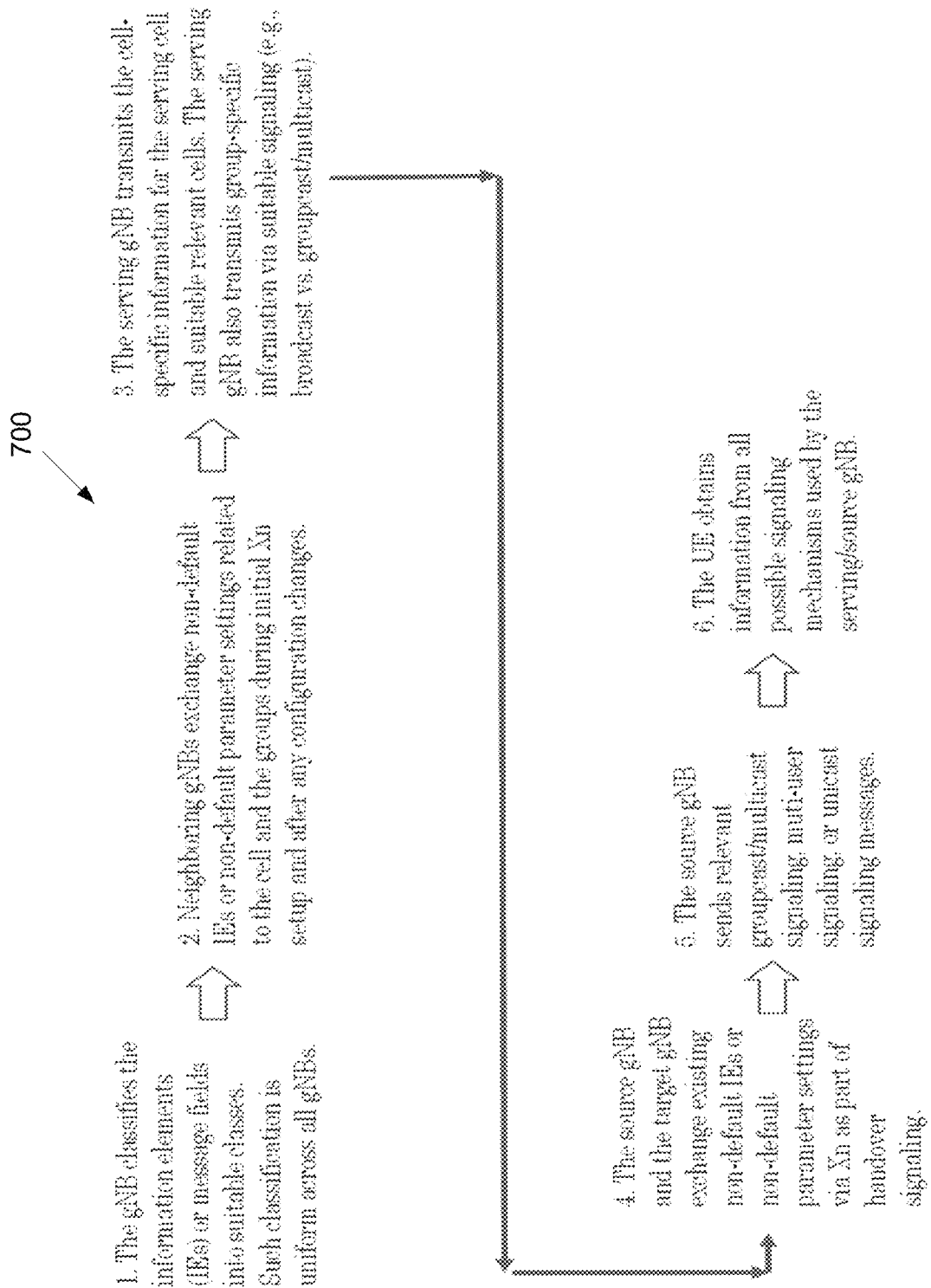
FIG. 7 illustrates an example of an enhanced signaling framework in support of handover in an NTN according to embodiments of the present disclosure.

FIG. 7 illustrates an example of an enhanced signaling framework in support of handover in an NTN 700 according to an embodiment of the present disclosure. The embodiment of the example enhanced signaling framework in support of handover in an NTN 700 illustrated in FIG. 7 is for illustration only. FIG. 7 does not limit the scope of this disclosure to any particular implementation of the example enhanced signaling framework in support of handover in an NTN 700.

As illustrated in FIG. 7, the gNB classifies the information elements (IEs) or message fields into suitable classes. Such classification is uniform across all gNBs. Neighboring gNBs exchange non-default IEs or non-default parameter settings related to the cell and the groups during initial Xn setup and after any configuration changes. The serving gNB transmits the cell-specific information for the serving cell and suitable relevant cells. The serving gNB also transmits group-specific information via suitable signaling (e.g., broadcast vs. groupcast/multicast). The source gNB and the target gNB exchange existing non-default IEs or non-default parameter settings via Xn as part of handover signaling. The source gNB sends relevant groupcast/multicast signaling, multi-user signaling, or unicast signaling messages. The UE obtains information from all possible signaling mechanisms user by the serving/source gNB.

Figure 8:
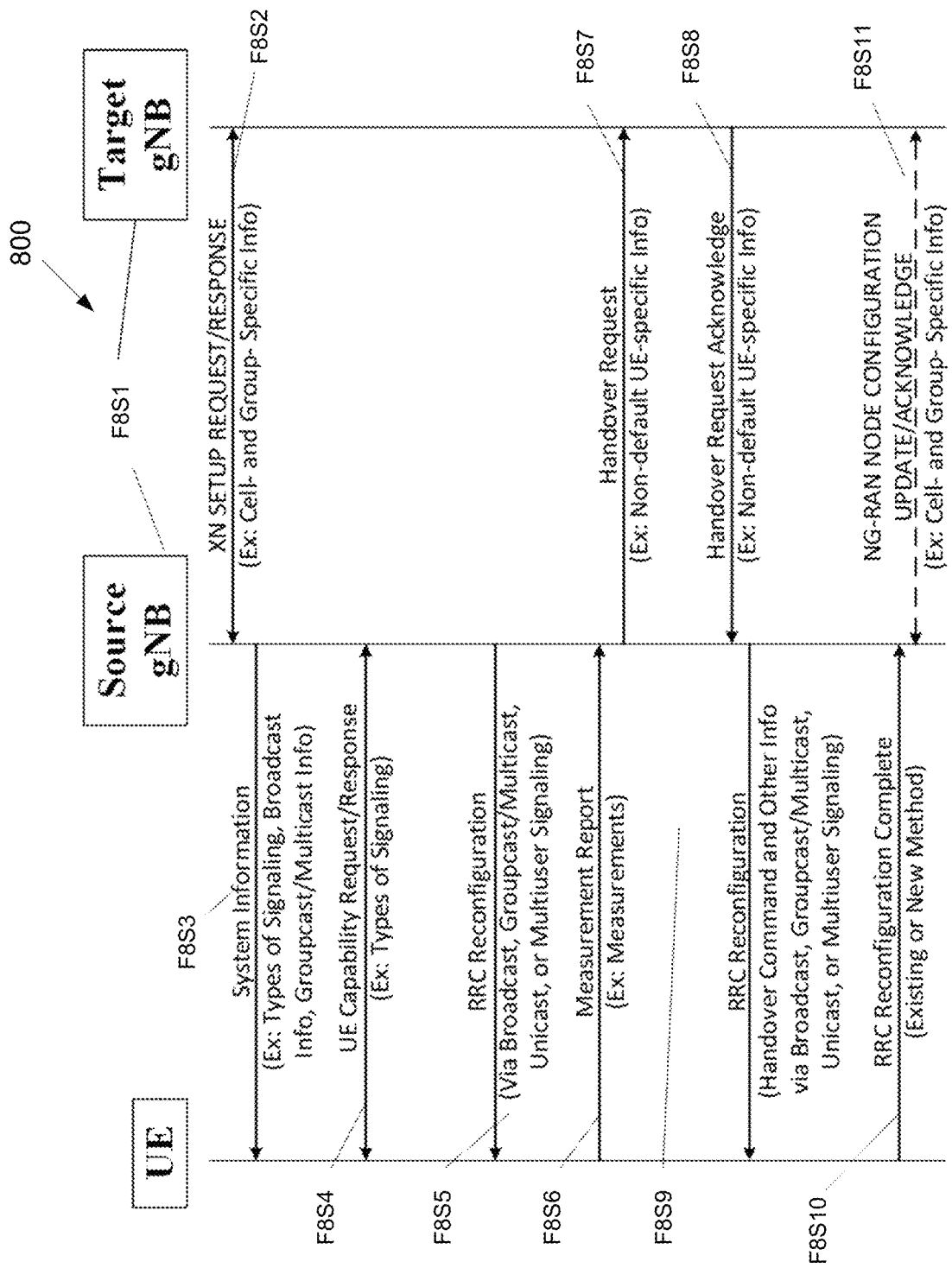
FIG. 8 illustrates a flow diagram showing an example procedure to support enhanced signaling mechanisms according to embodiments of the present disclosure.

FIG. 8 illustrates a flow diagram showing an example procedure to support enhanced signaling mechanisms 800 according to an embodiment of the present disclosure. The embodiment of the example procedure to support enhanced signaling mechanisms 800 illustrated in FIG. 8 is for illustration only. FIG. 8 does not limit the scope of this disclosure to any particular implementation of the example procedure to support enhanced signaling mechanisms 800.

In operation F8S1, the gNBs categorize selected Information Elements (IEs) or message fields of RRC messages into different classes. In an example embodiment, these classes may be cell (or beam), group, or UE. Information that is applicable to all UEs in the cell can be classified into the "cell" class (e.g., System Information). Information that is applicable to all UEs of a group cell can be classified into the "group" class. Information that the radio network intends to keep UE-specific can be classified into the "UE" class (e.g., a dedicated Random Access Preamble allocated to a UE for use in the target cell during handover).

There are several approaches to define types of groups and groups for each group type. In an example embodiment, one type of group can be based on QoS characteristics of QoS Flows in 5G (or EPS bearers in LTE). In an example approach, within this QoS group type, one group may define a message structure containing IEs or parameters required for QoS Flows in support of best-effort QoS (e.g., for Internet access), and another group may define a message structure containing IEs or parameters required for QoS Flows in support of voice/video calls, IMS sessions, and best-effort QoS Flows. In an example embodiment, one group has one MAC/RLC configuration and another group has a different MAC/RLC configuration. A set of common features and default values (e.g., 3 RLC retransmissions or 0 RLC retransmissions) can be defined within a group in an example approach.

In an example embodiment, one type of group can be based on the beam. In an example approach, within this beam group type, one group may define information applicable to one beam of a given cell, while another group may define information applicable to another beam of the same cell.

In an example embodiment, one type of group can be based on the neighbor cells. In an example approach, within this neighbor group type, one group may define information applicable to one neighbor cell, while another group may define information applicable to another neighbor cell.

In an embodiment, one group type may even be defined for the entire cell.

The group types may be independent of each other in one implementation approach. Furthermore, one group type may be a subset of another group in another implementation approach. In yet another implementation approach, two group types may share a set of common parameters. In one more implementation approach, two group types may have identical parameters but with different settings for these parameters.

A UE may be part of one or more groups at a given instant.

In one approach, groups may be created (and removed) dynamically. In another approach, groups may be defined semi-statically by the gNB. In yet another approach, default groups may be defined. In such case, the groups are predefined in the specifications.

In an embodiment of the disclosure, to create compact and efficient messages, new message structures may be defined. These message structures can be utilized in any class of information class (e.g., cell vs. UE) and any type of information transmission (e.g., unicast vs. broadcast). In an example embodiment, default message structures or message components could be defined in the specifications. Some parameters could always be present or optionally/conditionally present in a message structure. Furthermore, default values can be specified for the applicable parameters. To refer to the parameters in the overall message structure, bitmaps can be created in an example implementation, where the first position can refer to Parameter X and the second position can refer to Parameter Y, and so on. Furthermore, the presence of a parameter can be indicated by '1' and the absence of a parameter can be indicated by '0', and vice versa.

In operation F8S2, neighboring gNBs exchange Xn SETUP REQUEST and Xn SETUP RESPONSE messages to inform each other about the support for non-default group types and groups in an example embodiment of the disclosure. In another embodiment, the support for default group types and groups is indicated in an example embodiment of the disclosure. In yet another embodiment, the support for both default and non-default group types and groups is indicated.

In an embodiment of the disclosure, in operation F8S2, default and/or non-default parameter settings are exchanged between two neighboring gNBs.

In operation F8S3, the gNB sends System Information, which may indicate its support for signaling mechanisms in an example approach. In an embodiment, broadcast signaling, enhanced broadcast signaling, or even groupcast/multicast signaling is used to convey selected System Information. The type or subtypes of these signaling may be conveyed through a variety of means including the use of MIB, PBCH DMRS sequence, and SIB1 (or other SIBs).

In this context, broadcast signaling implies the use of traditional SIBs with the traditional configuration such as a window of 160 ms and a certain number of repetitions and a certain periodicity of repetitions. Such broadcast signaling can be extended to SIB-multicast, where a certain RNTI corresponds to a set of UEs (e.g., a group) and the existing SI framework with its constrains (e.g., window lengths and periodicity of repetitions).

Furthermore, in this context, in an embodiment of the disclosure, enhanced broadcast signaling means that one or more enhancements are made to the basic broadcast methodology. Example enhancements include shorter time intervals (e.g., shorter than 80 or 160 ms, typical in LTE and NR) for faster information acquisition, a flexible number of repetitions, and support for TTI bundling for enhanced reliability per gNB configuration. One or more RNTIs may be used for one or different types of enhanced broadcasting. For example, a GM-RNTI (Groupcast/multicast RNTI) may correspond to one group (or group type).

In an embodiment of the disclosure, groupcast/multicast signaling means that a message is intended for a set of UEs and not all UEs in the cell. For example, in one implementation approach, the groupcast/multicast message may be for one group of UEs.

In operation F8S4, the UE and the gNB exchange UECapabilityEnquiry/UECapabilitynformation messages. In one approach, the network can ask the UE if it supports all or a subset of enhanced signaling mechanisms. The UE, on its own or in response to the network's request, can inform the network if it supports all or a subset of enhanced signaling mechanisms.

In operation F8S5, the gNB provides the measurement configuration to the UE using an RRC message such as the RRC Reconfiguration message, which includes details of the triggers for UE's measurement reports and the reporting quantities. In an embodiment of the disclosure, selected contents of such RRC messages are conveyed to the UE using a suitable combination of broadcast signaling (with or without an extension to SIB-multicast), enhanced broadcast signaling (e.g., with shorter SI window), groupcast/multicast signaling (e.g., a group), unicast signaling, and/or a new multi-user signaling.

In an embodiment of the disclosure, unicast signaling includes the IEs that are not covered by other types of signaling methods or that overwrite one or more parameter settings. Furthermore, traditional unicast signaling containing traditional parameters can also be used.

In an embodiment of the disclosure, multi-user signaling message is intended for a set of UEs (and hence it can use a suitable GM-RNTI) and includes some or all of the following components: (i) information applicable to all UEs in the cell, (ii) information common to applicable to a set of UEs (e.g., a group), and (iii) UE-specific information. Suitable UE IDs and supporting information (e.g., # of UEs and lengths of IEs) are included. Suitable security mechanisms are applied (e.g., privacy, integrity protection, and ciphering).

In operation F8S6, the UE sends a Measurement Report when the relevant triggering condition is satisfied. This report contains the reporting quantities.

In operation F8S7 and F8S8, the source gNB and the target gNB exchange Handover Request and Handover Acknowledge messages. In particular, in an embodiment of the disclosure, the source gNB provides the existing RRC configuration of the UE in the source cell (in particular, "non-default" or "not-exchanged-before" group types, groups, and parameter settings). The target gNB now knows what UE-specific parameters must be conveyed to the UE.

The source gNB, in operation F8S9, sends a handover command to the UE in the RRC Reconfiguration message. Again, just like F8S5, a suitable combination of broadcast signaling, SIB-multicast signaling, enhanced broadcast signaling, groupcast/multicast, multi-user signaling, and unicast is used to convey the required In operation F8S10, the UE sends the RRC Reconfiguration Complete message after a successful random access procedure in the target cell. In one embodiment, such message can be sent in the traditional unicast manner using traditionally-allocated resources. In another embodiment, the UE may use a special signature or code or sequence to indicate such completion of handover. In an example approach, multiple UEs can share the same radio time-frequency resources but use different signature/code/sequence to expedite handover and reduce amount of signaling.

In case some information has changed after the initial Xn setup (e.g., new parameters or new groups), two gNBs exchange NG-RAN NODE CONFIGURATION UPDATE and NG-RAN NODE CONFIGURATION UPDATE ACKNOWLEDGE messages to exchange new information.

In an embodiment of the disclosure, unicast signaling is available as a fallback mechanism. In other words, the gNB can choose unicast signaling for a UE whenever it wishes to do so. Furthermore, if non-unicast signaling fails, unicast signaling can be used.

In another embodiment of the disclosure, in an NTN, the cells may be moving, leading to ambiguity of the user location if only the cell identity and TAI are reported by the gNB and used by the core network. Furthermore, only the cell level granularity may not be adequate to meet the location accuracy requirements (e.g., for regulatory services). Hence, the reporting of the traditional "User Location Information" in the NGAP signaling messages is inadequate. The Core Network's Network Functions (NFs) such as the AMF and the LMF need additional information in an NTN to locate the UE in a given geographic area (e.g., to route a call to a Public Safety Answering Point (PSAP)). The Tracking Area Cell Global Identity (CGI) reporting can be made more efficient (i.e., more compact and/or relevant) for an NTN by exploiting the knowledge of the type of the NTN.

Figure 9:
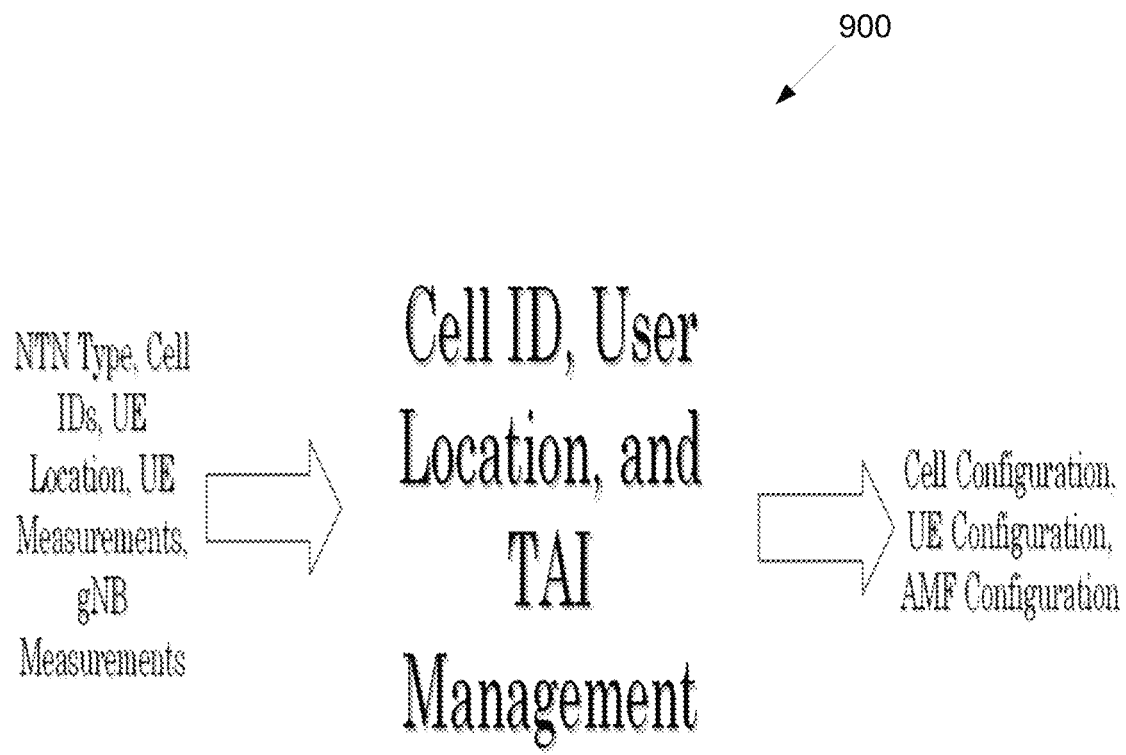
FIG. 9 illustrates an example of an overall mechanism of enhanced management of cell identity, user location, and TAI for an NTN according to embodiments of the present disclosure.

FIG. 9 illustrates an example of an overall mechanism of enhanced management of cell identity, user location, and TAI for an NTN 900 according to an embodiment of the present disclosure. The embodiment of the example overall mechanism of enhanced management of cell identity, user location, and TAI for an NTN 900 illustrated in FIG. 9 is for illustration only. FIG. 9 does not limit the scope of this disclosure to any particular implementation of the example of an overall mechanism of enhanced management of cell identity, user location, and TAI for an NTN 900.

As illustrated in FIG. 9, a gNB receives information regarding NTN type, cell IDs, UE location, UE measurements, and gNB measurements. The gNB transmits configuration information such as cell configuration information, UE configuration information, and AMF configuration information.

Figure 10:
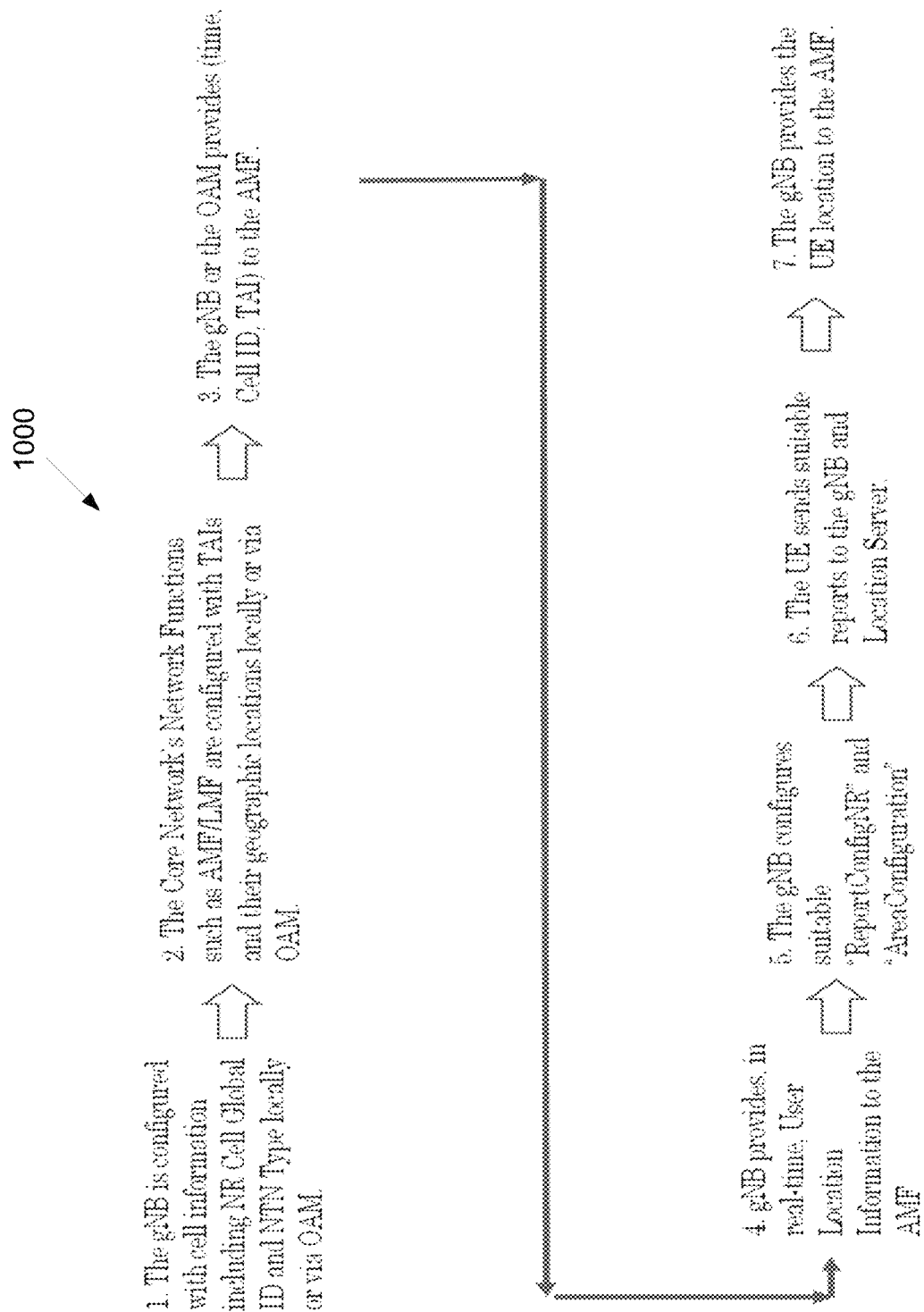
FIG. 10 illustrates an example of enhanced measurement configuration and reporting for an NTN handover according to embodiments of the present disclosure.

FIG. 10 illustrates an example of enhanced measurement configuration and reporting for an NTN handover 1000 according to an embodiment of the present disclosure. The embodiment of the example enhanced measurement configuration and reporting for an NTN handover 1000 illustrated in FIG. 10 is for illustration only. FIG. 10 does not limit the scope of this disclosure to any particular implementation of the example enhanced measurement configuration and reporting for an NTN handover 1000.

As illustrated in FIG. 10, the gNB is configured with cell information including NR cell global ID and NTN type locally or via OAM. The core network's network functions such as AMF/LMF are configured with TAIs and their geographic locations locally or via OAM. The gNB or the OAM provides time, cell ID, TAI to the AMF. The gNB provides, in real-time, user location information to the AMF. The gNB configures suitable "ReportConfigNR" and "AreaConfiguration". The UE sends suitable reports to the gNB and location server. The gNB provides the UE location to the AMF.

Figure 11:
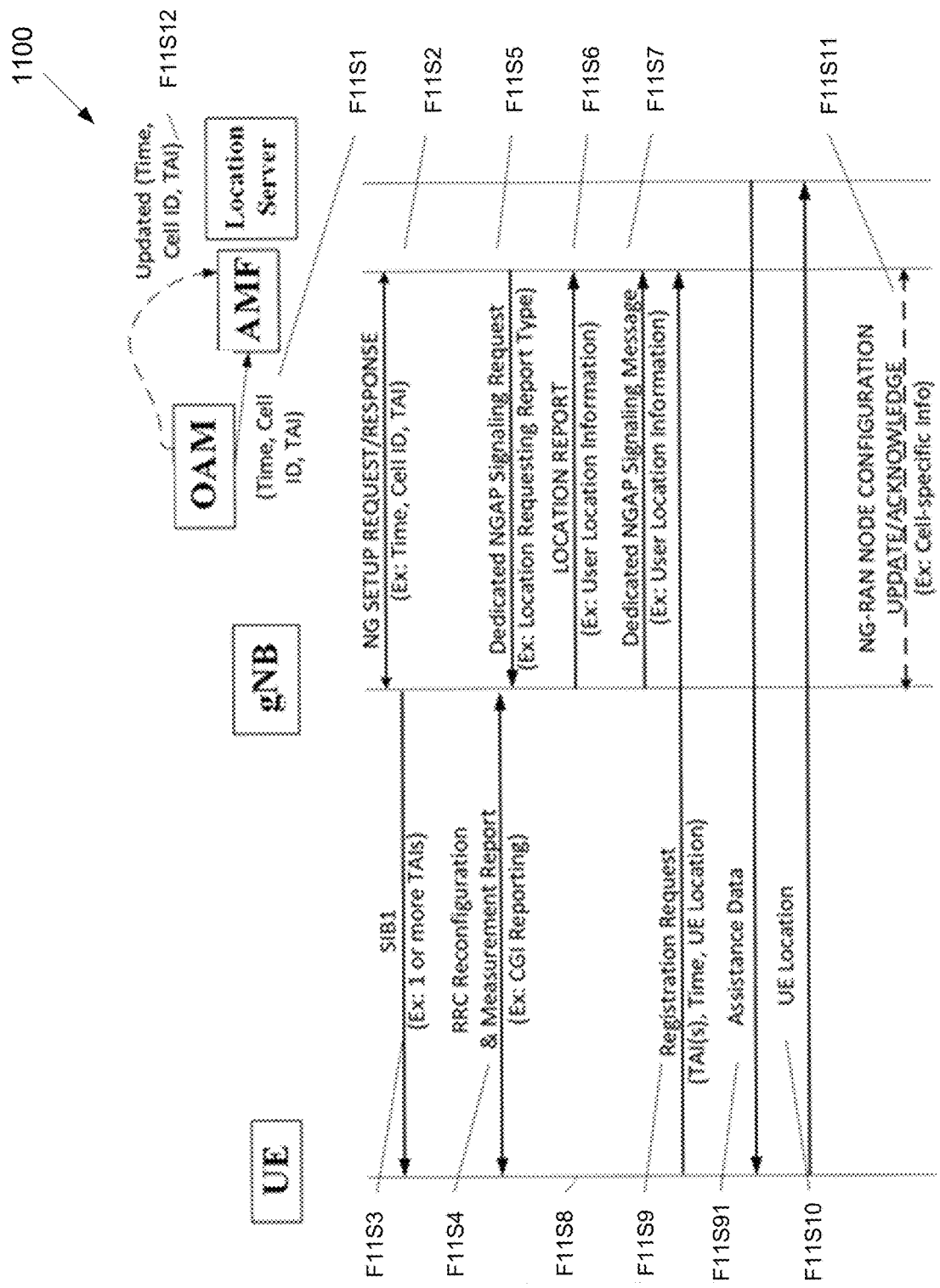
FIG. 11 illustrates a flow diagram showing an example procedure for enhanced management of cell identity, user location, and TAI according to embodiments of the present disclosure.

FIG. 11 illustrates a flow diagram showing an example procedure for enhanced management of cell identity, user location, and TAI 1100 according to an embodiment of the present disclosure. The embodiment of the example procedure for enhanced management of cell identity, user location, and TAI 1100 is for illustration only. FIG. 11 does not limit the scope of this disclosure to any particular implementation of the example procedure for enhanced management of cell identity, user location, and TAI 1100.

In operation F11S1, in an example approach, the operations, Administration, and Maintenance (OAM) system provides the Access and Mobility management Function (AMF) with a table that specifies the relationship between the Cell Identity (e.g., NR Cell Global Identity or NCGI consisting of PLMN ID and NR Cell ID) and one or more Tracking Area IDs (TAIs). This relationship is a function of time when the NTN cells are not Earth-fixed. This relationship enables the AMF to properly determine the Registration Area (e.g., TAI List) for the UE during the registration procedure. In another approach, the AMF is configured without using the OAM system. In this non-OAM approach, the AMF may provide its (Cell, TAI, time) configuration to the OAM system.

As part of mapping the Cell Identity to a specific geographic area on Earth, multiple approaches are possible based on how the shape of the cell is modeled, where the gNB, the OAM or the User Interface can specify such mapping. Different geometric shapes can be chosen to represent a cell and therefore relate the cell to a specific geographic area at an instant. In one approach, the cell may be modeled as a circle, and, in such case the center of the cell and the cell radius are provided specified. In another approach, the cell is modeled as an ellipse where the center, the semi-major axis, and semi-minor axis are specified. In an example embodiment of the disclosure, such characteristics of the elliptical cell (i.e., the center, the semi-major axis or the major axis, and semi-minor axis or the minor axis) are broadcast by the gNB in operation F11S3 along with other information such as one or more TAIs. The cell may be modeled as one rectangle or one inner and one outer rectangle, and centers and sides are specified. In another approach, the AMF builds the (potentially time-based) relationship between the NCGI and one or more Tracking Area IDs (TAIs) using the information received from suitable gNBs. For example, in operation F11S2, the gNB sends an NGAP SETUP REQUEST message to the AMF containing the NCGIs of its cells and the TAIs covered by these cells. This mapping, as mentioned for operation F11S1, can be a function of time when NTN cells are not Earth-fixed.

In operation F11S3, the gNB broadcasts SIB1 containing one or more TAIs in a cell depending upon the TAI management approach (e.g., regular tracking areas or virtual tracking areas). In another approach, a new NTN SIB may convey such TAIs.

In operation F11S4, to support flexible and compact Cell Global Identity (CGI) reporting, the gNB configures the UE to include or exclude TAI in the CGI reporting in an embodiment of the disclosure. The gNB makes such configuration decision based on the NTN Type (e.g., GEO vs. LEOs and Earth-fixed vs. quasi-Earth-fixed vs. Earth-moving beams). For example, when NTN cells are not Earth-fixed, the gNB may configure the UE using an explicit indicator not to report TAI to make the Measurement Report more compact, because such TAI is not helpful or useful information. In another approach, the UE skips reporting TAI autonomously (i.e., without an explicit gNB indication) by using the knowledge of the NTN Type.

In operation F11S5, the AMF requests the gNB for a location report using the "Location Reporting Request Type" Information Element using an NGAP message such as Initial Context Setup Request, Handover Request, and Location Reporting Control. The gNB responds, in operation F11S6, with Location Report that includes "User Location Information." In Release 16, the IE "User Location Information" includes UTC (Universal Coordinated Time) and NCGI. However, in an embodiment of this disclosure, the gNB, in addition to the NCGI, specifies the GNSS-based UE location (e.g., latitude, longitude, elevation, uncertainty, and so on) in the enhanced "User Location Information." In the first approach, such UE location may be the location reported by the UE based on its GNSS capability. In the second approach, the UE location may be based on the GNSS-based location of the reference point in the cell (e.g., cell center) and the UE's estimate of its own location relative to the reference point. In the third approach, the gNB estimates the UE location based on the UE-reported measurements and any gNB-made or gNB-consolidated measurements (e.g., Timing Advance). In all these approaches, the gNB can make use of one or more of the following UE-reported measurements for the serving cell and/or neighbor cells to validate the UE-reported location and/or to estimate the UE location by itself: Timing Advance, signal strength measurements (e.g., RSRP, RSRQ, and SINR), elevation angles, and Time Difference of Arrival (TDOA). The gNB may indicate in Location Report (as part of User Location Information or as an additional Information Element) how it has estimated or obtained the UE location. Furthermore, the gNB may indicate if it has validated the UE-reported location where applicable. In addition, the gNB may provide the UE-reported measurements to the AMF (and to the Location Server or a similar entity directly or indirectly) to enable other entities to determine the UE location.

In operation F11S7, when the gNB sends a traditional NGAP signaling message (e.g., Handover Notification, PDU Session Resource Release/Modify Response, Path Switch Request and so on), it includes "User Location Information." In an embodiment of this disclosure, the IE "User Location Information" is enhanced as described for operation F11S6 above.

In operation F11S8, the UE decides if it needs to do mobility-based registration update. For example, in the traditional R16 approach, the UE sends a NAS Registration Request message to the AMF when it encounters a TAI that is not in the TAI List (=Registration Area). In an embodiment of the disclosure, when the UE is currently served by an NTN, the UE performs the mobility based registration update when there is no common TAI between the TAIs associated with its Registration Area and the TAIs broadcast by the serving cell. Depending upon the tracking area management approach, the cell may broadcast different TAIs at different instants and the UE would need to do registration update if the R16 condition is followed. In an example approach, the UE includes its GNSS-based location (directly obtained or indirectly estimated) in the Registration Request message in operation F11S9. The gNB, as mentioned in operation F11S7, can also specify the UE location. In an example implementation, the AMF can pick the location associated with the latest timestamp (e.g., latest UTC) when it gets multiple UE locations. In another implementation, the gNB and/or AMF may use the difference in UE location to generate an error code and/or decide to use or not use one of the UE locations.

In support of the location services, the UE and the Location Server (e.g., Location Management Function or LMF) exchange LTE Positioning Protocol (LPPa)/NR Positioning Protocol (NPPa) messages. For example, the Location Server may provide Assistance Data to the UE in operation F11S91. The UE provides its location in operation F11S10. In an example embodiment of this disclosure, the UE provides one or more of these NTN measurements for the serving cell and/or the neighbor cells: Timing Advance, signal strength measurements (e.g., RSRP, RSRQ, and SINR), elevation angles, and Time Difference of Arrival (TDOA). Example LPPa/NPPa messages include E-CID Measurement Initiation Response, E-CID Measurement Report, and OTDOA Information Response. The "MeasuredResults" IE can contain the UE location and/or UE measurements.

There may be a need to update the (Time, Cell ID, TAI) mapping. Hence, in one approach shown in operation F11S11, the gNB and the AMF exchange NG RAN NODE CONFIGURATION UPDATE and NG RAN NODE CON- FIGURATION UPDATE ACKNOWLEDGE messages. The gNB provides the updated (Time, Cell ID, TAI) mapping (either the differences in mapping or the entire mapping) to the AMF using NG RAN NODE CONFIGURATION UPDATE. In another approach, as shown in operation F11S12, the OAM system updates the (Time, Cell ID, TAI) mapping at the AMF. In yet another approach, a non-OAM system (e.g., a User Interface to the AMF) configures the AMF with updated mapping.

In an embodiment of the disclosure, in support of cell identity management between the radio and core networks, when the UE provides its GNSS-based location to the gNB, the gNB determines the identity of the associated Earth-fixed cell ("virtual cell") and conveys such ID to the AMF and other entities (e.g., LMF) as needed.

In an example embodiment of the disclosure, the Earth-fixed cells are represented by shapes such as a hexagon or an ellipse. Such cells can be viewed as virtual cells, because they are different from the physical cells that are represented by PCIs and NCGIs (or ECGIs for LTE) and that are associated with transmission of RF signals. The layout of such Earth-fixed cells or virtual cells can be presented by cell shape-based characteristics. The sizes of virtual Earth-fixed cells can be smaller than, larger than, or (approximately) the same as the sizes of NTN cells.

In an example approach, for a hexagon-shaped virtual cell, the center of the cell (i.e., a Reference Point) and the radius of the cell are characteristics that are used to fully define the virtual cell's hypothetical geographic coverage. The orientation of the hexagonal shape (e.g., a line segment or a point intersecting a ray going from the center of the hexagon to the North direction) may be predefined or specified as part of the characteristic common to all virtual cells.

In another example approach, for an elliptical virtual cell, the center of the cell, the major axis, and the minor axis are the characteristics that are used to define the cell's hypothetical geographic coverage.

In an embodiment of the disclosure, an entity such as OAM or an application server provides the Virtual Cell ID-Cell Characteristics to gNBs. Such entity also provides the Virtual Cell ID-Cell Characteristics to non-RAN entities such as the AMF and the LMF to ensure the same view of the cell layout at all the Network Functions that process the virtual cell ID. In another embodiment, the gNB is configured by an external server or is locally supplied with the relevant database containing the Virtual Cell ID-Cell Characteristics.

In yet another approach, the gNB provides the Virtual Cell ID-Cell Characteristics to non-RAN entities such as the AMF and the LMF.

In an example embodiment of the disclosure, the UE is provided with the Virtual Cell ID-Cell Characteristics for the cell layout by the network (e.g., the gNB, the AMF, the LMF, OAM, or an Application Server) via NTN signaling or non-NTN signaling (e.g., WiFi signaling or TN signaling).

In another embodiment of the disclosure, the UE may be pre-provisioned with the (default, current, or initial) Virtual Cell ID-Cell Characteristics. In an example approach, the UE determines its current Virtual Cell ID by comparing its GNSS-based location with the virtual cell ID layout. The UE informs network about its current virtual cell ID via RRC signaling, NAS signaling, and/or LTE/NR positioning protocol signaling.

In another embodiment of the disclosure, in an NTN, propagation delays could be a few milliseconds for LEOs or hundreds of milliseconds for GEOs. Because of long propagation delays in an NTN, it takes a long time for the UE's message to reach the source Base Station or the target Base Station. Furthermore, it takes time for the signaling messages from the source BS or the target BS to arrive at the UE. Hence, the exchange of RRC signaling is much slower in an NTN compared to a Terrestrial Network. Additionally, multiple rounds of signaling exchanges occur between the UE and the radio network as part of random access procedure and RRC reconfiguration in the new cell. Due to long propagation and signaling exchange delays, the user traffic is interrupted for tens of milliseconds for LEO-based NTNs and hundreds of milliseconds for GEO-based NTNs. Hence, the service experience for users is degraded for a prolonged handover duration.

Figure 12:
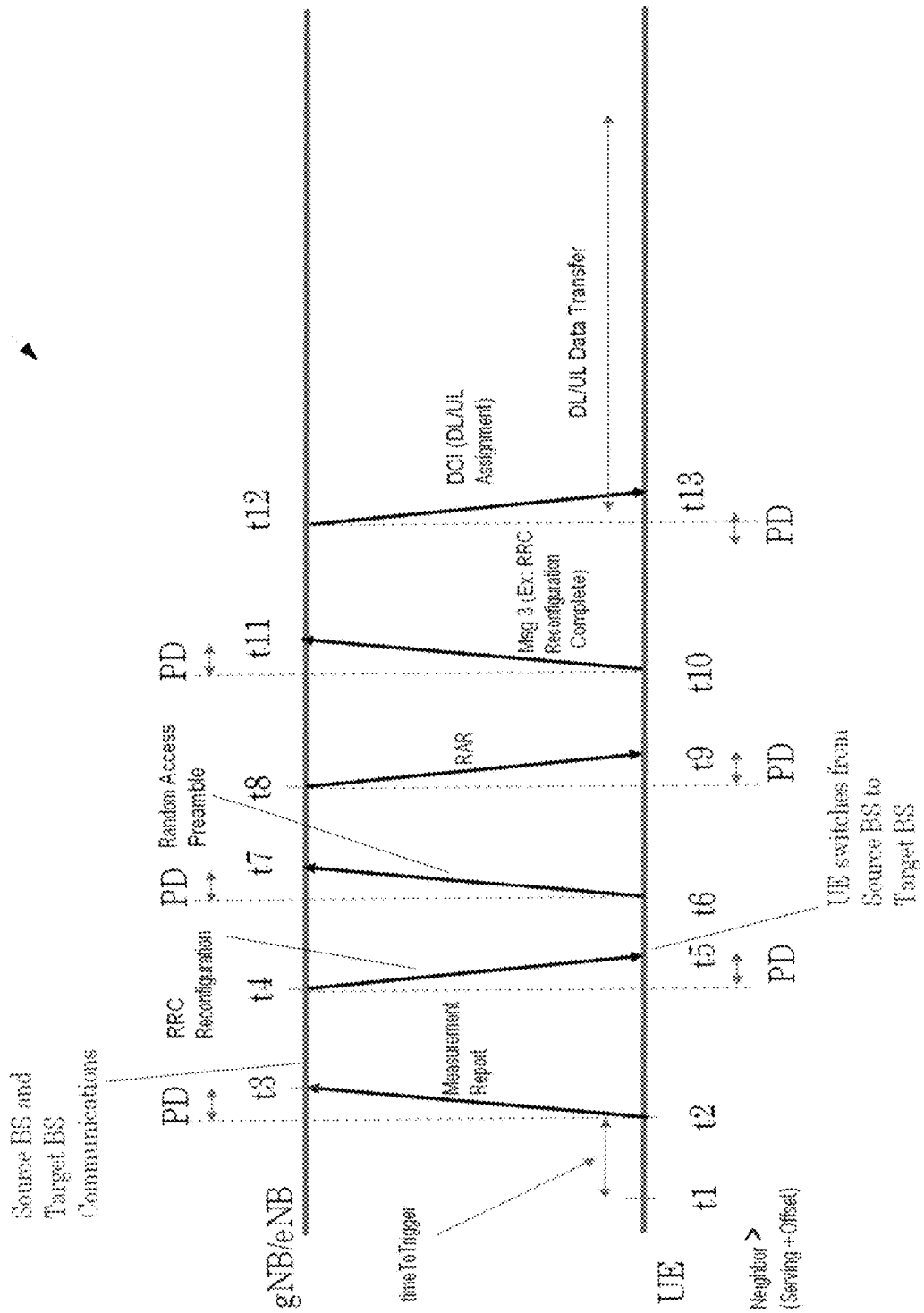
FIG. 12 illustrates an example typical handover timeline in a terrestrial network according to embodiments of the present disclosure.

FIG. 12 illustrates an example typical handover timeline in a terrestrial network 1200 according to an embodiment of the present disclosure. The embodiment of the typical handover timeline in a terrestrial network 1200 is for illustration only. FIG. 12 does not limit the scope of this disclosure to any particular implementation of the example typical handover timeline in a terrestrial network 1200.

Consider a typical handover scenario in a terrestrial network. FIG. 12 illustrates a typical timeline for handover in LTE and 5G. In FIG. 12, PD is the one-way propagation delay between the UE and the gNB/eNB. According to event A3, the UE sends a measurement report when the neighboring cell becomes an offset better than the serving cell and stays better than the serving cell for the duration of time-ToTrigger.

At time t2, event A3 occurs, and the UE sends a Measurement Report containing the measurements of the serving cell and the candidate cell. The gNB/eNB makes a handover decision, gets the approval of the target gNB/eNB and sends a handover command to the UE at time t4 in the form of an RRC message such as RRC Reconfiguration. The UE stops communicating with the source cell/Base Station and initiates the random access procedure toward the target cell/BS by sending an RA preamble at t6. The target BS replies with a Random Access Response and includes a timing adjustment to facilitate UL synchronization and UL resource allocation in the form of a grant. The UE sends an RRC Reconfiguration Complete message (so-called Msg3 or Message 3) at time t10 using the allocated UL grant to complete the handover process. In a typical gNB/eNB implementation, the gNB/eNB allocates DL/UL resources after receiving Msg3. User traffic transfer typically does not occur for a UE between t5 and t13.

This disclosure enhances the overall process of intra-handover user traffic transfer when the UE returns to the source cell to resume data transfer after sending a RA preamble at time t7 as shown in FIG. 5B. In FIG. 5B, ST is the switching time taken by the UE from one gNB/eNB to another gNB/eNB. The UE carries out the user traffic transfer with the S-gNB during the time window t8 to t10. In case the UE does not receive the RAR in the first attempt, this disclosure allows the UE to return to the source cell more than once to continue the user traffic transfer. Furthermore, the disclosure supports Configured Scheduling and Dynamic Scheduling between the UE and the Target gNB any time at t12 or later when the RAR is successful.

Figure 13:
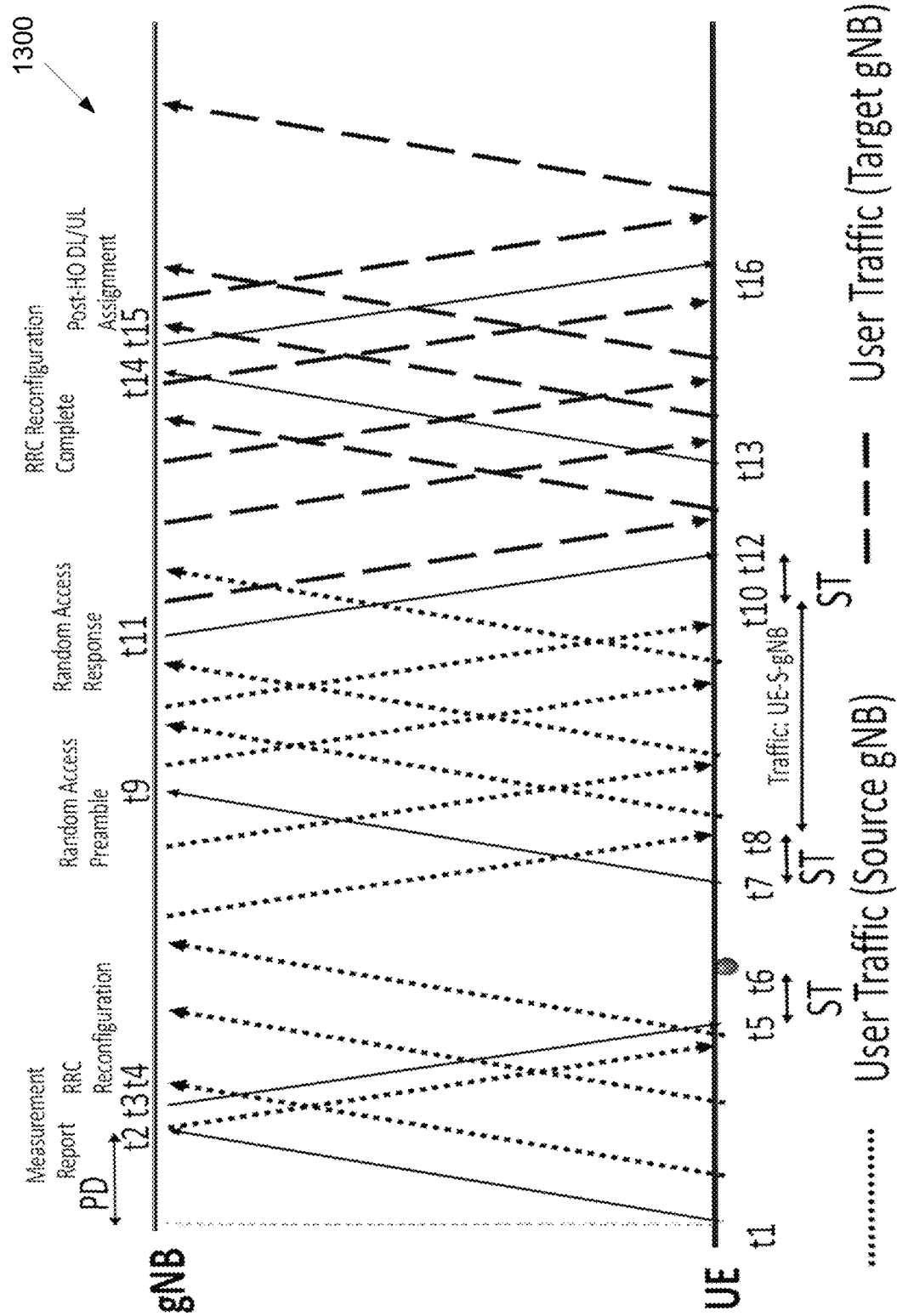
FIG. 13 illustrates an example handover timeline for an NTN 1300 according to embodiments of the present disclosure.

FIG. 13 illustrates an example handover timeline for an NTN 1300 according to an embodiment of the present disclosure. The embodiment of the example handover timeline for an NTN 1300 is for illustration only. FIG. 13 does not limit the scope of this disclosure to any particular implementation of the example handover timeline for an NTN 1300.

As illustrated in FIG. 13, the UE immediately switches to the T-gNB after receiving the RRC Reconfiguration command and sends the RA Preamble to the T-gNB at t7. Based on implementation and the knowledge of specific time windows, it is possible for the UE to continue exchanging data with the S-gNB until the instant t6', where t6'=t7-ST.

Figure 14:
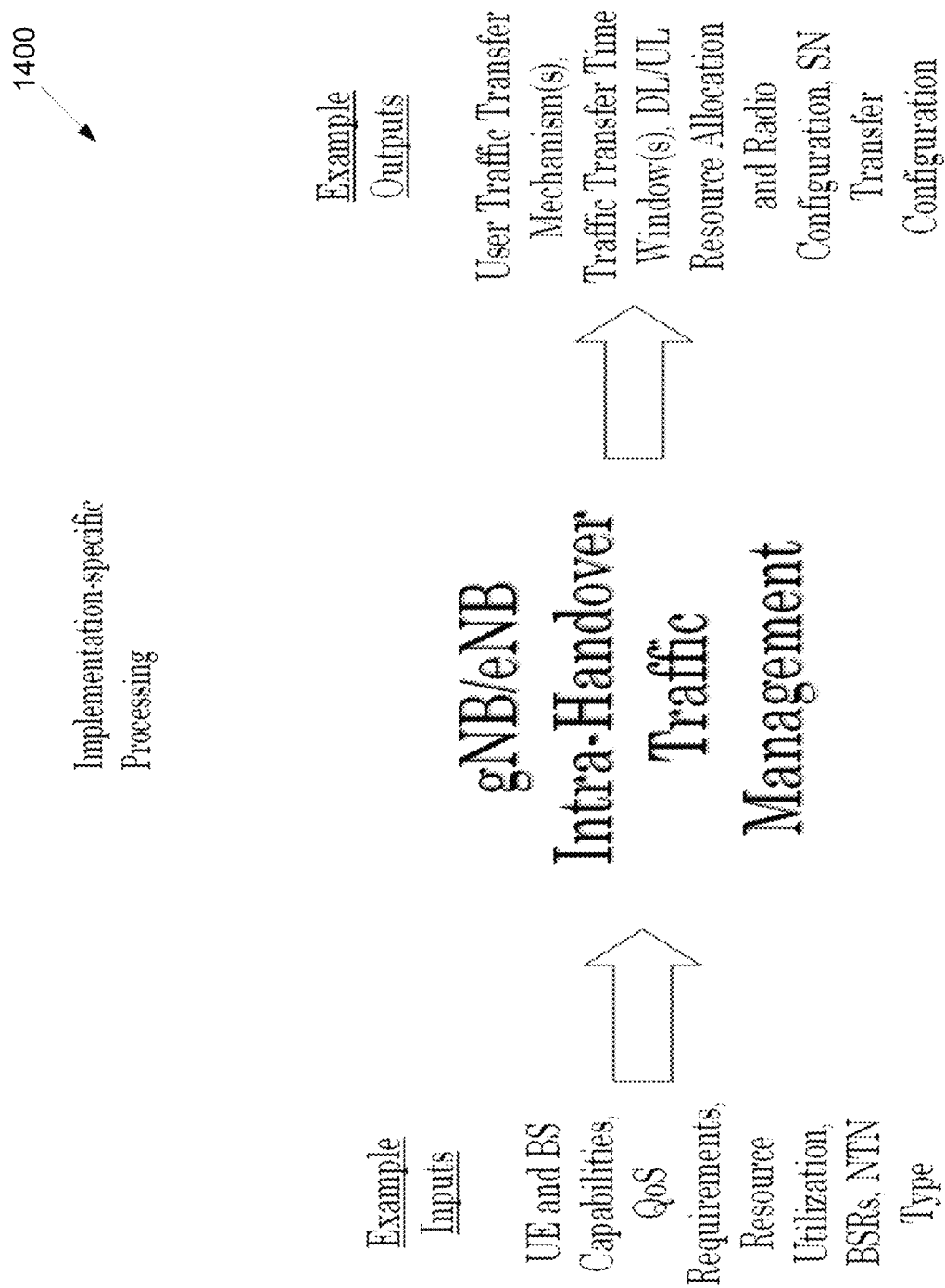
FIG. 14 illustrates an example of overall user traffic management for reduction in user traffic interruption according to embodiments of the present disclosure.

FIG. 14 illustrates an example of overall user traffic management for reduction in user traffic interruption 1400 according to an embodiment of the present disclosure. The embodiment of the example of overall user traffic management for reduction in user traffic interruption 1400 illustrated in FIG. 14 is for illustration only. FIG. 14 does not limit the scope of this disclosure to any particular implementation of the example of overall user traffic management for reduction in user traffic interruption 1400.

FIG. 14 summarizes example inputs and outputs of an implementation-specific resource management algorithm at an eNB/gNB that reduces the user traffic interruptions for an example embodiment of the disclosure.

As illustrated in FIG. 14, a gNB receives information regarding UE and BS capabilities, QoS requirements, resource utilization, BSRs, and NTN type, as well as implementation processing information. The gNB transmits user traffic transfer mechanisms, traffic transfer time windows, DL/UL resource allocation and ratio configuration, and SN transfer configuration.

In an implementation-specific manner, the eNB/gNB uses inputs such as UE capabilities and BS capabilities, QoS requirements, resource utilization, and type of NTN to allocate radio resources and carries out suitable radio configuration so that user traffic experiences a short interruption during handover in spite of long propagation and signaling delays.

Figure 15:
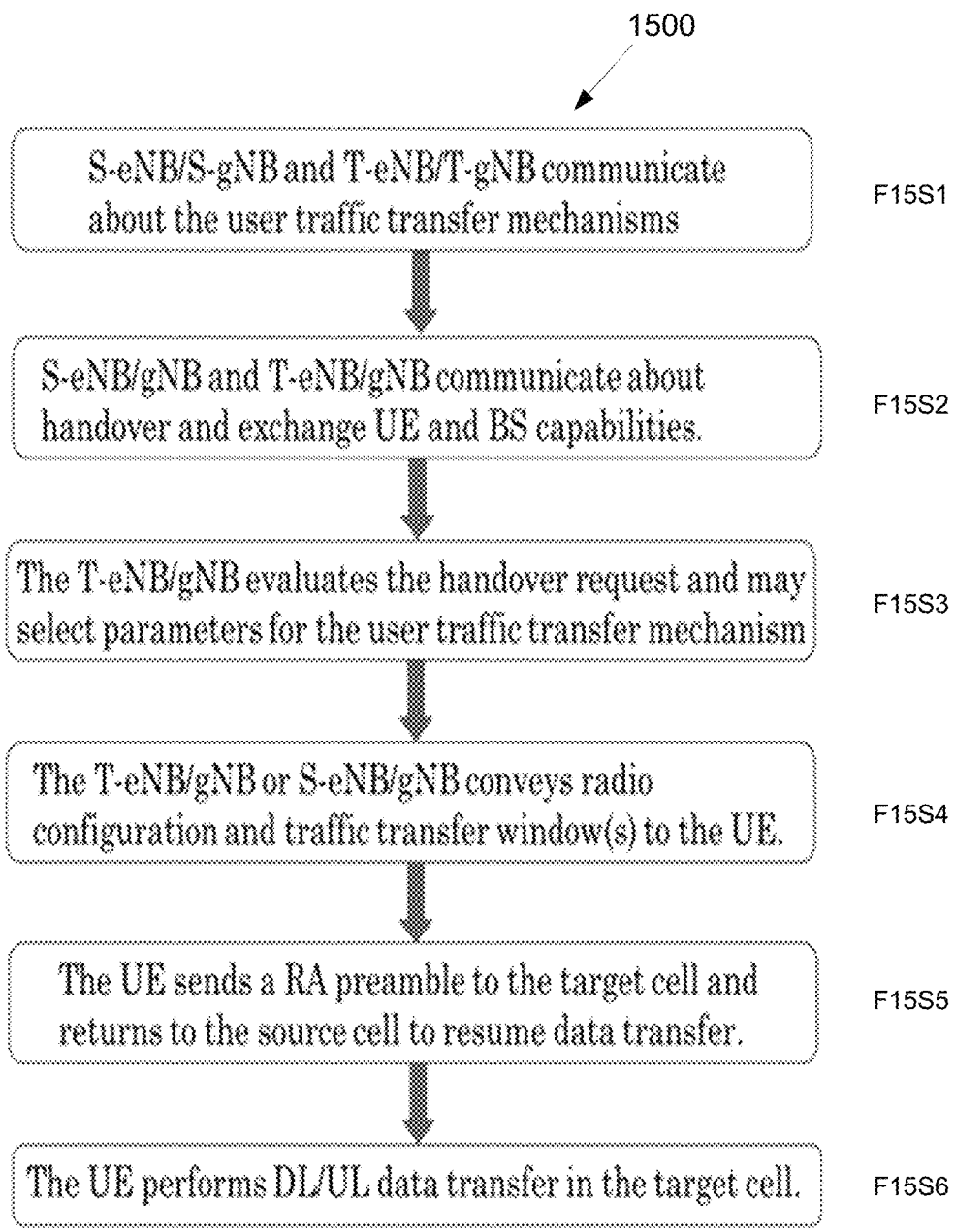
FIG. 15 illustrates a flow diagram showing an example procedure to reduce user traffic interruptions according to embodiments of the present disclosure.

FIG. 15 illustrates a flow diagram showing an example procedure to reduce user traffic interruptions 1500 according to an embodiment of the present disclosure. The embodiment of the example procedure to reduce user traffic interruptions 1500 illustrated in FIG. 15 is for illustration only. FIG. 15 does not limit the scope of this disclosure to any particular implementation of the example procedure to reduce user traffic interruptions 1500. Details of the UE-network signaling, the UE procedure, and the network procedures are provided in FIGS. 16, 17 and 18, respectively.

In operation F15S1, the Source eNB/gNB and Target eNB/gNB communicate about the user traffic transfer mechanisms, RACH configuration, and delays.

In operation F15S2, after the Source eNB/gNB receives the Measurement Report from the UE, Source eNB/gNB and Target eNB/gNB communicate about handover and exchange UE and BS capabilities.

In operation F15S3, the Target eNB/gNB evaluates the handover request and the availability of radio resources in the target cell and may select the user traffic transfer mechanism and associated parameters.

In operation F15S4, the Target eNB/gNB conveys radio configuration and traffic transfer window(s) to the Source eNB/gNB. The Source eNB/gNB conveys this information to the UE. The Source eNB/gNB may determine and then convey traffic transfer window(s) to the UE.

In operation F15S5, the UE sends a RA preamble to the target cell, returns to the source cell to resume data transfer, carries out data transfer with the Source gNB/eNB, and returns to the target cell to receive RAR. Per configuration, the UE may return to the source cell more than once for data transfer.

In operation F15S6, the UE performs DL/UL data transfer in the target cell after successful RAR according to any applicable advanced resource allocation and handover radio configuration.

Figure 16:
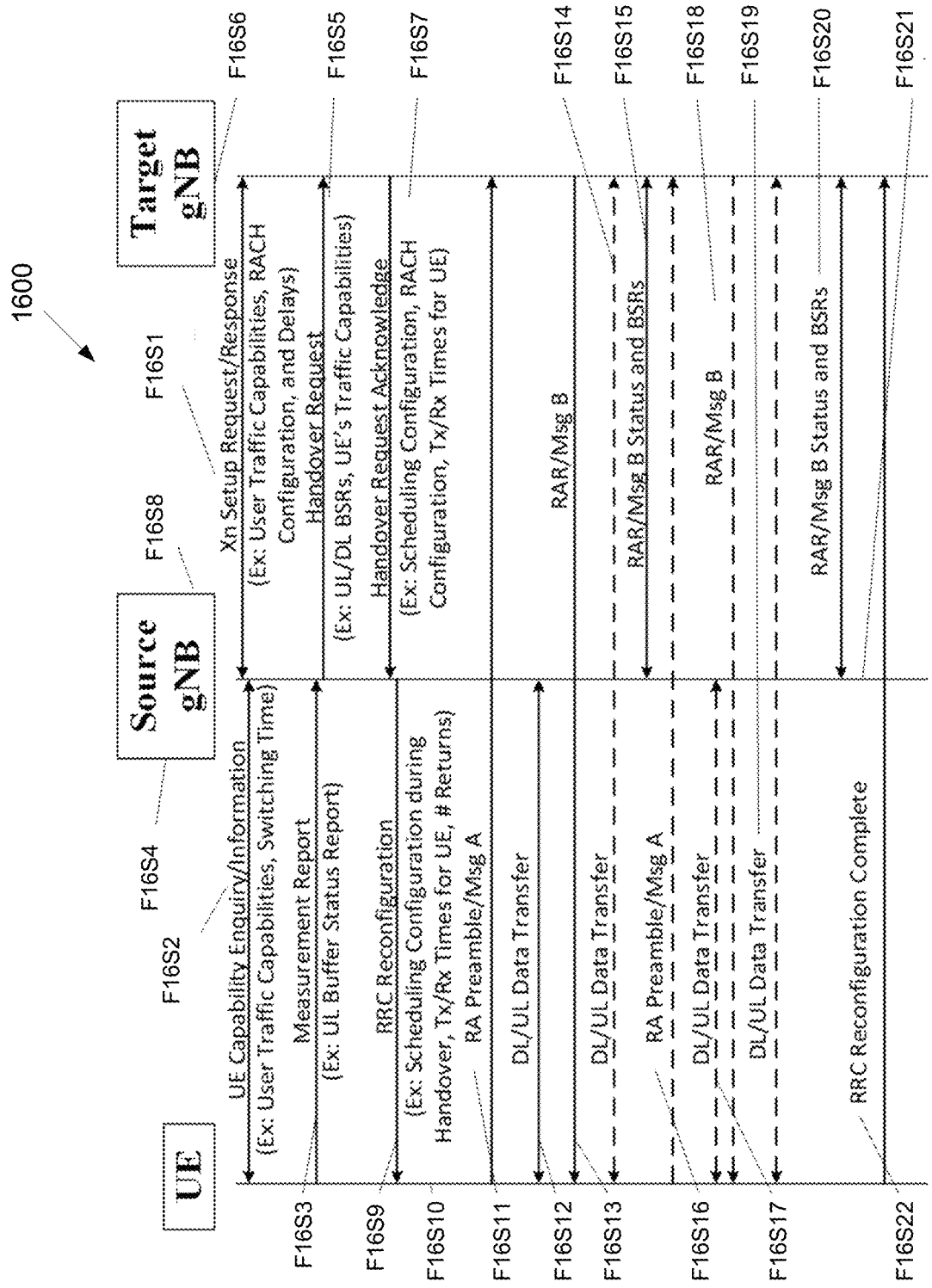
FIG. 16 illustrates a flow diagram showing an example procedure to reduce propagation delays according to embodiments of the present disclosure.

FIG. 16 illustrates a flow diagram showing an example procedure to reduce propagation delays 1600 according to an embodiment of the present disclosure. The embodiment of the example procedure to reduce propagation delays 1600 illustrated in FIG. 16 is for illustration only. FIG. 16 does not limit the scope of this disclosure to any particular implementation of the example procedure to reduce propagation delays 1600.

In operation F16S1, the Source gNB (S-gNB, 811) and the Target gNB (T-gNB, 821) exchange XnAP Xn Setup Request and Xn Setup Response messages to inform each other about their support for the intra-handover user traffic transfer mechanisms and associated parameters such as the RACH configuration, gNB reference times, and delays. Examples of user traffic transfer mechanisms include (i) a mechanism where intra-handover user traffic transfer occurs between the UE and the S-gNB and (ii) a mechanism where intra-handover user traffic transfer occurs between the UE and the T-gNB. The RACH configuration, reference times, and delays are used by the gNB(s) to determine the time windows during which the UE can exchange user traffic with the S-gNB and the T-gNB. See operation F18S1 and FIG. 18 below for details of the processing delays.

In operation F16S2, the UE and the S-gNB exchange capabilities related to the intra-handover user traffic transfer using UE Capability Enquiry and UE Capability Information messages. In operation F16S2, in an embodiment of the disclosure, the UE and the source gNB/eNB exchange the support for the overall feature of intra-handover user traffic transfer and (potentially) the type of data transfer in the uplink and/or the downlink in the target cell (e.g., advanced dynamic scheduling) and related parameters (e.g., userTrafficTransferDuringHandover, intraHandoverReturnToSourceCell, and switching time for the UE to switch between the source cell and the target cell) via UE Capability Enquiry and UE Capability Information messages. The parameter userTrafficTransferDuringHandover indicates if the gNB may configure the UE to support user traffic transfer while the handover procedure is in progress. Such user traffic transfer occurs between the RRC Reconfiguration message and the RRC Reconfiguration Complete message. Furthermore, in general, such intra-handover user traffic transfer may occur between (i) the UE and the S-gNB only, (ii) the UE and the T-gNB only, (iii) the UE and both the S-gNB and the T-gNB. The parameter intraHandoverReturnToSourceCell indicates if the gNB may configure the UE for intra-handover user traffic transfer, where the UE returns to the source cell during handover to resume data transfer with the S-gNB. Advanced Dynamic Scheduling (ADS) means that the T-gNB conveys to the UE a DL or UL resource association via a DCI format at any suitable time after (or when) the UE has received a successful Random Access Response from the target cell. When ADS is configured, the UE is required to monitor PDCCHs for all the DCIs that allocate DL and/or UL resource allocations using the C-RNTI that has been allocated to the UE in the target cell. Based on the resource allocation(s) specified on DCI(s), the UE exchanges data with the T-gNB after a successful RAR.

In operation F16S3, in an embodiment of the disclosure, when the gNB/eNB configures the UE for intra-handover user traffic transfer when intraHandoverReturnToSourceCell is true, the UE includes a Buffer Status Report ("handoverBSR_ForReturnToSourceCell") along with the Measurement Report message if configured by the S-gNB or without such explicit configuration. This BSR conveys the status of the uplink buffers at the UE (e.g., amounts and type/priority of available UL traffic). Such report helps the S-gNB decide (i) if any user traffic transfer during handover is beneficial and (ii) the amount of radio resources that may be required or desirable for the UE. The S-gNB can make such decision independently for the DL and the UL. The format or the content of this BSR is the same as the regular BSR defined in Release 16 specifications; this embodiment specifies a new criterion for the UE to send such BSR. When the UE is configured to return to the source cell for intra-handover user traffic transfer, an embodiment of the disclosure requires the UE to send a BSR along with the Measurement Report per configuration by the S-gNB. Such BSR is referred to as handoverBSR_ForReturnToSourceCell or simply handoverBSR.

In operation F16S4, the S-gNB makes a handover decision and identifies the T-gNB associated with the target cell for handover.

In operation F16S5, the S-gNB sends an XnAP Handover Request message to the T-gNB and includes the UE's capabilities related to the intra-handover user traffic transfer. The S-gNB may also indicate its preference for the method(s) to reduce the user traffic interruption (e.g., UE stays with the target cell or returns to the source cell after receiving the handover command).

In operation F16S6, the T-gNB determines the radio configuration and potentially the intra-handover traffic mechanism(s) and associated parameters (e.g., start time and/or end time of the time window for the UE-S-gNB data transfer and an indication of advanced dynamic scheduling).

In operation F16S7, the T-gNB replies with Handover Request Acknowledge message and includes the user traffic transfer related parameters determined in operation F16S6. The T-gNB may also indicate its preference for the method(s) to reduce the user traffic interruption (e.g., UE stays with the target cell or returns to the source cell after receiving the handover command). The final decision of the specific method or a combination of methods to reduce the user traffic interruption during handover can be made by the S-gNB or the T-gNB.

In operation F16S8, the S-gNB processes the Handover Request Acknowledge Message and (if needed) determines the method(s) for the intra-handover user traffic transfer and the associated parameters (e.g., start time and/or end time of the time window for the UE-S-gNB data transfer) based on the factors such as the latest UL BSR and DL buffer status.

In operation F16S9, the S-gNB sends the RRC Reconfiguration message to the UE, which conveys the T-gNB-specified radio configuration applicable in the target cell and S-gNB-determined parameters (e.g., start time and/or end time of the time window for the UE-S-gNB data transfer).

In operation F16S10, the UE processes the received RRC Reconfiguration message to the UE and prepares to implement the mechanism(s) to reduce the traffic interruption during handover using the configurations specified by the S-gNB and the T-gNB. In an embodiment of the disclosure, when the RRC Reconfiguration message is received by the UE, the UE does not reset MAC/RLC layers so that it can properly resume data transfer with the source cell when configured by the network.

In operation F16S11, the UE sends an RA Preamble in case of the 4-step Random Access Procedure or Msg A (i.e., Message A) in case of the 2-step Random Access Procedure using the RACH configuration specified by the T-gNB.

In operation F16S12, the UE returns to the source cell after sending the RA preamble and carries out downlink data transfer and uplink data transfer with the source cell inside the time window specified by the S-gNB, the T-gNB or jointly specified by the S-gNB and the T-gNB.

In operation F16S13, the T-gNB sends RAR in case of the 4-step RA procedure and Msg B (i.e., Message B) in case of the 2-step RA procedure. If the T-gNB sends a successful RAR to the UE and the UE receives this successful RAR, the operation F16S14 is executed. If the UE has not received successful RAR, the operations F16S16, F16S17, and F16S18 are executed.

In operation F16S14, if the UE has received successful RAR, the UE and the T-gNB carry out UL/DL data transfer if advanced dynamic scheduling is configured for the UE by the T-gNB. The T-gNB allocates resources to the UE in support of advanced dynamic scheduling if the T-gNB has transmitted successful RAR. The UE also simultaneously executes operation F16S22.

In operation F16S15, in an example embodiment of the disclosure, after sending the RAR to the UE, the T-gNB sends the status of the RAR (e.g., successful or unsuccessful) to the S-gNB so that the S-gNB knows whether to continue user traffic transfer with the UE or not. In case of successful RAR, the S-gNB provides the latest DL and UL BSRs for the UE to the T-gNB so that the T-gNB determine suitable radio resource allocation for the UE. Furthermore, the S-gNB goes to operation F16S20 after receiving the notification about successful RAR.

In operation F16S16, in the absence of receiving a successful RAR, the UE sends an RA Preamble to the T-gNB in case of the 4-step Random Access Procedure or Msg A (i.e., Message A) in case of the 2-step Random Access Procedure using the RACH configuration specified by the T-gNB. If the limit on the number of returns to the source cell (i.e., maxReturnsToSourceCell) is not reached, the UE returns to the source cell to resume the data transfer.

In operation F16S17, the UE carries out downlink data transfer and uplink data transfer with the source cell inside the time window specified by the S-gNB, the T-gNB or jointly specified by the S-gNB and the T-gNB.

In operation F16S18, the T-gNB sends RAR in case of the 4-step RA procedure and Msg B (i.e., Message B) in case of the 2-step RA procedure. If the T-gNB sends a successful RAR to the UE and the UE receives this successful RAR, the UE goes to operation F16S22.

In operation F8S19, in an example embodiment of the disclosure, after sending the RAR to the UE, the T-gNB sends the status of the RAR (e.g., successful or unsuccessful) to the S-gNB so that the S-gNB knows whether to continue user traffic transfer with the UE or not if the limit on the number of returns to the source cell (i.e., maxReturnsToSourceCell) is not reached for the UE. In the RAR is successful or if the limit on the number of returns to the source cell (i.e., maxReturnsToSourceCell) is reached, the S-gNB provides DL and UL BSRs to the T-gNB so that the T-gNB determine suitable radio resource allocation for the UE.

The operations F1616, F16S17, F16S18, and F16S20 are repeated until the limit on the maximum number of returns to the source cell (i.e., maxReturnsToSourceCell) is reached. After such limit is reached, the UE stays with the target cell.

In operation F16S21, the S-gNB sends an XnAP SN Status Transfer message to the T-gNB to specify the status of the uplink receiver and the downlink transmitter.

In operation F16S22, the UE resets MAC/RLC layers after receiving the successful RAR so that it can properly resume data transfer with the target cell. The UE sends the RRC Reconfiguration Complete message to the T-gNB. In an embodiment of the disclosure, after receiving the successful RAR, the UE may also send a BSR and PDCP SN Status to the T-gNB to inform the T-gNB about the latest status of the UL buffer, the UL transmitter, and the DL receiver.

In FIG. 16, the explicit time windows are specified by the gNB/eNB for intra-handover user traffic transfer. In another embodiment of the disclosure, these time windows are implicitly defined based on one or more rules so that the gNB s/eNB s and the UE have the same understanding of the start and end times of such windows. In an example approach, the knowledge of the Random Access channel (RACH) configuration and the switching time ST can be used to define such rule(s). More specifically, in one possible implementation, the time window has the following start time and the end time:

(i) the start of the time window is the first instant when the UE can send a RA preamble based on the RACH configuration after receiving the RAR and at least after the time ST.

(ii) The end time of the time window is the instant that is "ST" earlier than the instant at which the UE is expected to receive the RAR from the target cell.

Figure 17A:
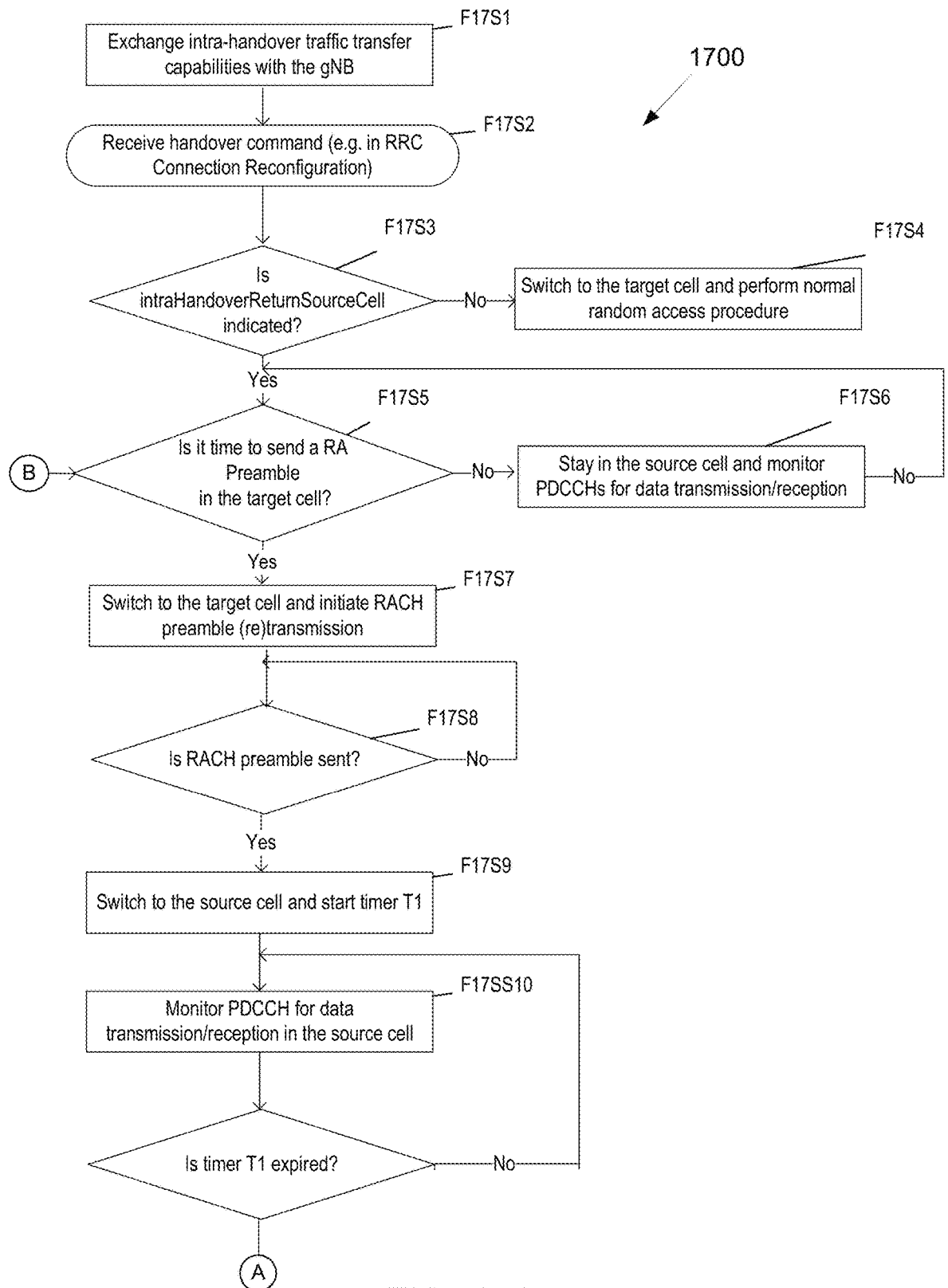
FIGS. 17A and 17B illustrate a flow diagram showing an example UE procedure to reduce propagation delays according to embodiments of the present disclosure.
Figure 17B:
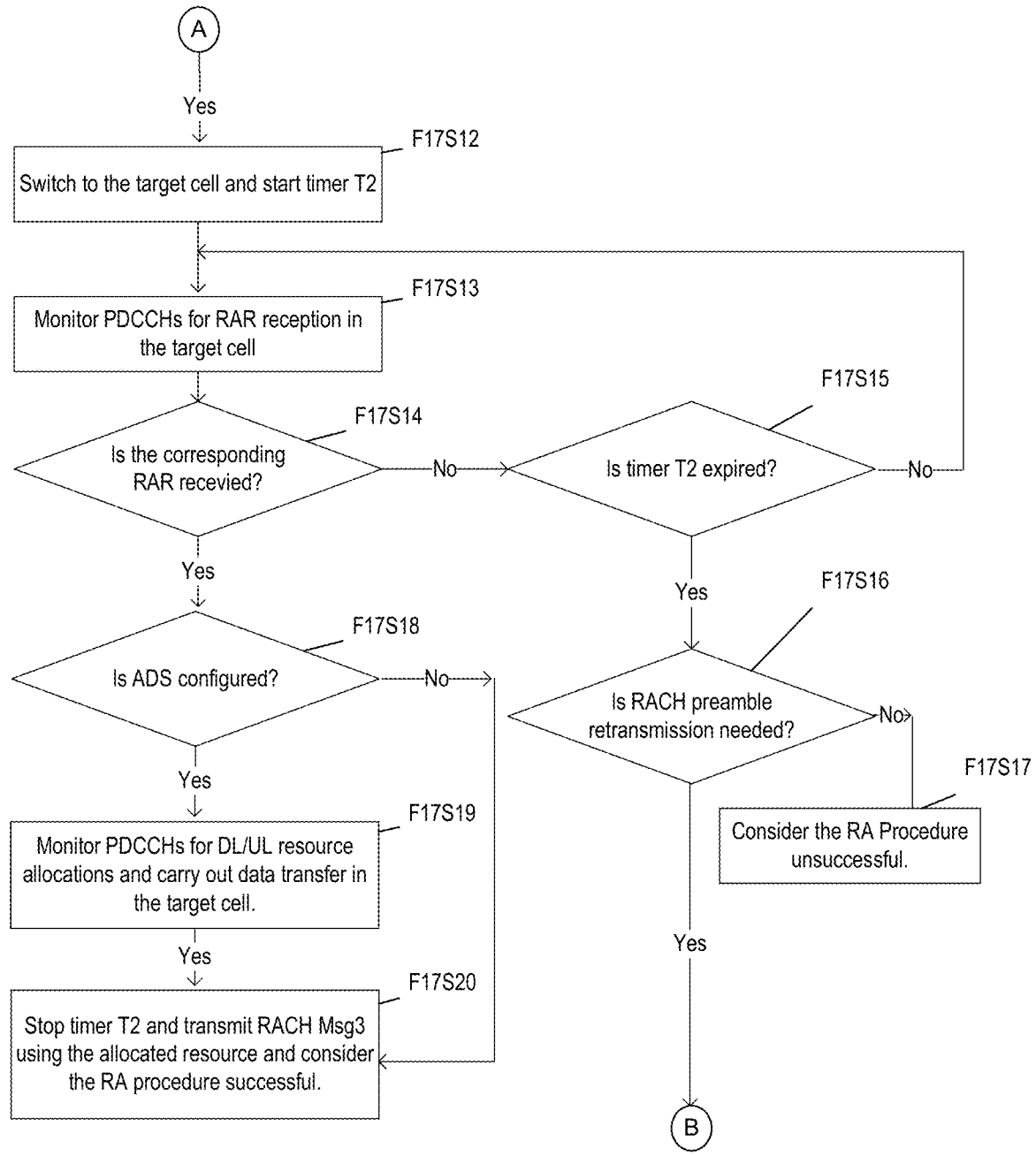

FIGS. 17A and 17B illustrate a flow diagram showing an example UE procedure to reduce propagation delays 1700 according to an embodiment of the present disclosure. The embodiment of the example UE procedure to reduce propagation delays 1700 illustrated in FIGS. 17A and 17B is for illustration only. FIGS. 17A and 17B do not limit the scope of this disclosure to any particular implementation of the example UE procedure to reduce propagation delays 1700.

In operation F17S1, the UE exchanges capabilities related to the intra-handover user traffic transfer with the S-gNB using UE Capability Enquiry and UE Capability Information messages. The UE and the source gNB/eNB exchange the support for the overall feature of intra-handover user traffic transfer and the type of data transfer in the uplink and/or the downlink in the target cell (e.g., advanced dynamic scheduling) and related parameters.

In operation F17S1, in an embodiment of the disclosure, in the UE Capability Information message, the UE conveys its support for intra-handover user traffic transfer mechanisms including "intraHandoverReturnToSourceCell" (i.e., return of the UE to the source cell to resume user traffic transfer in the S-gNB after the UE has sent a RA Preamble/msgA to the target cell), "multiple returns to the source cell to resume user traffic transfer in the S-gNB" and the time required to switch from the S-gNB to the T-gNB or the time required to switch from the T-gNB to the S-gNB, ST. In another embodiment of the disclosure, ST may be specified as part of minimum performance requirements instead of being explicitly specified in the UE Capability Information message. In another embodiment of the disclosure, the UE provides such capabilities autonomously or in response to the request made the gNB in the UE Capability Enquiry message. In yet another embodiment of the disclosure, the UE is mandated to support the "intraHandoverReturnToSourceCell" feature.

In yet another embodiment of the disclosure in operation F17S1, in support of advanced dynamic scheduling (ADS), the UE may indicate its support for reception and decoding of the DCI formats relevant to user traffic transfer with or after the Random Access Response. Such DCIs are considered part of ADS, because typical DCIs are transmitted by the T-gNB after it has received an RRC Reconfiguration Complete message from the UE. Such indication about the DCI formats means that the UE decodes the DCI formats associated with C-RNTI (allocated by the T-gNB) and RA-RNTI during the 4-step random access procedure associated with handover. As mentioned earlier in operation F16S2 for FIG. 16 and as shown in operation F17S19 below, when ADS is configured, the UE exchanges data with the T-gNB after a successful RAR.

In operation F17S2, the UE received the RRC Reconfiguration message from the S-gNB, which conveys the T-gNB-specified radio configuration applicable in the target cell and potentially the S-gNB-determined parameters (e.g., start and end times of the intra-handover traffic transfer window for the UE-S-gNB intra-handover data transfer and an indication of the ADS in the target cell). The UE receives from the gNB the PRACH occasion as prach-ConfigurationIndex for the 4-step RA procedure.

In one implementation approach, the UE may receive from the S-gNB the start of the intra-handover traffic transfer window as startTimeIntraHandoverTrafficTransfer using (HFN, SFN, Slot# in a frame) to identify the first valid slot for scheduling.

In one example approach, the UE may receive from the S-gNB the end of the intra-handover traffic transfer window as endTimeIntraHandoverTrafficTransfer using (HFN, SFN, Slot# in a frame) to identify the last valid slot for scheduling. In another example approach, the S-gNB may specify the end of the intra-handover traffic transfer window as (startTimeIntraHandoverTrafficTransfer+trafficTransferWindowLength), where trafficTransferWindowLength is the length (in number of slots) of the intra-handover traffic transfer window. In another example approach, the end time of the window may be implicitly defined as (RAR reception time—ST).

In yet another approach, the UE receives in the RRC Reconfiguration message the value of a timer T1 that specifies the length of the time window during which the UE monitors the PDCCHs in the source cell in operation F17S10.

In operation F17S3, the UE processes the received RRC Reconfiguration message and checks if "intraHandoverReturnToSourceCell" is indicated or configured by the network. If "intraHandoverReturnToSourceCell" is not indicated, the UE executes operation F17S4. If "intraHandoverReturnToSourceCell" is indicated, the UE executes operation F17S5.

In operation F17S4, the UE switches to the target cell as soon as possible and carries out the normal random access (RA) procedure.

In operation F17S5, in an embodiment of the disclosure, the UE does not reset MAC/RLC layers upon receiving the RRC Reconfiguration message so that it can properly resume data transfer with the source cell when "intraHandoverReturnToSourceCell" is configured by the network. Furthermore, the UE checks if it is time for the UE to send a RA preamble. If "No," the UE goes to operation F17S6. If "Yes," the UE goes to operation F17S7.

In operation F17S6, the UE stays in the source cell and monitors the PDCCHs for DL/UL resource allocation and carries out data transfer. While executing operation F17S6, the UE keeps executing the RA preamble time check portion of operation F17S5.

In operation F17S7, the UE initiates the process of sending the RA Preamble and goes to operation F17S8.

In operation F17S8, the UE checks if the RA preamble has been sent or not. If not, it stays in operation F17S8. If the preamble is sent, the UE goes to operation F17S9.

In operation F17S9, the UE switches to the target cell and starts the time T1. Then, the UE goes to operation F17S10.

In operation F17S10, the UE monitors PDCCHs in the source cell for any DL and UL resource allocation and executes operation F17S11 in parallel as well.

In operation F17S11, the UE checks if the timer T1 has expired. If the timer has expired, the UE goes to operation F17S12. If the timer has not expired, the UE goes to operation F17S10.

In operation F17S12, the UE switches to the target cell and starts the time T2. The timer T2 defines the length of the time during which the UE can expect to receive a RAR from the T-gNB. Then, the UE goes to operation F17S13.

In operation F17S13, the UE monitors PDCCHs in the target cell for a resource allocation for the RAR.

In operation F17S14, the UE checks if the RAR is received. If the RAR has not been received, the UE executes operation F17S15. If the RAR has been received, the UE executes operation F17S18.

In operation F17S15, the UE checks if the timer T2 has expired. If the timer has not expired, the UE goes to operation F17S13. If the timer has expired, the UE goes to operation F17S16.

In operation F17S16, the UE evaluates the need to retransmit a RA preamble. If further retransmission is not needed, the UE goes to operation F17S17. If further retransmission is needed, the UE goes to operation F17S5.

In operation F17S17, the UE considers the RA procedure to be unsuccessful and takes actions accordingly (e.g., cell search).

In operation F17S18, the UE checks if ADS has been configured. If the ADS not been configured, the UE goes to operation F17S20. If the ADS has been configured, the UE goes to operation F17S19. the need to retransmit a RA preamble In operation F17S19, the UE monitors PDCCHs for DL/UL resource allocations and carries out data transfer in the target cell. considers the RA procedure to be unsuccessful and takes actions accordingly (e.g., cell search).

In operation F17S20, the UE stops timer T2 and transmits RACH Msg3 using the allocated resource and considers the RA procedure successful.

While FIGS. 17A and 17B show an example embodiment where timer T1-based time window is used for the user traffic transfer between the UE and the source cell, another equivalent approach utilizes explicit start and end times denoted by startTimeIntraHandoverTrafficTransfer and endTimeIntraHandoverTrafficTransfer in operation F17S2.

Furthermore, while FIGS. 17A and 17B show an example embodiment for a 4-step RA procedure, another embodiment of the disclosure supports the 2-step RA procedure. In case of the 2-step Random Access Procedure, the UE receives from the S-gNB msgA-prach-ConfigurationIndex in operation F17S2 and sends Msg A (i.e., Message A) in operations F17S5, F17S7, F17S8, and F17S16 instead of the RA Preamble.

Figure 18A:
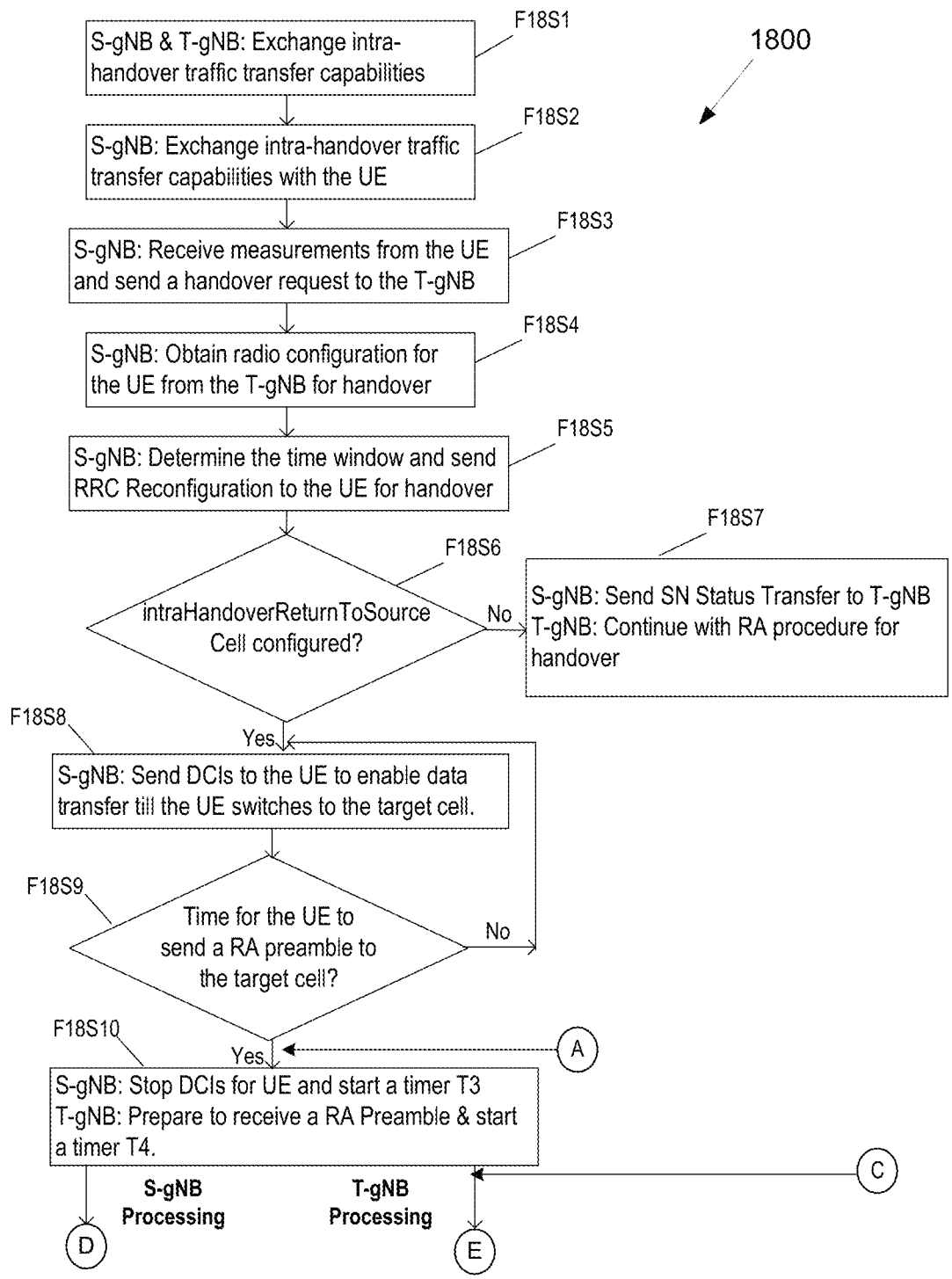
FIGS. 18A, 18B, and 18C illustrate a flow diagram showing an example gNB procedure to reduce propagation delays according to embodiments of the present disclosure.
Figure 18B:
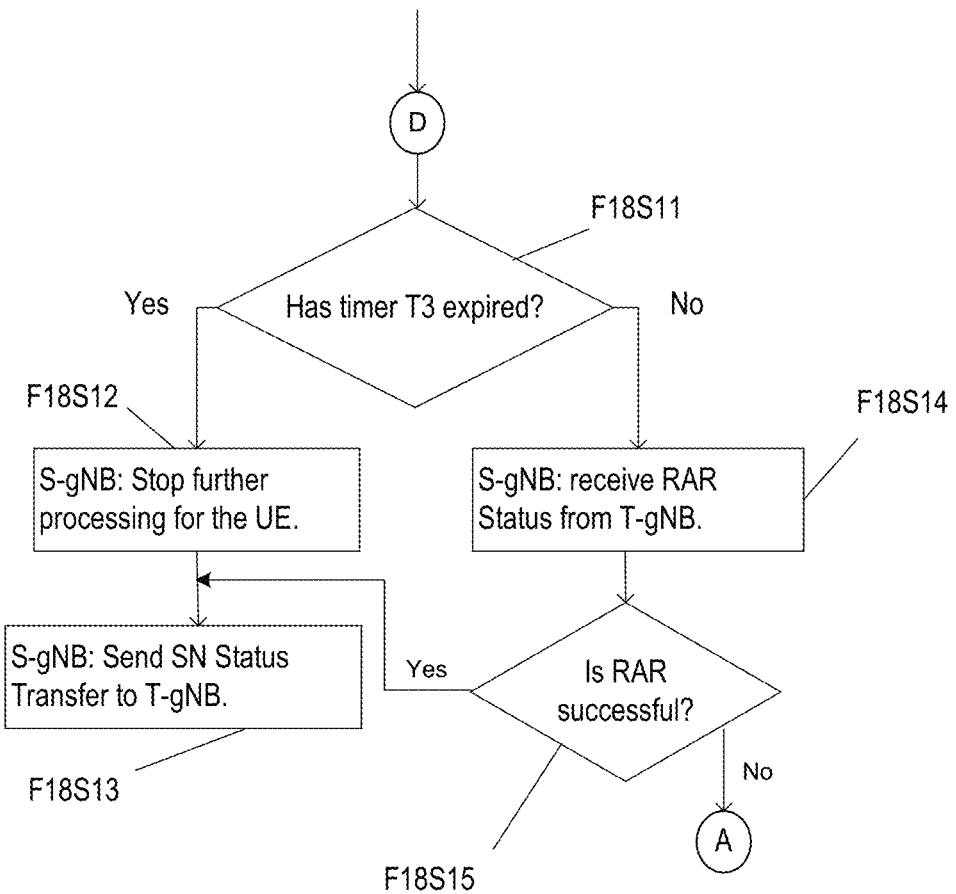
Figure 18C:
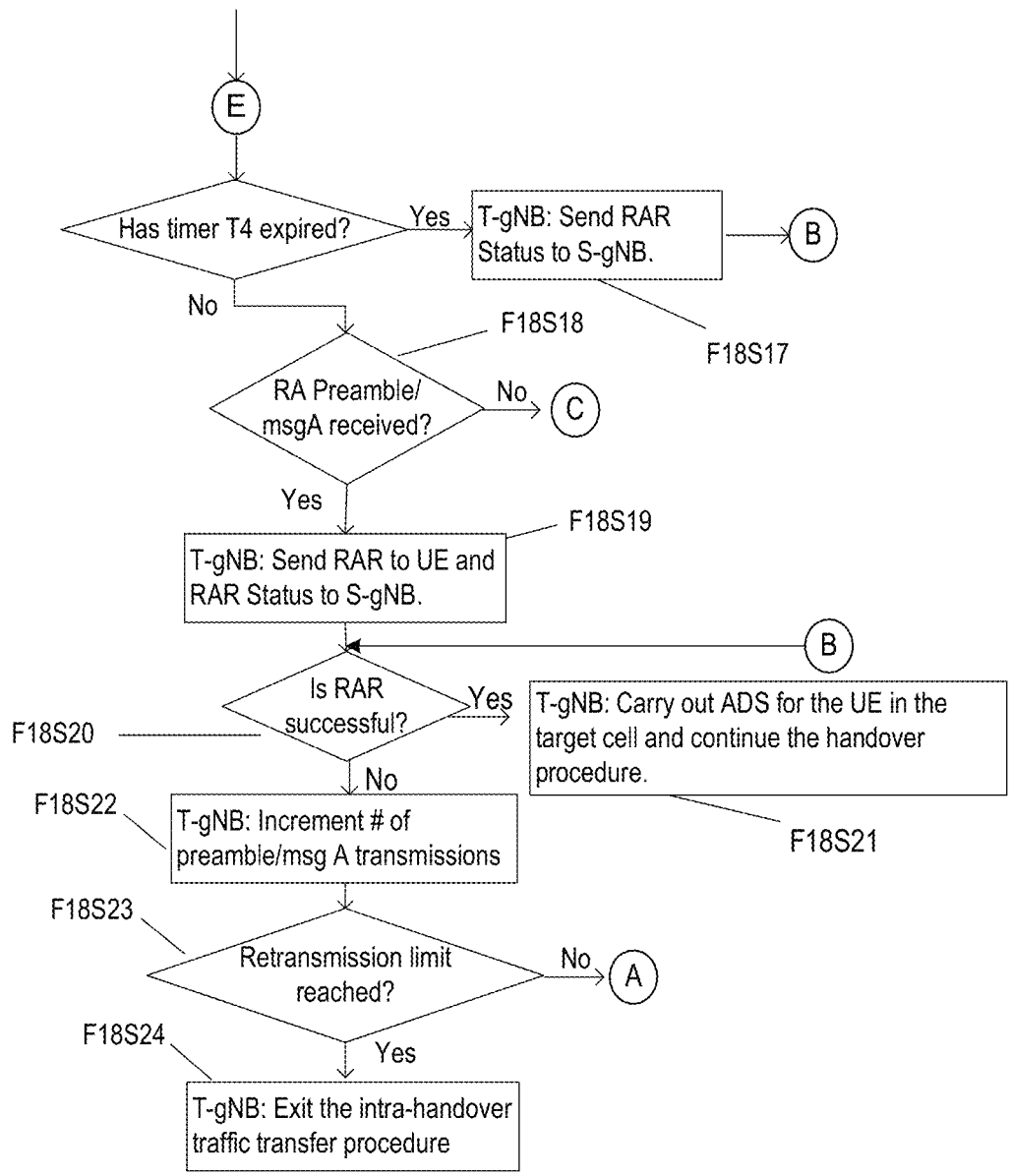

FIGS. 18A, 18B, and 18C illustrate a flow diagram showing an example gNB procedure to reduce propagation delays 1800 according to an embodiment of the present disclosure. The embodiment of the example gNB procedure to reduce propagation delays 1800 illustrated in FIGS. 18A, 18B, and 18C is for illustration only. FIGS. 18A, 18B, and 18C do not limit the scope of this disclosure to any particular implementation of the example gNB procedure to reduce propagation delays 1800.

In operation F18S1, the Source gNB (S-gNB) and the Target gNB (T-gNB) exchange XnAP Xn Setup Request and Xn Setup Response messages to inform each other about their timings and their support for the intra-handover user traffic transfer mechanisms and associated parameters.

In operation F18S1, in an embodiment of the disclosure, to facilitate specification of an instant to the UE, the gNBs inform each other about their (HFN, SFN, Slot, Symbol#) of their serving cells at a specific Reference Time.

In operation F18S1, in an embodiment of the disclosure, the gNBs inform each other about their support for the intra-handover user traffic transfer mechanisms such as (i) the return of the UE to the source gNB after the UE has sent a Random Access preamble or Msg A to the T-gNB and (ii) the support for scheduling mechanisms such as Advanced Dynamic Scheduling (ADS) during handover.

In an example approach, the gNBs also exchange relevant common radio configuration to facilitate intra-handover user traffic transfer such as selected RACH configuration per serving cell. More specifically, the gNBs exchange the information about the ra-ResponseWindow such that the gNBs know about the earliest start time of the RA Response Window relative to the RA preamble timing to support the "intraHandoverReturnToSourceCell" feature.

In an embodiment of the disclosure, to help the T-gNB determine the times when the UE and the S-gNB would be ready to transmit and receive suitable channels and signals, the S-gNB and the T-gNB can also exchange specifics about transport and processing delays including but not limited to: (i) onegNBToAnothergNBXnTransferDelay (i.e., from Source gNB1 to Target gNB2 and from Target gNB2 to Source gNB1) and (ii) XnAPmsgProcessingTimeAtSourcegNB (i.e., the time required by the S-gNB to process an XnAP message received from T-gNB such as Handover Request Acknowledge message).

In operation F18S1, in case a gNB is disaggregated, the gNB-CU and the gNB-DU exchange information about the support for the intra-handover user traffic transfer feature through F1 SETUP REQUEST and F1 SETUP RESPONSE.

In operation F18S2, the S-gNB exchanges capabilities related to the intra-handover user traffic transfer with the UE using UE Capability Enquiry and UE Capability Information messages. In operation F18S2, in an embodiment of the disclosure, the source gNB/eNB may enquire about the UE's support for the overall feature of intra-handover user traffic transfer (e.g., userTrafficTransferDuringHandover, intraHandoverReturnToSourceCell), the UE's support for advanced dynamic scheduling in the target cell, and switching time between the source cell and the target cell using the UE Capability Enquiry message. Furthermore, in operation F18S2, after the UE capability exchange, in an example embodiment, the S-gNB configures the UE using an RRC Reconfiguration message to provide a Buffer Status Report ("handoverBSR_ForReturnToSourceCell") along with a Measurement Report message.

In operation F18S3, in an embodiment of the disclosure, the S-gNB receives from the UE a Buffer Status Report along with the Measurement Report message. This BSR conveys the status of the uplink buffers at the UE (e.g., amounts and type/priority of available UL traffic). Upon receiving this information, the S-gNB makes a handover decision and identifies the T-gNB associated with the target cell for handover. The S-gNB uses the factors such as the UL BSR, the DL buffer, QoS of existing QoS Flows, and the current level of radio resource utilization to decide if an intra-handover user traffic transfer during handover is beneficial and should be activated for the UE or not. In an example approach, the S-gNB makes such decision independently for the DL and the UL.

In operation F18S3, after making a handover decision, the S-gNB sends an XnAP Handover Request message to the T-gNB and includes the UE's capabilities related to the intra-handover user traffic transfer. The S-gNB may also indicate its preference for the method(s) to reduce the user traffic interruption (e.g., UE stays with the target cell or returns to the source cell after receiving the handover command). The S-gNB may include the estimated propagation delay between the UE and the S-gNB in the serving cell. In another approach, the S-gNB provides the current GNSS-based UE location and the GNSS-based platform location to the T-gNB.

In operation F18S4, the S-gNB receives from T-gNB the radio configuration for the UE. Details of these parameters and associated processing at the T-gNB is described next.

In operation F18S4, the T-gNB determines the radio configuration and potentially the intra-handover traffic mechanism(s) and associated parameters (e.g., start time and/or end time of the time window for the UE-S-gNB data transfer and an indication of advanced dynamic scheduling). The T-gNB may let the S-gNB determine the startTimeIntraHandoverTrafficTransfer and endTimeIntraHandoverTrafficTransfer. In an example approach, the T-gNB estimates startTimeIntraHandoverTrafficTransfer based on the PRACH occasion that it has assigned to the UE. The T-gNB determines the specific PRACH occasion for the UE using the available set of PRACH occasions, onegNBToAnothergNBXnTransferDelay, XnAPmsgProcessingTimeAtSourcegNB, and the propagation delay between the S-gNB and the UE. The T-gNB determines startTimeIntraHandoverTrafficTransfer using the following formula: startTimeIntraHandoverTrafficTransfer=prachOccasionTime+ST+timeMargin, (Eq. 1) where prachOccasionTime is the T-gNB-selected instant of the PRACH occasion for the UE's RA Preamble specified by (HFN, SFN, Slot #, Symbol #) in the S-gNB's time reference, ST is the Switching Time, and timeMargin1 is the time margin to account for any inaccuracies or estimation errors. The timing is specified using the reference time at the S-gNB because the user traffic transfer occurs between the UE and the S-gNB.

The T-gNB determines endTimeIntraHandoverTrafficTransfer at the S-gNB using the following formula:

$$endTimeIntraHandoverTrafficTransfer = prachOccasionTime + RTT + preambleProcessingTime\ timeMargin2, \quad (Eq.\ 2)$$

where prachOccasionTime is the T-gNB-selected instant of the PRACH occasion for the UE's RA Preamble specified by (HFN, SFN, Slot #, Symbol #) in the S-gNB's time reference, RTT is the round trip time between the UE and the T-gNB, and timeMargin2 is the time margin to account for any inaccuracies or estimation errors. Just like for Eq. (1), the timing in Eq. (2) is specified using the reference time at the S-gNB because the user traffic transfer occurs between the UE and the S-gNB.

Both Eq. (1) and Eq. (2) specify the times at the UE in the S-gNB's time reference framework. Since gNBs have exchanged their reference times, the T-gNB can translate between its own (HFN, SFN, Slot #, Symbol #) and (HFN, SFN, Slot #, Symbol #) of the S-gNB.

In another embodiment, the T-gNB specifies startTimeIntraHandoverTrafficTransfer and endTimeIntraHandoverTrafficTransfer using its own time reference to let the S-gNB determine startTimeIntraHandoverTrafficTransfer and endTimeIntraHandoverTrafficTransfer in the S-gNB time reference framework.

In an embodiment of the disclosure, the T-gNB determines the maximum number of times a UE can return to the source cell during handover for intra-handover user traffic transfer ("maxReturnsToSourceCell").

In an embodiment of the disclosure, the T-gNB determines the periodicity of the usage of the PRACH occasion (e.g., every X ms) ("periodicityOfPRACHOccasion").

In operation F18S4, in support of advanced dynamic scheduling during handover, the T-gNB determines whether to use advanced dynamic scheduling so that the UE can monitor DL and UL resource allocation DCI Formats (e.g., 0_0, 0_1, 1_0, and 1_1) on a PDCCH with a CRC scrambled by C-RNTI allocated by the target gNB/eNB (in addition to RA-RNTI) beginning at the time the UE expects to receive the Random Access Response message.

As part of operation F18S4, if the gNB is disaggregated, a suitable UE context to enable the "intra-HandoverReturnToSourceCell" feature is created using UE CONTEXT SETUP REQUEST and UE CONTEXT SETUP RESPONSE. Furthermore, based on the gNB implementation, UE CONTEXT MODIFICATION REQUEST and UE CONTEXT MODIFICATION RESPONSE are used to modify the UE context to reflect handover.

Toward the end of operation F18S4, the S-gNB received from the T-gNB a Handover Request Acknowledge message and indicates its preference for the method(s) to reduce the user traffic interruption (e.g., UE stays with the target cell or returns to the source cell after receiving the handover command). Based on the selected intra-handover user traffic transfer method (e.g., "handoverBSR_ForReturnToSourceCell"), the T-gNB includes the user traffic transfer related parameters that it has determined. The final decision of the specific intra-handover user traffic transfer mechanism can be made by the S-gNB or the T-gNB.

In operation F18S5, the S-gNB processes the Handover Request Acknowledge Message and (if needed) determines the mechanism for the intra-handover user traffic transfer based on the factors such as the latest UL BSR and DL buffer status, QoS, and resource utilization. In an example approach, the S-gNB also decides startTimeIntraHandoverTrafficTransfer and endTimeIntraHandoverTrafficTransfer in its own reference time framework based on these timings represented by the T-gNB in the gNB's reference time framework.

Furthermore, in operation F18S5, the S-gNB sends the RRC Reconfiguration message to the UE, which conveys an indication for "intraHandoverReturnToSourceCell," startTimeIntraHandoverTrafficTransfer, endTimeIntraHandoverTrafficTransfer, maxReturnsToSourceCell, periodicityOfPRACHOccasion, and an indication of advanced dynamic scheduling (ADS) in an embodiment of the disclosure. In an embodiment of the disclosure, the S-gNB does not immediately send the SN Transfer message to the T-gNB but does so in operation F18S7 or operation F18S13 based on the status of "intraHandoverReturnToSourceCell"

In operation F18S6, the S-gNB checks if "intraHandoverReturnToSourceCell" has been configured for the UE or not. Note that such decision may be made by the S-gNB or the T-gNB. If "intraHandoverReturnToSourceCell" has not been configured, operation F18S7 is executed; otherwise operation F18S8 is executed.

In operation F18S7, S-gNB sends the SN Status Transfer message to T-gNB to inform the T-gNB about its transmitter and receiver status at the PDCP layer. Furthermore, the T-gNB continue with RA procedure for handover.

In operation F18S8, the S-gNB sends DCIs to the UE to enable data transfer till the UE switches to the target cell. operation F18S8 and operation F18S9 are executed by the S-gNB in parallel.

In operation F18S9, in an embodiment of the disclosure, the S-gNB checks if it is time for the UE to switch to the target cell to send a RA preamble. If such time has not yet arrived, operation F18S8 is executed. If such time has arrived, operation F18S10 is executed.

In operation F18S10, the S-gNB stops sending DCIs for UE and starts a timer T3. The timer T3 specifies the amount of the S-gNB waits for a message from the T-gNB about the RAR status. The T-gNB prepares to receive a RA Preamble from the UE and starts a timer T4. The timer T4 is the time period during which the T-gNB expects to receive the RA preamble from the UE based on the RACH configuration that it has specified for the UE in operation F18S4.

The operations F18S11 to F18S15 are executed by the S-gNB, and the operations F18S16 to F18S24 are executed by the T-gNB.

In operation F18S11, the S-gNB checks if the timer T3 has expired or not. If it has, operation F18S12 is executed; otherwise, operation F18S14 is executed.

In operation F18S12, the S-gNB stops further processing for the UE and does not plan to resume the data transfer with the UE.

In operation F18S13, the S-gNB sends the SN Status Transfer message to T-gNB. In another example embodiment, in case of successful RAR, the S-gNB provides the latest DL and UL BSRs for the UE to the T-gNB so that the T-gNB determine suitable radio resource allocation for the UE.

In operation F18S14, while the timer T3 is running, the S-gNB receives the RAR Status for the UE from the T-gNB.

In operation F18S15, the S-gNB checks if the T-gNB has sent an RAR indicating successful reception of the RA preamble from the UE in case of the 4-step RA procedure. In case of the 2-step RA procedure, the RAR status indicates successful reception of msgA (containing an RA preamble and an RRC Reconfiguration Complete message) from the UE. If the RAR status is successful, operation F18S13 is executed. In the absence of a successful RAR for the UE, operation F18S10 is executed.

In operation F18S16, the T-gNB checks if the timer T4 has expired or not. If it has, operation F18S17 is executed; otherwise, operation F18S18 is executed.

In operation F18S17, in an embodiment of the disclosure, the T-gNB sends an RAR status message to inform the S-gNB that it has not successfully received the UE's RA preamble. This prepares the S-gNB to resume the data transfer with the UE in the source cell based on the periodicity of the RACH resources configured for the UE by the T-gNB (i.e., periodicityOfPRACHOccasion).

In operation F18S18, the T-gNB checks if RA Preamble/msgA has been received from the UE or not. If the T-gNB has successfully received RA Preamble/msgA from the UE, operation F18S19 is executed; otherwise, operation F18S16 is executed.

In operation F18S19, the T-gNB sends a successful RAR to UE in case of a 4-step RA procedure or a successful msgB to the UE in case of the 2-step RA procedure. Furthermore, in an embodiment of the disclosure, the T-gNB sends an RAR status message to the S-gNB. This helps the S-gNB determine if it can expect the UE to return to the source cell to resume data transfer or not. In another example embodiment, in case of successful RAR, the T-gNB received from the S-gNB the latest DL and UL BSRs for the UE so that the T-gNB determine suitable radio resource allocation for the UE.

In operation F18S20, the T-gNB checks if it has sent a successful RAR to the UE or not. If it has, operation F18S21 is executed; otherwise, operation F18S22 is executed.

In operation F18S21, in an embodiment of the disclosure, if the T-gNB has configured ADS for the UE, the T-gNB carries out ADS for the UE in the target cell by allocating DL and/or UL resources instead of waiting for the RRC Reconfiguration Complete message to arrive from the UE in case of the 4-step RA procedure. Furthermore, the T-gNB continues with the ongoing handover procedure. In an embodiment of the disclosure, after receiving the successful RAR, the T-gNB also receives a BSR and PDCP SN Status from the UE so that the T-gNB is aware of the latest status of the UL buffer, the UL transmitter, and the DL receiver at the UE.

In operation F18S22, the T-gNB increments the number of preamble/msg A transmissions carried out so far.

In operation F18S23, the T-gNB evaluates if the limit on the number of retransmissions (i.e., maxReturnsToSourceCell) is reached. If it is, operation F18S24 is executed; otherwise, operation F18S10 is executed to enable the UE to return to the source cell to resume data transfer.

In operation F18S24, the T-gNB exits the intra-handover user traffic transfer procedure for the UE.

In another embodiment of the disclosure, in an NTN, propagation delays can be quite long, often on the order of tens of milliseconds for LEO satellites or hundreds of milliseconds for GEO satellites. A typical handover-triggering Measurement Report may arrive too late at a gNB, and the source cell signal may deteriorate significantly by the time the handover is made. Furthermore, the target cell may cause high interference until the time the handover is made.

Reference Signal Received Powers (RSRPs) from the source cell and the neighbor cells may have similar signal strengths in the handover region in an NTN. Hence, RSRP by itself may not be very reliable in an NTN.

There are new triggers that can be used in addition to the traditional quantities such as RSRP, RSRQ, and SINR [TR38.821]. Examples of these new triggers the GNSS-based UE location, a timer (e.g., time since last handover), timing advance to the target cell, and the satellite elevation angle.

The reliability or the accuracy of a given measurement trigger may not be known with a high degree of confidence until initial NTN deployments occur and suitable testing is carried out.

While a given measurement trigger (e.g., RSRP or a new trigger) may not be adequate by itself (i.e., individually) but certain combinations may be reliable.

Figure 19:
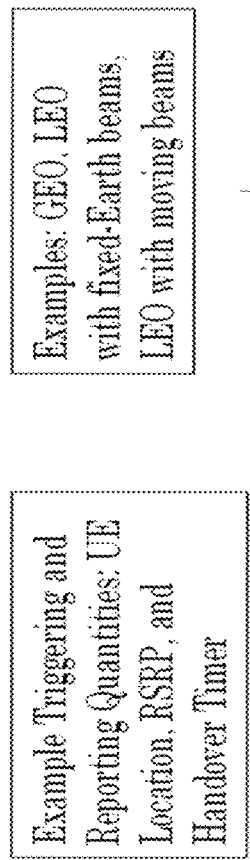
FIG. 19 illustrates an example of an overall mechanism of enhanced measurement configuration and measurement reporting for an NTN according to embodiments of the present disclosure.

FIG. 19 illustrates an example of an overall mechanism of enhanced measurement configuration and measurement reporting for an NTN 1900 according to an embodiment of the present disclosure. The embodiment of the example overall mechanism of enhanced measurement configuration and measurement reporting for an NTN 1900 illustrated in FIG. 19 is for illustration only. FIG. 19 does not limit the scope of this disclosure to any particular implementation of the example overall mechanism of enhanced measurement configuration and measurement reporting for an NTN 1900.

As illustrated in FIG. 19, a gNB receives information regarding available triggering quantities, available reporting quantities, and NTN type, and transmits information regarding measurement configuration. For example, information regarding available triggering and reporting quantities may be information about UE location, RSRP, and a handover timer. The information regarding NTN type may include GEO, LEO with fixed-earth beams, or LEO with moving beams. The information regarding measurement information may be even type(s), report type, triggering quantities, reporting quantities, # and periodicity of historical measurements, and trigger combining method.

Figure 20:
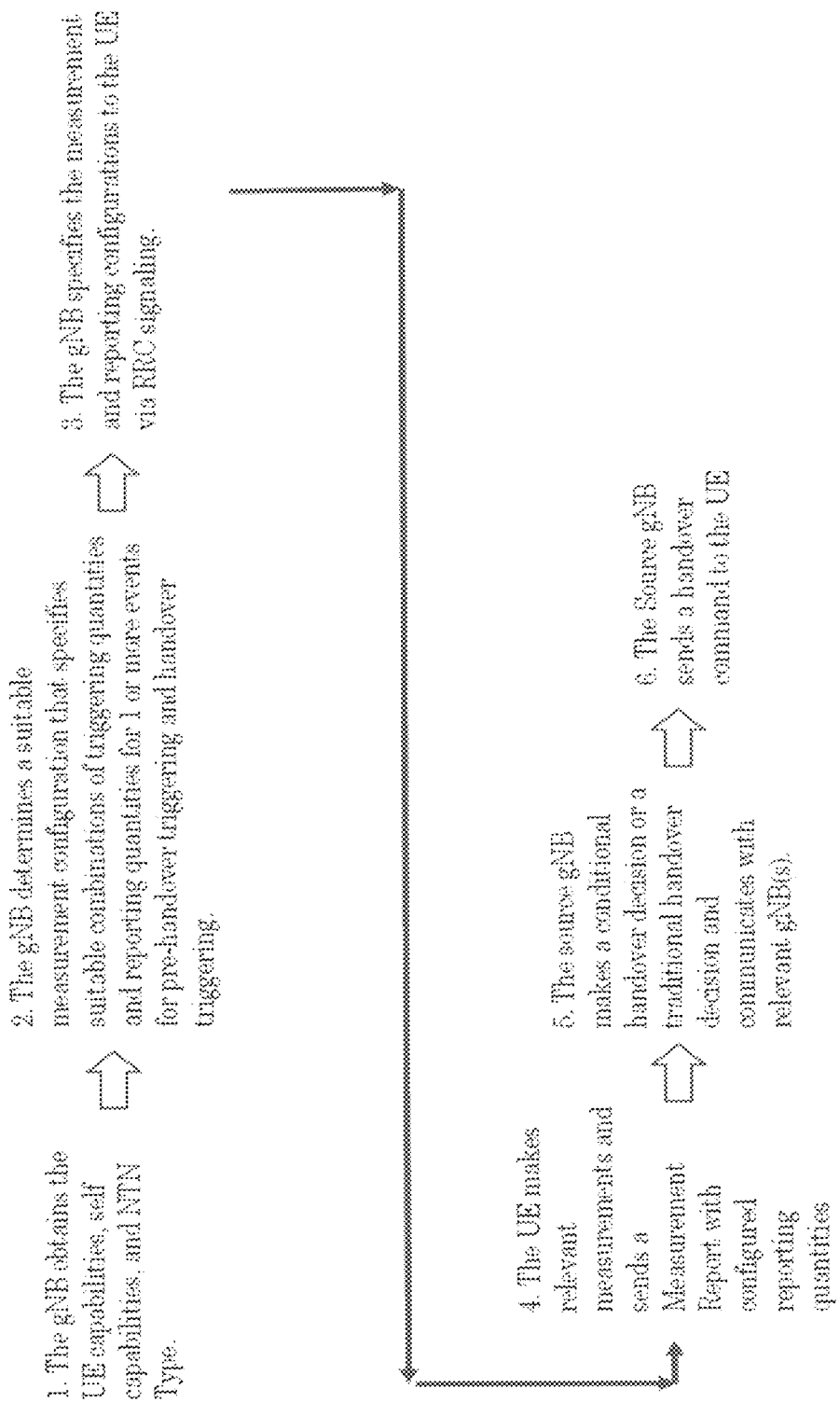
FIG. 20 illustrates an example of an enhanced measurement configuration and measurement reporting in support of handover in an NTN according to embodiments of the present disclosure.

FIG. 20 illustrates an example of an enhanced measurement configuration and measurement reporting in support of handover in an NTN 2000 according to an embodiment of the present disclosure. The embodiment of the example of an enhanced measurement configuration and measurement reporting in support of handover in an NTN 2000 illustrated in FIG. 20 is for illustration only. FIG. 20 does not limit the scope of this disclosure to any particular implementation of the example of an enhanced measurement configuration and measurement reporting in support of handover in an NTN 2000.

As illustrated in FIG. 20, the gNB obtains the UE capabilities, self-capabilities, and NTN type. The gNB determines a suitable measurement configuration that specifies suitable combinations of triggering quantities and reporting quantities for one or more events for pre-handover triggering and handover triggering. The gNB specifies the measurement and reporting configurations to the UE via RRC signaling. The UE makes relevant measurements and sends a measurement report with configured reporting quantities. The source gNB makes a conditional handover decision or a traditional handover decision and communicates with relevant gNB s. The source gNB sends a handover command to the UE.

Figure 21:
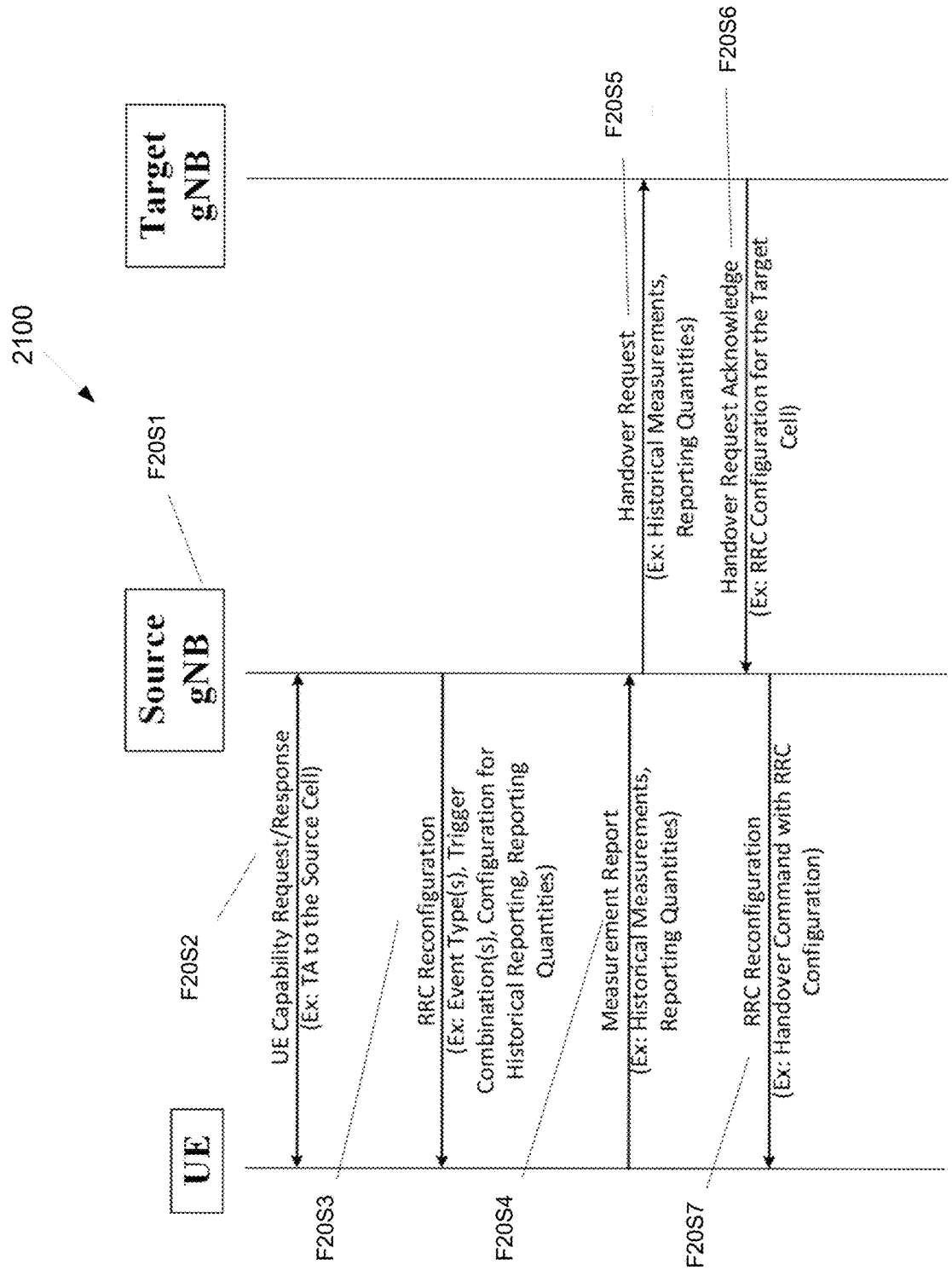
FIG. 21 illustrates a flow diagram showing an example of an enhanced measurement configuration and reporting in support of handover in an NTN according to embodiments of the present disclosure.

FIG. 21 illustrates a flow diagram showing an example of an enhanced measurement configuration and reporting in support of handover in an NTN 2100 according to an embodiment of the present disclosure. The embodiment of the example of an enhanced measurement configuration and reporting in support of handover in an NTN 2100 illustrated in FIG. 21 is for illustration only. FIG. 21 does not limit the scope of this disclosure to any particular implementation of the example of an enhanced measurement configuration and reporting in support of handover in an NTN 2100.

In operation F21S1, the gNB obtains its configuration and measurement-processing capabilities and chooses a candidate set of triggering quantities, trigger-combining methods, reporting quantities, and the handover decision-making approach, which are optimal for a given NTN Type. In an example implementation, the gNB would choose a handover approach per NTN Type. For instance, the gNB may select a handover approach that makes a handover decision for the UE even when the UE is in the center of the cell when the NTN Type is "Earth-fixed cells with steerable beams," because the new cell and the old cell have similar (ideally, identical) coverage and the UEs need to be moved from the old cell (that is going below the horizon, for example) to the new cell within a certain time window. In contrast, in case of continuously-moving beams and cells, the gNB may select a handover approach that makes a handover decision when the UE near the cell edge when the NTN Type is "Earth-moving cells with moving beams." Furthermore, the gNB may decide which measurements it prefers as triggers and reporting quantities based on its own capabilities and implementation of the handover algorithm.

In operation F21S2, the UE and the gNB exchange UECapabilityEnquiry/UECapabilityInformation messages. In one approach, the network can ask the UE if it supports measurements and/or reporting of certain quantities that are particularly useful for an NTN such as the GNSS-derived UE location, GNSS-derived UE location based estimates of quantities (e.g., distance from the center of the serving cell), and elevation angles for the serving and neighbor cells. The UE, on its own or in response to the network's request, can inform the network if it supports measurements and/or reporting of these quantities.

In operation F21S2, in an embodiment of the disclosure, the UE informs the network if it supports reporting of its timing advance (TA) used in the currently serving cell. In another embodiment, the reporting of TA is mandatory for the UE. The TA is used by the UE to adjust its transmission time such that the gNB receives signals from all UEs in the cell at (approximately) the same time.

In an example embodiment of the disclosure, TA can be expressed (i) as an absolute TA in one approach or (ii) as a relative or incremental value compared to the center of the serving cell. The use of the relative or incremental value can be more efficient from a signaling perspective, because fewer bits can represent a given incremental TA value. In large cells, there could be a large TA difference between the center of the cell and the cell edge. The TA can be used as an indicator of how far the UE is from the center of the serving cell. If the TA is relatively small, the UE is closer to the center of the cell and handover is not needed or desirable in case of moving beams/cells. If the TA is relatively large, it can indicate that the UE is in the handover region. Hence, for large TA values, the source cell can be more confident in handing over the UE to a suitable neighbor cell in case of moving beams/cells, leading to a more reliable handover.

In another embodiment of the disclosure, the UE may indicate its support for the distance estimation using the TA. The support for the distance estimation may be optional or mandatory for the UE. the distance can be estimated to be (i) between the center of the serving cell on the ground and the current UE location or (i) between the satellite and the current UE location. In one possible implementation, the speed of light and the TA can be used to estimate the distance. Such distance estimation can be used for GNSS-capable UEs and non-GNSS-capable UEs. The UE may support TA-based distance estimation only, GNSS-derived location-based distance estimation only, or both.

In operation F21S3, the gNB provides the measurement configuration to the UE using an RRC message such as the RRC Reconfiguration message, which includes details of the triggers for UE's measurement reports and the reporting quantities. Most embodiments of this disclosure are related to this operation, which pertain to the Trigger Classification, Standalone Triggers and Combined Triggers, Event Type, Reporting Quantities, and Historical Measurements configured by the gNB for the UE.

Trigger Classification

For Trigger Classification, two classes can be implemented in one approach—"Early Reporting Trigger" and "Regular Reporting Trigger." These classes can be explicitly created and specified in one method. In another implementation method, these classes can be created implicitly by the gNB. Examples of key differences between these classes are as follows: (i) The "Early Reporting Trigger" is intended to occur in advance of the actual handover to address the challenge of long propagation delays. (ii) The "Early Reporting Trigger" provides most relevant measurements in the recent past that can facilitate development of an intelligent algorithm that predicts selected measurements in near future. (iii) The "Early Reporting Trigger" measurements can be used to make resource reservations at multiple neighbors before the "Regular Reporting Trigger" related measurement report becomes available at the source gNB. Hence, the overall handover delay is reduced. (iv) A key distinction between the two classes of trigger is that the "Regular Reporting Trigger" results in the source gNB sending a handover command to the UE (after suitable interactions with the target gNB), while the "Early Reporting Trigger" is not immediately followed by the source gNB sending a handover command to the UE. Indeed, here is the typical sequence in an example implementation of the disclosure: (I) a Measurement Report associated with the "Early Reporting Trigger" sent by the UE, (II) a Measurement Report associated with the "Early Reporting Trigger" sent by the UE, and (III) an RRC Reconfiguration message from the source gNB to the UE that carries a handover command.

Standalone Triggers—"Early Reporting Trigger"

To implement "Early Reporting Trigger," an embodiment of the disclosure uses time or timer as a standalone quantity. For example, the expected time of handover based on predictable satellite movements, the approximate time of handover can be estimated.

In one possible approach, the gNB uses time based trigger as a standalone trigger to determine an instant at which the UE should start making measurements for "Early Reporting Trigger." For example, if (Time>Threshold_Time_NTN), the UE sends a Measurement Report. Here, "Time" is the current time. In an example approach, the gNB specifies Threshold_Time_NTN as (i) UTC time or (ii) NR time such as (HFN, SFN, Slot #). This NR time may be modified by a configurable scaling to cover the time period till handover.

In another possible approach, the gNB uses a timer based trigger as a standalone trigger to determine an instant at which the UE should start making measurements for "Early Reporting Trigger." More specifically, if Timer>Threshold_Timer_NTN, the UE sends a Measurement Report. In this case, "Timer" is the current value of the timer. In one implementation, such timer is started when the UE receives the RRC Reconfiguration message from the Target gNB (which later becomes the Serving gNB). The gNB configures Threshold_Timer_NTN for the UE. To implement "Early Reporting Trigger," another embodiment of the disclosure uses the absolute or relative TA for the serving cell as a standalone quantity. For example, if TA>Threshold_TA_NTN, the UE sends a Measurement Report after collecting N instances of measurements. The gNB configures Threshold_TA_NTN for the UE.

To implement "Early Reporting Trigger," another embodiment of the disclosure uses the distance from the center of the serving cell as a standalone quantity. For example, if (distance>Threshold_Distance_NTN), the UE sends a Measurement Report after collecting N instances of measurements. In one approach, the distance is estimated by the UE based on its GNSS-derived location and/or TA. The gNB configures Threshold_Distance_NTN for the UE.

To implement "Early Reporting Trigger," another embodiment of the disclosure uses the serving cell's elevation angle as a standalone quantity. For example, if (serving cell elevation angle>Threshold_ServingElevationAngle_NTN), the UE sends a Measurement Report after collecting N instances of measurements. In this formula, the elevation angle is 90° when an NTN cell's satellite is directly above the head and increases as the NTN cell continues to move away from the UE. The gNB configures Threshold_ServingElevationAngle_NTN for the UE.

To implement "Early Reporting Trigger," another embodiment of the disclosure uses a neighbor cell's elevation angle as a standalone quantity. For example, if (neighbor cell elevation angle>Threshold_NeighborElevationAngle_NTN), the UE sends a Measurement Report after collecting N instances of measurements. In this formula, the elevation angle is 90° when an NTN cell's satellite is directly above the head and increases as the NTN cell continues to move away from the UE. The gNB configures Threshold_NeighborElevationAngle_NTN for the UE.

To implement "Early Reporting Trigger," another embodiment of the disclosure uses the absolute difference in signal measurements between the serving cell and a neighbor cell as a standalone quantity. For example, if (absolute (neighbor cell measurement−serving cell measurement) <AbsoluteDifference_ServingNeighbor) continues to be satisfied for the duration of timeToTrigger, the UE starts making measurements and sends a Measurement Report after collecting N instances of measurements. The example signal measurements include RSRP, RSRQ, and SINR. The gNB configures AbsoluteDifference_ServingNeighbor and timeToTrigger for the UE.

To implement "Early Reporting Trigger," the existing Events A1 to A6 can also be used, where measurements such as RSRP, RSRQ, and SINR are used.

Standalone Triggers—"Regular Reporting Trigger"

To implement "Regular Reporting Trigger," an embodiment of the disclosure uses time or timer as a standalone quantity.

In one possible approach, the gNB uses time based trigger as a standalone trigger. For example, if (Time>Threshold1_Time_NTN), the UE sends a Measurement Report. Here, "Time" is the current time. In an example approach, the gNB specifies Threshold1_Time_NTN as (i) UTC time or (ii) NR time such as (HFN, SFN, Slot #). This NR time may be modified by a configurable scaling to cover the time period till handover.

In another possible approach, the gNB uses a timer based trigger as a standalone trigger. More specifically, if Timer>Threshold1_Timer_NTN, the UE sends a Measurement Report. In this case, "Timer" is the current value of the timer. In one implementation, such timer is started when the UE receives the RRC Reconfiguration message from the Target gNB (which later becomes the Serving gNB). The gNB configures Threshold1_Timer_NTN for the UE.

To implement "Regular Reporting Trigger," another embodiment of the disclosure uses the absolute or relative TA for the serving cell as a standalone quantity. For example, if TA>Threshold1_TA_NTN, the UE sends a Measurement Report. The gNB configures Threshold1_TA_NTN for the UE.

To implement "Regular Reporting Trigger," another embodiment of the disclosure uses the absolute or relative TA for a neighbor cell as a standalone quantity. For example, if TA<Threshold2_TA_NTN, the UE sends a Measurement Report. The gNB configures Threshold1_TA_NTN for the UE.

To implement "Regular Reporting Trigger," another embodiment of the disclosure uses the distance from the center of the serving cell as a standalone quantity. For example, if (distance>Threshold1_Distance_NTN), the UE sends a Measurement Report. In one approach, the distance is estimated by the UE based on its GNSS-derived location and/or TA. The gNB configures Threshold1_Distance_NTN for the UE.

To implement "Regular Reporting Trigger," another embodiment of the disclosure uses the distance from the center of a neighbor cell as a standalone quantity. For example, if (distance<Threshold2_Distance_NTN), the UE sends a Measurement Report. In one approach, the distance is estimated by the UE based on its GNSS-derived location and/or TA. The gNB configures Threshold2_Distance_NTN for the UE.

To implement "Regular Reporting Trigger," another embodiment of the disclosure uses the serving cell's elevation angle as a standalone quantity. For example, if (serving cell elevation angle>Threshold1_ServingElevationAngle_NTN), the UE sends a Measurement Report. In this rule, the elevation angle is 90° when an NTN cell's satellite is directly above the head and increases as the NTN cell continues to move away from the UE. The gNB configures Threshold1_ServingElevationAngle_NTN for the UE.

To implement "Regular Reporting Trigger," another embodiment of the disclosure uses a neighbor cell's elevation angle as a standalone quantity. For example, if (neighbor cell elevation angle>Threshold1_NeighborElevationAngle_NTN), the UE sends a Measurement Report. In this rule, the elevation angle is 90° when an NTN cell's satellite is directly above the head and increases as the NTN cell continues to move away from the UE. The gNB configures Threshold1_NeighborElevationAngle_NTN for the UE.

To implement "Regular Reporting Trigger," another embodiment of the disclosure uses the absolute difference in signal measurements between the serving cell and a neighbor cell as a standalone quantity. For example, if (absolute (neighbor cell measurement–serving cell measurement) <AbsoluteDifference1_ServingNeighbor) continues to be satisfied for the duration of timeToTrigger, sends a Measurement Report. The example signal measurements include RSRP, RSRQ, and SINR. The gNB configures AbsoluteDifference1_ServingNeighbor and timeToTrigger for the UE.

To implement "Regular Reporting Trigger," the existing Events A1 to A6 can also be used, where measurements such as RSRP, RSRQ, and SINR are used.

Combined Triggers for "Early Reporting Trigger" and "Regular Reporting Trigger"

To implement "Early Reporting Trigger" and/or "Regular Reporting Trigger," the standalone quantities such as signal measurement (e.g., RSRP, RSRQ, and SINR), time, timer, UE's distance from the center of the serving cell, UE's distance from the center of a neighbor cell, serving cell elevation angle, neighbor cell elevation angle, and signal strength difference can be combined in a flexible manner. The representation of a given triggering condition using an event type is discussed later, examples of specific combinations of quantities to create a given trigger are given below.

In an embodiment of the disclosure, individual quantity-based triggers ("individual triggers") defined earlier are combined in a highly flexible manner to create a multi-quantity trigger for "Early Reporting Trigger" and/or "Regular Reporting Trigger": (A) time/timer trigger OR serving cell elevation trigger, (B) time/timer trigger AND serving elevation trigger, (C) time/timer trigger OR distance trigger, (D) time/timer trigger AND distance trigger, (E) time/timer trigger OR serving cell TA trigger, (F) time/timer trigger AND serving cell TA trigger, (G) time/timer trigger AND traditional "neighbor offset better than serving/PCell" (including a negative offset), (H) TA trigger AND traditional "neighbor offset better than serving/PCell" (including a negative offset), (I) Serving Cell Elevation Angle trigger AND traditional "neighbor offset better than serving/PCell" (including a negative offset), (J) Neighbor Cell Elevation Angle trigger AND traditional "neighbor offset better than serving/PCell" (including a negative offset), and (K) Serving/Neighbor Cell Distance trigger AND traditional "neighbor offset better than serving/PCell" (including a negative offset).

Multiple thresholds can be defined for a given quantity in support of different combination triggers. For example, in one of the combination triggers (A to K in our example), time/trigger may use the same threshold value in A to G, different threshold values in A to G or reuse a given threshold value in more than one cases.

Extension of Triggers

The distance between the UE and the cell can calculated as the distance between the UE and the Reference Point of the cell (i.e., the serving cell as well as a neighbor cell). Such distance can be combined with other triggers to create a combination trigger. For example, if the (UE-neighbor cell distance<Threshold1) AND (neighbor RSRP>Threshold2) AND (serving RSRP<Threshold3), the event is triggered, and the UE sends a measurement report message to the serving cell.

In an example embodiment of the disclosure, new NTN-specific trigger is combined with an R16 trigger (e.g., A1 to A6) to create a combination trigger.

The use of the propagation delay difference between the serving cell and a neighbor cell as a trigger can be viewed as a proxy for the distance differences between the serving cell and the neighbor cell.

The use of the absolute time as a trigger is equivalent to the timer as a trigger.

In an example embodiment, a location-based trigger uses the UE location to estimate if a UE in the "Inner Area" of a cell. In such case, the gNB broadcasts characteristics of the NTN cell such as the location of the Reference Point (e.g., cell center), major axis of the elliptical NTN cell, and minor axis of the elliptical cell. In one approach, the axes correspond to the entire cell. In another approach, the axes correspond to the IA of the cell. The UE can then determine if it is in the IA or not. A standalone location-based trigger takes the form of "If UE location outside the IA, send the measurement report."

The combination trigger can combine such location-trigger with other triggers mentioned above.

Depending upon the type of the beam, the NTN cell characteristics may be time-varying and in such case, the gNB broadcasts multiple instances of the cell characteristics along with suitable timestamps.

To facilitate the search of a neighbor cell, in an example embodiment, the gNB broadcasts multiple instances of SMTC window and/or measurement window configurations along with suitable timestamps per neighbor cell or a set of neighbor cells. The UE can then use relevant SMTC window and/or measurement window configuration at a given instant to search for neighbor cells.

The combination trigger is applicable to traditional handover measurement triggering, Conditional Handover (CHO) measurement triggering, and CHO execution condition.

Event Type

For the Event Type, an embodiment of the disclosure envisions a major event such as "Conditions for an individual trigger or a combination of triggers satisfied for an NTN" for an efficient and compact structure of the measurement configuration. In another embodiment, multiple event types are supported. Events A1 to A6 are defined for intra-NR measurement reporting events in Release 16. As an example, popular Event A3 refers to the condition where "a neighbor becomes offset better than SpCell (i.e., special cell or the serving cell)." Hence, a new event such as A7 and beyond can be defined to support new triggering quantities and reporting quantities for an NTN. The Event Type is discussed from the structure perspective next.

The Event Type helps implement "Early Reporting Trigger" and "Regular Reporting Trigger." The Event Type corresponds to a triggering condition that uses a trigger based on an individual quantity (e.g., serving cell TA) or a certain combination of triggers using multiple quantities (e.g., serving cell TA and serving cell elevation angle). The Event Type can be defined in multiple ways. In one embodiment, multiple distinct events are specified as mentioned above, with each event associated with one triggering condition. Such embodiment is similar in concept to the existing Release 16 methodology, where each of the Events A1 to A6 has only one triggering condition or rule (e.g., "neighbor offset better than SpCell" or "SpCell becomes worse than threshold1 and neighbour becomes better than threshold2").

In another embodiment for the event type, one event type or a limited number of event types are defined and the individual triggers or combinations of triggers are specified in a compact manner. For example, N sets can be created and relationships (e.g., AND relationship and OR relationship) among the N sets are defined. For example, there could be two sets, Set 1 and Set 2, and the relationship between two sets could be OR. In such case, the Measurement Report is sent if Set 1 triggering condition is satisfied or Set 2 triggering condition is satisfied. Within a set, there could be multiple individual triggering conditions are combined. For example, a time-based trigger and the serving cell elevation angle can be combined using an OR condition to create the Set 1 combined trigger. In such case, the UE meets the Set 1 triggering condition if the time exceeds a threshold OR the serving ell elevation angle exceeds a threshold. In another example, a time-based trigger and the serving cell elevation angle can be combined using an AND condition to create the Set 1 combined trigger. In this second case, the UE meets the Set 1 triggering condition if the time exceeds a threshold AND the serving ell elevation angle exceeds a threshold. The gNB can represent quantities, triggers, and sets using suitable bitmaps and indexes.

In support of "Early Reporting Trigger" and "Early Reporting Trigger," the gNB configures the UE with the number of measurements, the quantities that should be measured, estimated, and/or recorded, periodicity of measurements (which can be the same or different for different quantities).

After "Early Reporting Trigger" condition is satisfied, the UE starts making measurements of configured quantities, records configured instances of measurements with a configurable periodicity between the successive measurements, and sends a Measurement Report. After "Regular Reporting Trigger" condition is satisfied, the UE sends a Measurement Report containing N most recent measurement (or fewer of all N are not available) of configured reporting quantities.

Reporting Quantities

The gNB configures the UE with the specific reporting quantities. In addition to the traditional (RSRP, RSRQ, and SINR per beam per cell for a configurable number of beams), the gNB can now configure the UE with new quantities.

In an embodiment of the disclosure, the UE reports the Timing Advance for the currently serving cell. As mentioned earlier, this TA may be an absolute TA or TA relative to the center of the cell.

In an embodiment of the disclosure, the UE reports the Timing Advance for the currently serving cell. As mentioned earlier, this TA may be an absolute TA or TA relative to the center of the cell.

In another embodiment, the UE may report the distance to the center of the serving cell. The distance may be estimated by the UE based on the factors such as the TA and the GNSS-based UE location based on the UE capabilities and the gNB-specified configuration. In another embodiment, the UE may report the distance to the airborne or space-borne platform that is associated with the NTN cell.

In an embodiment of the disclosure, as far as signal measurements are concerned, the UE reports one or more of RSRP, RSRQ, and SINR for the serving cell and top N neighbor cells (e.g., N neighbor cells and M strongest beams per cell, prioritized per any of the quantity such as RSRP, RSRQ, and SINR with RSRP being the most useful one). The RSRP measurement (or RSRQ and SINR as other examples) of the reported neighbor cell must be greater than the cell selection threshold but may or may not meet the signal strength criterion relative to the serving cell (e.g., Event A3 criterion).

Examples of other quantities that the gNB can configure the UE for reporting include elevation angles for the serving cell and up to N1 neighbor cells, TAs for the serving and up to N2 neighbor cells, distances to the centers of the serving cell and up to N3 neighbor cells, and distances to the platforms of the serving cell and up to N4 neighbor cells. N1 to N4 are configured by the gNB and can be the same or different. Additionally, in an embodiment of the disclosure, signal strength related conditions may be imposed.

Historical Measurements

In an embodiment of the disclosure, the gNB configures the UE with a configurable number of measurements (numMeasurements) and the periodicity of measurements (periodicityMeasurements) per selected reporting quantity for the events associated with "Early Reporting Trigger" and/or "Regular Reporting Trigger." Hence, when a UE sends a Measurement Report upon meeting a triggering condition, all historical numMeasurements are included in a single report. Such reporting is different from SON/MDT logged mode reporting, where the idle mode UE makes measurements, stores them, and reports them after entering the Connected Mode (after sending an indication to a gNB and getting a report request from a gNB). This is also different from typical connected state immediate mode reporting, where distinct and individual Measurement Reports separated by a certain periodicity are sent by the UE in the typical R16 framework. The proposed approach of multiple historical measurements is more efficient from the signaling perspective, especially when massive handovers are considered in a large cell. For additional signaling efficiency, in an embodiment of the disclosure, incremental measurements may be sent instead of absolute measurements. For example, the first measurement may be absolute but remaining (N−1) measurements may be incremental (i.e., relative to the first measurement).

For the Measurement Report associated with "Early Reporting Trigger," the UE starts making recording the first of the N measurements after a configured triggering condition is satisfied in an embodiment of the disclosure. In an embodiment of the disclosure, for the Measurement Report associated with "Regular Reporting Trigger," the UE reports last N measurements as soon as a configured triggering condition is satisfied. In an embodiment of the disclosure, the UE continues to record measurements with a target periodicity till after sending a Measurement Report for "Early Reporting Trigger" but may not report them until the condition of "Regular Reporting Trigger" occurs. In an embodiment of the disclosure, the gNB may provide a timer for resumption of measurement reporting. The UE then reports N or fewer measurement instances.

In operation F21S4, the UE sends a Measurement Report when the relevant triggering condition is satisfied. This report contains the reporting quantities along with historical measurements of selected quantities. Note that there would usually be two instances of the Measurement Report-one associated with Early Reporting Trigger" and one associated with and "Regular Reporting Trigger."

In operation F5S5 and F5S6, the source gNB and the target gNB exchange Handover Request and Handover Acknowledge messages. In particular, in an embodiment of the disclosure, the traditional handover is carried out, and, in another embodiment, conditional handover is carried out. In particular, "Early Reporting Trigger"-based Measurement Report can be used by the source gNB to contact multiple candidate gNBs to reserve handover resources when Conditional Handover (CHO) is implemented. Furthermore, in an embodiment of the disclosure, upon receiving the "Regular Reporting Trigger," the source gNB promptly sends a request to the selected Target gNB to confirm the radio resources and/or sends a request to the other gNBs (that are not selected for handover for the UE) to release radio resources.

The source gNB, in operation F21S7, sends a handover command to the UE in the RRC Reconfiguration message. The UE carries out the random access procedure in the target cell to complete the handover.

The main benefit of this feature is reliable and robust handover due to the following novel features.

Early Reporting per Selective Triggers. Certain triggers are more suitable to get an early indication of handover. Such report can be used to prepare for a conditional handover or can be used as the baseline comparison with measurements reported in regular reporting.

Targeted and Efficient Historical Reporting. This disclosure specifies a condition after which a history of specific measurements with a configurable periodicity is recorded and reported. This reduces unnecessary recording of measurements that can occur in a traditional periodical reporting configuration. Since multiple historical reports are in a single message, the signaling overhead per UE is reduced. Considering the massive number of UEs for which handover would need to be carried out, significant savings in the total signaling cost for all UEs in a given time period can be achieved, making more resources available for user traffic.

Predictive Handover. The history of measurements in the early reporting and/or regular reporting can be used to develop intelligent (e.g., AI-based) algorithms that can predict the measurements in future so that a handover can be made in advance before the propagation conditions deteriorate due to long propagation delays.

Flexibility and Efficient Signaling of Triggers. Since different triggers can be flexibly combined and since their combinations can be specified efficiently, the overall complexity of the message structure is low. For example, the number of events needed to specify multiple trigger combinations can be reduced if desired. Furthermore, considering the number of UEs needing such RRC configurations, the total signaling cost in the downlink is also reduced.

Facilitating the Reporting of the Historical Measurements

In the section titled "Trigger Classification," the following sequence was specified in an example implementation of the disclosure: (I) a Measurement Report associated with the "Early Reporting Trigger" sent by the UE, (II) a Measurement Report associated with the "Regular Reporting Trigger" sent by the UE, and (III) an RRC Reconfiguration message from the source gNB to the UE that carries a handover command.

In another embodiment of the disclosure, the "Early Reporting Trigger" specified by the gNB does not result in the UE sending a Measurement Report but results in the UE making and storing periodical measurements of configured quantities. This will reduce the amount of signaling and enable the UE to supply historical measurements to the gNB/eNB when a "Regular Reporting Trigger" condition is satisfied. In such case, a typical sequence would be as follows: (I) The UE starts recording historical measurements when the "Early Reporting Trigger" condition is satisfied. The UE does not send a Measurement Report when such condition is satisfied. (II) a Measurement Report associated with the "Regular Reporting Trigger" is sent by the UE, and (III) an RRC Reconfiguration message is sent from the source gNB to the UE that carries a handover command.

Explanations of the Combination Trigger Examples

Examples of combination triggers that combine two or more of standalone or individual triggers have been given in the section with the title "Combined Triggers for "Early Reporting Trigger" and "Regular Reporting Trigger." Several examples of standalone triggers specifically available in an NTN (e.g., elevation angle) were given in sections "Standalone Triggers—"Early Reporting Trigger" and "Standalone Triggers—"Early Reporting Trigger."

To summarize, the following concepts were specified earlier.

A. "To implement "Early Reporting Trigger" and/or "Regular Reporting Trigger," the standalone quantities such as signal measurement (e.g., RSRP, RSRQ, and SINR), time, timer, UE's distance from the center of the serving cell, UE's distance from the center of a neighbor cell, serving cell elevation angle, neighbor cell elevation angle, and signal strength difference can be combined in a flexible manner."

B. "To implement "Early Reporting Trigger," the existing Events A1 to A6 can also be used, where measurements such as RSRP, RSRQ, and SINR are used." And C. "To implement "Regular Reporting Trigger," the existing Events A1 to A6 can also be used, where measurements such as RSRP, RSRQ, and SINR are used."

In other words, an embodiment of the disclosure creates combination triggers by combing new NTN-specific quantities and the existing quantities of events A1 to A6 (i.e., RSRP, RSRQ, and/or SINR of the serving cell and neighboring cells).

As a background of the existing signal measurement-based standalone trigger from Release 16 (and prior releases), the formulation of "Event A4" is specified below (extracted from [TS38.331]). The "Event A4" is said to be "Neighbour becomes better than threshold."

Inequality A4-1 (Entering condition)

$$Mn+Ofn+Ocn-Hys>Thresh$$

Inequality A4-2 (Leaving condition)

$$Mn+Ofn+Ocn+Hys<Thresh$$

The variables in the formula are defined as follows:
Mn is the measurement result of the neighbouring cell, not taking into account any offsets.
Ofn is the measurement object specific offset of the neighbour cell (i.e., offsetMO as defined within measObjectNR corresponding to the neighbour cell).
Ocn is the measurement object specific offset of the neighbour cell (i.e., cellIndividualOffset as defined within measObjectNR corresponding to the neighbour cell), and set to zero if not configured for the neighbour cell.
Hys is the hysteresis parameter for this event (i.e., hysteresis as defined within reportConfigNR for this event).
Thresh is the threshold parameter for this event (i.e., a4-Threshold as defined within reportConfigNR for this event).
Mn is expressed in dBm in case of RSRP, or in dB in case of RSRQ and RS-SINR.
Ofn, Ocn, Hys are expressed in dB.
Thresh is expressed in the same unit as Mn.

As background, the formulation of "Event A3" is specified below (extracted from [TS38.331]). The "Event A3" is said to be "Neighbour becomes offset better than SpCell."

Inequality A3-1 (Entering condition)

$$Mn+Ofn+Ocn-Hys > Mp+Ofp+Ocp+Off$$

Inequality A3-2 (Leaving condition)

$$Mn+Ofn+Ocn+Hys < Mp+Ofp+Ocp+Off$$

The variables in the formula are defined as follows:
Mn is the measurement result of the neighbouring cell, not taking into account any offsets.
Ofn is the measurement object specific offset of the reference signal of the neighbour cell (i.e., offsetMO as defined within measObjectNR corresponding to the neighbour cell).
Ocn is the cell specific offset of the neighbour cell (i.e., cellIndividualOffset as defined within measObjectNR corresponding to the frequency of the neighbour cell), and set to zero if not configured for the neighbour cell.
Mp is the measurement result of the SpCell, not taking into account any offsets.
Ofp is the measurement object specific offset of the SpCell (i.e., offsetMO as defined within measObjectNR corresponding to the SpCell).
Ocp is the cell specific offset of the SpCell (i.e., cellIndividualOffset as defined within measObjectNR corresponding to the SpCell), and is set to zero if not configured for the SpCell.
Hys is the hysteresis parameter for this event (i.e., hysteresis as defined within reportConfigNR for this event).
Off is the offset parameter for this event (i.e., a3-Offset as defined within reportConfigNR for this event).
Mn, Mp are expressed in dBm in case of RSRP, or in dB in case of RSRQ and RS-SINR.
Ofn, Ocn, Ofp, Ocp, Hys, Off are expressed in dB.

As background, the formulation of "Event A5" is specified below (extracted from [TS38.331]). The "Event A5" is said to be "SpCell becomes worse than threshold) and neighbour becomes better than threshold2."

$$Mp+Hys < Thresh1 \quad \text{Inequality A5-1 (Entering condition 1)}$$

$$Mn+Ofn+Ocn-Hys > Thresh2 \quad \text{Inequality A5-2 (Entering condition 2)}$$

$$Mp-Hys > Thresh1 \quad \text{Inequality A5-3 (Leaving condition 1)}$$

$$Mn+Ofn+Ocn+Hys < Thresh2 \quad \text{Inequality A5-4 (Leaving condition 2)}$$

The variables in the formula are defined as follows:
Mp is the measurement result of the NR SpCell, not taking into account any offsets.
Mn is the measurement result of the neighbouring cell, not taking into account any offsets.
Ofn is the measurement object specific offset of the neighbour cell (i.e., offsetMO as defined within measObjectNR corresponding to the neighbour cell).
Ocn is the cell specific offset of the neighbour cell (i.e., cellIndividualOffset as defined within measObjectNR corresponding to the neighbour cell), and set to zero if not configured for the neighbour cell.
Hys is the hysteresis parameter for this event (i.e., hysteresis as defined within reportConfigNR for this event).
Thresh1 is the threshold parameter for this event (i.e., a5-Threshold1 as defined within reportConfigNR for this event).
Thresh2 is the threshold parameter for this event (i.e., a5-Threshold2 as defined within reportConfigNR for this event).
Mn, Mp are expressed in dBm in case of RSRP, or in dB in case of RSRQ and RS-SINR.
Ofn, Ocn, Hys are expressed in dB.
Thresh1 is expressed in the same unit as Mp.
Thresh2 is expressed in the same unit as Mn.

The individual triggers of "distance" and "Neighbor Cell Measurement" are combined to define an "Entering Condition" as Eq. (CT1-1) below in an example embodiment of the disclosure.

Inequality CT1-1 (Entering condition)

$$(\text{distance\_UE\_SevingCell}-\text{distance}Hyst > \text{distanceThresh}) \text{ AND } (Mn+Ofn+Ocn-Hys > \text{Thresh}) \quad \text{Eq. (CT1-1)}$$

Where distance_UE_SevingCell is the distance between the UE and the serving cell and distanceThresh is the distance threshold configured by the gNB, dystHyst is hysteresis distance (which can be set to 0 or skipped by the gNB). The distance can be the distance between (i) the UE and center of the serving cell, (ii) the UE and the platform of the serving cell (i.e., the service link distance), or (iii) the UE and the gNB. Mn, Ofn, Ocn, Hys, and Thresh are defined as specified above. For example, Mn can be neighbor cell RSRP.

The individual triggers of "distance" and "Neighbor Cell Measurement" are combined to define a "Leaving Condition" as Eq. (CT1-2) below in an example embodiment of the disclosure.

Inequality CT1-2 (Leaving condition)

$$(\text{distance\_UE\_SevingCell}+\text{distance}Hyst > \text{distanceThresh}) \text{ AND } (Mn+Ofn+Ocn+Hys < \text{Thresh}) \quad \text{Eq. (CT1-2)}$$

distanceHyst may be set to 0 in an example approach.

The individual triggers of "timer" and "Neighbor Cell Measurement" are combined to define an "Entering Condition" as Eq. (CT2-1) below in an example embodiment of the disclosure.

Inequality CT2-1 (Entering condition)

$$(\text{timeSinceLastHandover} > \text{timerThresh}) \text{ AND } (Mn+Ofn+Ocn-Hys > \text{Thresh}) \quad \text{Eq. (CT2-1)}$$

Where timeSinceLastHandover is the time elapsed since the last handover (e.g., the instant when the RRC Reconfiguration message carrying the handover command was received) and timerThresh is the timer threshold configured by the gNB. The distance can be the distance between (i) the UE and center of the serving cell, (ii) the UE and the platform of the serving cell (i.e., the service link distance), or (iii) the UE and the gNB. Mn, Ofn, Ocn, Hys, and Thresh are defined as specified above. For example, Mn can be neighbor cell RSRP.

Since time and timer are equivalent from the perspective of the final result, in another approach, in Eq. (CT2-1), the timeSinceLastHandover is replaced by an absolute time stamp (e.g., a time expressed as UTC, time expressed as one or more of the radio interface times such as HFN, FN, Slot, and symbol number, and hybrid of UTC and radio interface time) and timerThresh is replaced by timeThresh (that expresses an absolute time).

The individual triggers of "time" and "Neighbor Cell Measurement" are combined to define a "Leaving Condition" as Eq. (CT2-2) below in an example embodiment of the disclosure.

Inequality CT2-2 (Leaving condition)

(timeSinceLastHandover>timerThresh) AND ($Mn$+$Ofn$+$Ocn$+$Hys$<Thresh)      Eq.(CT2-2)

Since time and timer are equivalent from the perspective of the final result, in another approach, in Eq. (CT2-2), the timeSinceLastHandover is replaced by an absolute time stamp (e.g., a time expressed as UTC, time expressed as one or more of the radio interface times such as HFN, FN, Slot, and symbol number, and hybrid of UTC and radio interface time) and timerThresh is replaced by timeThresh (that expresses an absolute time).

The individual triggers of "distance" and "Neighbor and Serving Cell Measurement" (i.e., A3-like individual trigger) are combined to define an "Entering Condition" as Eq. (CT3-1) below in an example embodiment of the disclosure.

Inequality CT3-1 (Entering condition)

(distance_UE_SevingCell−distance$Hyst$>distanceThresh) AND ($Mn$+$Ofn$+$Ocn$−$Hys$>$Mp$+$Ofp$+$Ocp$+$Off$)      Eq. (CT3-1)

Where distance_UE_SevingCell is the distance between the UE and the serving cell and distanceThresh is the distance threshold configured by the gNB, dystHyst is hysteresis distance (which can be set to 0 or skipped by the gNB). The quantity "distance_UE_SevingCell" can be the distance between (i) the UE and center of the serving cell, (ii) the UE and the platform of the serving cell (i.e., the service link distance), or (iii) the UE and the gNB. The parameters in the second part of Eq. (CT3-1) are defined as specified above. For example, Mn can be neighbor cell RSRP.

The individual triggers of "distance" and "Neighbor and Serving Cell Measurement" are combined to define a "Leaving Condition" as Eq. (CT3-2) below in an example embodiment of the disclosure.

Inequality CT3-2 (Leaving condition)

(distance_UE_SevingCell+distance$Hyst$>distanceThresh) AND ($Mn$+$Ofn$+$Ocn$+$Hys$<$Mp$+$Ofp$+$Ocp$+$Off$)      Eq. (CT3-2)

The individual triggers of "timer" and "Relative Neighbor and Serving Cell Measurement" (Event A3-like measurement comparison) are combined to define an "Entering Condition" as Eq. (CT4-1) below in an example embodiment of the disclosure.

Inequality CT4-1 (Entering condition)

(timeSinceLastHandover>timerThresh) AND ($Mn$+$Ofn$+$Ocn$−$Hys$>$Mp$+$Ofp$+$Ocp$+$Off$)      Eq. (CT4-1)

Where timeSinceLastHandover is the time elapsed since the last handover (e.g., the instant when the RRC Reconfiguration message carrying the handover command was received) and timerThresh is the timer threshold configured by the gNB. The distance can be the distance between (i) the UE and center of the serving cell, (ii) the UE and the platform of the serving cell (i.e., the service link distance), or (iii) the UE and the gNB. Mn, Ofn, Ocn, Hys, and Thresh are defined as specified above. For example, Mn can be neighbor cell RSRP.

Since time and timer are equivalent from the perspective of the final result, in another approach, in Eq. (CT4-1), the timeSinceLastHandover is replaced by an absolute time stamp (e.g., a time expressed as UTC, time expressed as one or more of the radio interface times such as HFN, FN, Slot, and symbol number, and hybrid of UTC and radio interface time) and timerThresh is replaced by timeThresh (that expresses an absolute time).

The individual triggers of "time" and "Relative Neighbor and Serving Cell Measurement" (Event A3-like measurement comparison) are combined to define a "Leaving Condition" as Eq. (CT4-2) below in an example embodiment of the disclosure.

Inequality CT4-2 (Leaving condition)

(timeSinceLastHandover>timerThresh) AND ($Mn$+$Ofn$+$Ocn$+$Hys$<$Mp$+$Ofp$+$Ocp$+$Off$)      Eq. (CT4-2)

Since time and timer are equivalent from the perspective of the final result, in another approach, in Eq. (CT4-2), the timeSinceLastHandover is replaced by an absolute time stamp (e.g., a time expressed as UTC, time expressed as one or more of the radio interface times such as HFN, FN, Slot, and symbol number, and hybrid of UTC and radio interface time) and timerThresh is replaced by timeThresh (that expresses an absolute time).

The individual triggers of "distance" and "Absolute Neighbor and Serving Cell Measurements" (Event A5-like measurement comparison) are combined to define an "Entering Condition" as Eq. (CT5-1) below in an example embodiment of the disclosure.

Inequality CT5-1 (Entering condition)

(distance_UE_SevingCell+distance$Hyst$>distanceThresh) AND ($Mp$+$Hys$<Thresh1) AND ($Mn$+$Ofn$+$Ocn$−$Hys$>Thresh2)      Eq. (CT5-1)

Where distance_UE_SevingCell is the distance between the UE and the serving cell and distanceThresh is the distance threshold configured by the gNB, dystHyst is hysteresis distance (which can be set to 0 or skipped by the gNB). The quantity "distance_UE_SevingCell" can be the distance between (i) the UE and center of the serving cell, (ii) the UE and the platform of the serving cell (i.e., the service link distance), or (iii) the UE and the gNB. The parameters in the second part of Eq. (CT3-1) are defined as specified above.

Mn, Ofn, Ocn, Hys, Mp, Hys, Thresh1, and Thresh2 are defined as specified above. For example, Mn can be neighbor cell RSRP.

Inequality CT5-2 (Leaving condition)

$$(distance\_UE\_SevingCell + distanceHyst > distanceThresh) \text{ AND } (Mp - Hys > Thresh1) \text{ AND } (Mn + Ofn + Ocn + Hys < Thresh2) \quad \text{Eq. (CT5-2)}$$

The individual triggers of "timer" and "Absolute Neighbor and Serving Cell Measurements" (Event A5-like measurement comparison) are combined to define an "Entering Condition" as Eq. (CT6-1) below in an example embodiment of the disclosure.

Inequality CT6-1 (Entering condition)

$$(timeSinceLastHandover > timerThresh) \text{ AND } (Mp + Hys < Thresh1) \text{ AND } (Mn + Ofn + Ocn - Hys > Thresh2) \quad \text{Eq. (CT6-1)}$$

Where timeSinceLastHandover is the time elapsed since the last handover (e.g., the instant when the RRC Reconfiguration message carrying the handover command was received) and timerThresh is the timer threshold configured by the gNB. The distance can be the distance between (i) the UE and center of the serving cell, (ii) the UE and the platform of the serving cell (i.e., the service link distance), or (iii) the UE and the gNB. Mn, Ofn, Ocn, Hys, Mp, Hys, Thresh1, and Thresh2 are defined as specified above. For example, Mn can be neighbor cell RSRP.

Since time and timer are equivalent from the perspective of the final result, in another approach, in Eq. (CT6-1), the timeSinceLastHandover is replaced by an absolute time stamp (e.g., a time expressed as UTC, time expressed as one or more of the radio interface times such as HFN, FN, Slot, and symbol number, and hybrid of UTC and radio interface time) and timerThresh is replaced by timeThresh (that expresses an absolute time).

The individual triggers of "time" and "Absolute Neighbor and Serving Cell Measurements" (Event A5-like measurement comparison) are combined to define a "Leaving Condition" as Eq. (CT6-2) below in an example embodiment of the disclosure.

Inequality CT6-2 (Leaving condition)

$$(timeSinceLastHandover > timerThresh) \text{ AND } (Mp - Hys > Thresh1) \text{ AND } (Mn + Ofn + Ocn + Hys < Thresh2) \quad \text{Eq. (CT6-2)}$$

Mn, Ofn, Ocn, Hys, Mp, Hys, Thresh1, and Thresh2 are defined as specified above. For example, Mn can be neighbor cell RSRP.

Since time and timer are equivalent from the perspective of the final result, in another approach, in Eq. (CT6-2), the timeSinceLastHandover is replaced by an absolute time stamp (e.g., a time expressed as UTC, time expressed as one or more of the radio interface times such as HFN, FN, Slot, and symbol number, and hybrid of UTC and radio interface time) and timerThresh is replaced by timeThresh (that expresses an absolute time).

The "location-based trigger for the serving cell" and "Neighbor Cell Measurement" are combined to define an "Entering Condition" as Eq. (CT7-1) below in an example embodiment of the disclosure.

Inequality CT7-1 (Entering condition)

$$(\text{UE outside the Inner Area of the SevingCell}) \text{ AND } (Mn + Ofn + Ocn - Hys > Thresh) \quad \text{Eq. (CT7-1)}$$

In one example approach, the first part of the combination trigger condition is evaluated by the UE by considering an elliptical "Inner Area" of the serving cell. The UE estimates its GNSS-based position and utilizes the center, the major axis, and the minor axis of the Inner Area (IA) of the serving cell to determine if it is inside the Inner Area of the serving cell or not. In one example implementation, the specifics of the IA are conveyed to the UE by the gNB via dedicated signaling such as via an RRC Reconfiguration message. In another example implementation, the specifics of the IA are conveyed to the UE by the gNB via System Information.

In another example approach, a non-elliptical Inner Area is utilized.

Mn, Ofn, Ocn, Hys, and Thresh are defined as specified above. For example, Mn can be neighbor cell RSRP.

The "location-based trigger for the serving cell" and "Neighbor Cell Measurement" are combined to define a "Leaving Condition" as Eq. (CT7-2) below in an example embodiment of the disclosure.

Inequality CT7-2 (Leaving condition)

$$(\text{UE outside the Inner Area of the SevingCell}) \text{ AND } (Mn + Ofn + Ocn + Hys < Thresh) \quad \text{Eq. (CT7-2)}$$

The "location-based trigger for the serving cell" and "Neighbor and Serving Cell Measurement" (i.e., A3-like individual trigger) are combined to define an "Entering Condition" as Eq. (CT8-1) below in an example embodiment of the disclosure.

Inequality CT8-1 (Entering condition)

$$(\text{UE outside the Inner Area of the SevingCell}) \text{ AND } (Mn + Ofn + Ocn - Hys > Mp + Ofp + Ocp + Off) \quad \text{Eq. (CT8-1)}$$

In one example approach, the first part of the combination trigger condition is evaluated by the UE by considering an elliptical "Inner Area" of the serving cell. The UE estimates its GNSS-based position and utilizes the center, the major axis, and the minor axis of the Inner Area (IA) of the serving cell to determine if it is inside the Inner Area of the serving cell or not. In one example implementation, the specifics of the IA are conveyed to the UE by the gNB via dedicated signaling such as via an RRC Reconfiguration message. In another example implementation, the specifics of the IA are conveyed to the UE by the gNB via System Information.

In another example approach, a non-elliptical Inner Area is utilized.

The "location-based trigger for the serving cell" and "Neighbor and Serving Cell Measurement" (i.e., A3-like individual trigger) are combined to define a "Leaving Condition" as Eq. (CT8-2) below in an example embodiment of the disclosure.

Inequality CT8-2 (Leaving condition)

$$(\text{UE outside the Inner Area of the SevingCell}) \text{ AND } (Mn + Ofn + Ocn - Hys > Mp + Ofp + Ocp + Off) \quad \text{Eq. (CT8-2)}$$

The "location-based trigger for the serving cell" and "Absolute Neighbor and Serving Cell Measurements" (Event A5-like measurement comparison) are combined to define an "Entering Condition" as Eq. (CT9-1) below in an example embodiment of the disclosure.

Inequality CT9-1 (Entering condition)

$$(\text{UE outside the Inner Area of the SevingCell}) \text{ AND } (Mp + Hys < Thresh1) \text{ AND } (Mn + Ofn + Ocn - Hys > Thresh2) \quad \text{Eq. (CT9-1)}$$

In one example approach, the first part of the combination trigger condition is evaluated by the UE by considering an elliptical "Inner Area" of the serving cell. The UE estimates its GNSS-based position and utilizes the center, the major axis, and the minor axis of the Inner Area (IA) of the serving cell to determine if it is inside the Inner Area of the serving cell or not. In one example implementation, the specifics of the IA are conveyed to the UE by the gNB via dedicated signaling such as via an RRC Reconfiguration message. In another example implementation, the specifics of the IA are conveyed to the UE by the gNB via System Information.

In another example approach, a non-elliptical Inner Area is utilized.

The "location-based trigger for the serving cell" and "Absolute Neighbor and Serving Cell Measurements" (Event A5-like measurement comparison) are combined to define a "Leaving Condition" as Eq. (CT9-2) below in an example embodiment of the disclosure.

Inequality CT9-2 (Leaving condition)

(UE outside the Inner Area of the SevingCell) AND
($Mp-Hys$>Thresh1) AND ($Mn+Ofn+Ocn+Hys$<Thresh2)   Eq. (CT9-2)

The "location-based trigger for the neighbor cell" and "Neighbor Cell Measurement" are combined to define an "Entering Condition" as Eq. (CT10-1) below in an example embodiment of the disclosure.

Inequality CT10-1 (Entering condition)

(UE inside the Area of the Neighbor Cell) AND
($Mn+Ofn+Ocn-Hys$>Thresh)   Eq. (CT10-1)

In one example approach, the first part of the combination trigger condition is evaluated by the UE by considering an elliptical target area (ETA) of the neighbor cell. The UE estimates its GNSS-based position and utilizes the center, the major axis, and the minor axis of the ETA of the neighbor cell to determine if it is inside the ETA of the neighbor cell or not. In one example implementation, the specifics of the ETA are conveyed to the UE by the gNB via dedicated signaling such as via an RRC Reconfiguration message. In another example implementation, the specifics of the ETA are conveyed to the UE by the gNB via System Information.

In another example approach, a non-elliptical target area is utilized for the neighbor cell.

Mn, Ofn, Ocn, Hys, and Thresh are defined as specified above. For example, Mn can be neighbor cell RSRP.

The "location-based trigger for the neighbor cell" and "Neighbor Cell Measurement" are combined to define a "Leaving Condition" as Eq. (CT10-2) below in an example embodiment of the disclosure.

Inequality CT10-2 (Leaving condition)

(UE inside the Area of the Neighbor Cell) AND
($Mn+Ofn+Ocn+Hys$<Thresh)   Eq. (CT10-2)

The "location-based trigger for the neighbor cell" and "Neighbor and Serving Cell Measurement" (i.e., A3-like individual trigger) are combined to define an "Entering Condition" as Eq. (CT11-1) below in an example embodiment of the disclosure.

Inequality CT11-1 (Entering condition)

(UE inside the Area of the Neighbor Cell) AND
($Mn+Ofn+Ocn-Hys$>$Mp+Ofp+Ocp+Off$)   Eq. (CT11-1)

In one example approach, the first part of the combination trigger condition is evaluated by the UE by considering an elliptical target area (ETA) of the neighbor cell. The UE estimates its GNSS-based position and utilizes the center, the major axis, and the minor axis of the ETA of the neighbor cell to determine if it is inside the ETA of the neighbor cell or not. In one example implementation, the specifics of the ETA are conveyed to the UE by the gNB via dedicated signaling such as via an RRC Reconfiguration message. In another example implementation, the specifics of the ETA are conveyed to the UE by the gNB via System Information.

In another example approach, a non-elliptical target area is utilized for the neighbor cell.

The "location-based trigger for the neighbor cell" and "Neighbor and Serving Cell Measurement" (i.e., A3-like individual trigger) are combined to define a "Leaving Condition" as Eq. (CT11-2) below in an example embodiment of the disclosure.

Inequality CT11-2 (Leaving condition)

(UE inside the Area of the Neighbor Cell) AND
($Mn+Ofn+Ocn-Hys$>$Mp+Ofp+Ocp+Off$)   Eq. (CT11-2)

The "location-based trigger for the neighbor cell" and "Absolute Neighbor and Serving Cell Measurements" (Event A5-like measurement comparison) are combined to define an "Entering Condition" as Eq. (CT12-1) below in an example embodiment of the disclosure.

Inequality CT12-1 (Entering condition)

(UE inside the Area of the Neighbor Cell) AND
($Mp+Hys$<Thresh1) AND ($Mn+Ofn+Ocn-Hys$>Thresh2)   Eq. (CT12-1)

In one example approach, the first part of the combination trigger condition is evaluated by the UE by considering an elliptical target area (ETA) of the neighbor cell. The UE estimates its GNSS-based position and utilizes the center, the major axis, and the minor axis of the ETA of the neighbor cell to determine if it is inside the ETA of the neighbor cell or not. In one example implementation, the specifics of the ETA are conveyed to the UE by the gNB via dedicated signaling such as via an RRC Reconfiguration message. In another example implementation, the specifics of the ETA are conveyed to the UE by the gNB via System Information.

In another example approach, a non-elliptical target area is utilized for the neighbor cell.

The "location-based trigger for the serving cell" and "Absolute Neighbor and Serving Cell Measurements" (Event A5-like measurement comparison) are combined to define a "Leaving Condition" as Eq. (CT12-2) below in an example embodiment of the disclosure.

Inequality CT12-2 (Leaving condition)

(UE outside the Inner Area of the SevingCell) AND
($Mp-Hys$>Thresh1) AND ($Mn+Ofn+Ocn+Hys$<Thresh2)   Eq. (CT12-2)

The "timer-based trigger," "location-based trigger for the neighbor cell" and "Neighbor Cell Measurement" are combined to define an "Entering Condition" as Eq. (CT13-1) below in an example embodiment of the disclosure.

Inequality CT13-1 (Entering condition)

(timeSinceLastHandover>timerThresh) AND (UE inside the Area of the Neighbor Cell) AND
($Mn+Ofn+Ocn-Hys$>Thresh)   Eq. (CT13-1)

In one example approach, the first part of the combination trigger condition is evaluated by the UE by considering an elliptical target area (ETA) of the neighbor cell. The UE estimates its GNSS-based position and utilizes the center, the major axis, and the minor axis of the ETA of the neighbor cell to determine if it is inside the ETA of the neighbor cell or not. In one example implementation, the specifics of the ETA are conveyed to the UE by the gNB via dedicated signaling such as via an RRC Reconfiguration message. In another example implementation, the specifics of the ETA are conveyed to the UE by the gNB via System Information.

In another example approach, a non-elliptical target area is utilized for the neighbor cell.

Mn, Ofn, Ocn, Hys, and Thresh are defined as specified above. For example, Mn can be neighbor cell RSRP.

The "timer-based trigger," "location-based trigger for the neighbor cell" and "Neighbor Cell Measurement" are combined to define a "Leaving Condition" as Eq. (CT13-2) below in an example embodiment of the disclosure.

Inequality CT13-2 (Leaving condition)

(timeSinceLastHandover>timerThresh) AND (UE inside the Area of the Neighbor Cell) AND ($Mn+Ofn+Ocn+Hys$<Thresh)  Eq. (CT13-2)

The "timer-based trigger," "location-based trigger for the neighbor cell" and "Neighbor and Serving Cell Measurement" (i.e., A3-like individual trigger) are combined to define an "Entering Condition" as Eq. (CT14-1) below in an example embodiment of the disclosure.

Inequality CT14-1 (Entering condition)

(timeSinceLastHandover>timerThresh) AND (UE inside the Area of the Neighbor Cell) AND ($Mn+Ofn+Ocn-Hys$>$Mp+Ofp+Ocp+Off$)  Eq. (CT14-1)

In one example approach, the first part of the combination trigger condition is evaluated by the UE by considering an elliptical target area (ETA) of the neighbor cell. The UE estimates its GNSS-based position and utilizes the center, the major axis, and the minor axis of the ETA of the neighbor cell to determine if it is inside the ETA of the neighbor cell or not. In one example implementation, the specifics of the ETA are conveyed to the UE by the gNB via dedicated signaling such as via an RRC Reconfiguration message. In another example implementation, the specifics of the ETA are conveyed to the UE by the gNB via System Information.

In another example approach, a non-elliptical target area is utilized for the neighbor cell.

The "timer-based trigger," "location-based trigger for the neighbor cell" and "Neighbor and Serving Cell Measurement" (i.e., A3-like individual trigger) are combined to define a "Leaving Condition" as Eq. (CT14-2) below in an example embodiment of the disclosure.

Inequality CT14-2 (Leaving condition)

(timeSinceLastHandover>timerThresh) AND (UE inside the Area of the Neighbor Cell) AND ($Mn+Ofn+Ocn-Hys$>$Mp+Ofp+Ocp+Off$)  Eq. (CT14-2)

The "timer-based trigger," "location-based trigger for the neighbor cell" and "Absolute Neighbor and Serving Cell Measurements" (Event A5-like measurement comparison) are combined to define an "Entering Condition" as Eq. (CT15-1) below in an example embodiment of the disclosure.

Inequality CT15-1 (Entering condition)

(timeSinceLastHandover>timerThresh) AND (UE inside the Area of the Neighbor Cell) AND ($Mp+Hys$<Thresh1) AND ($Mn+Ofn+Ocn-Hys$>Thresh2) Eq.(CT15-1)

In one example approach, the first part of the combination trigger condition is evaluated by the UE by considering an elliptical target area (ETA) of the neighbor cell. The UE estimates its GNSS-based position and utilizes the center, the major axis, and the minor axis of the ETA of the neighbor cell to determine if it is inside the ETA of the neighbor cell or not. In one example implementation, the specifics of the ETA are conveyed to the UE by the gNB via dedicated signaling such as via an RRC Reconfiguration message. In another example implementation, the specifics of the ETA are conveyed to the UE by the gNB via System Information.

In another example approach, a non-elliptical target area is utilized for the neighbor cell.

The "timer-based trigger," "location-based trigger for the serving cell" and "Absolute Neighbor and Serving Cell Measurements" (Event A5-like measurement comparison) are combined to define a "Leaving Condition" as Eq. (CT15-2) below in an example embodiment of the disclosure.

Inequality CT15-2 (Leaving condition)

(timeSinceLastHandover>timerThresh) AND (UE outside the Inner Area of the SevingCell) AND ($Mp-Hys$>Thresh1) AND ($Mn+Ofn+Ocn+Hys$<Thresh2)  Eq. (CT15-2)

For traditional handover measurement reporting and CHO measurement reporting, the individual components of the combination triggers are evaluated simultaneously (i.e., at a given instant) in an example embodiment of the disclosure.

While evaluating a CHO execution condition:
1. In an example approach, the individual components of the combination triggers are evaluated simultaneously (i.e., at a given instant).
2. In another approach, the individual components of the combination triggers are evaluated in sequence at different instants. For example, a non-signal measurement based trigger (e.g., distance, location, and timer) is evaluated first. After such non-signal measurement based trigger condition is satisfied first, a signal measurement based trigger (e.g., serving and/or neighbor cell measurement triggers) is evaluated next. When the signal measurement trigger condition is satisfied, the UE selects the related neighbor cell as the handover target cell and initiate a procedure (e.g., a random access procedure) to establish the connection with such target cell.

In an embodiment of the disclosure, in the combination triggers specified in Eq. (CT1) through CT15 above, an NTN platform movement-based offset can be added such that an incoming cell is encouraged and an outgoing cell is discouraged.

In an embodiment of the disclosure, the handover between two NTY types (e.g., LEO and GEO) is treated like intra-RAT handover and not like inter-RAT handover.

Figure 22:
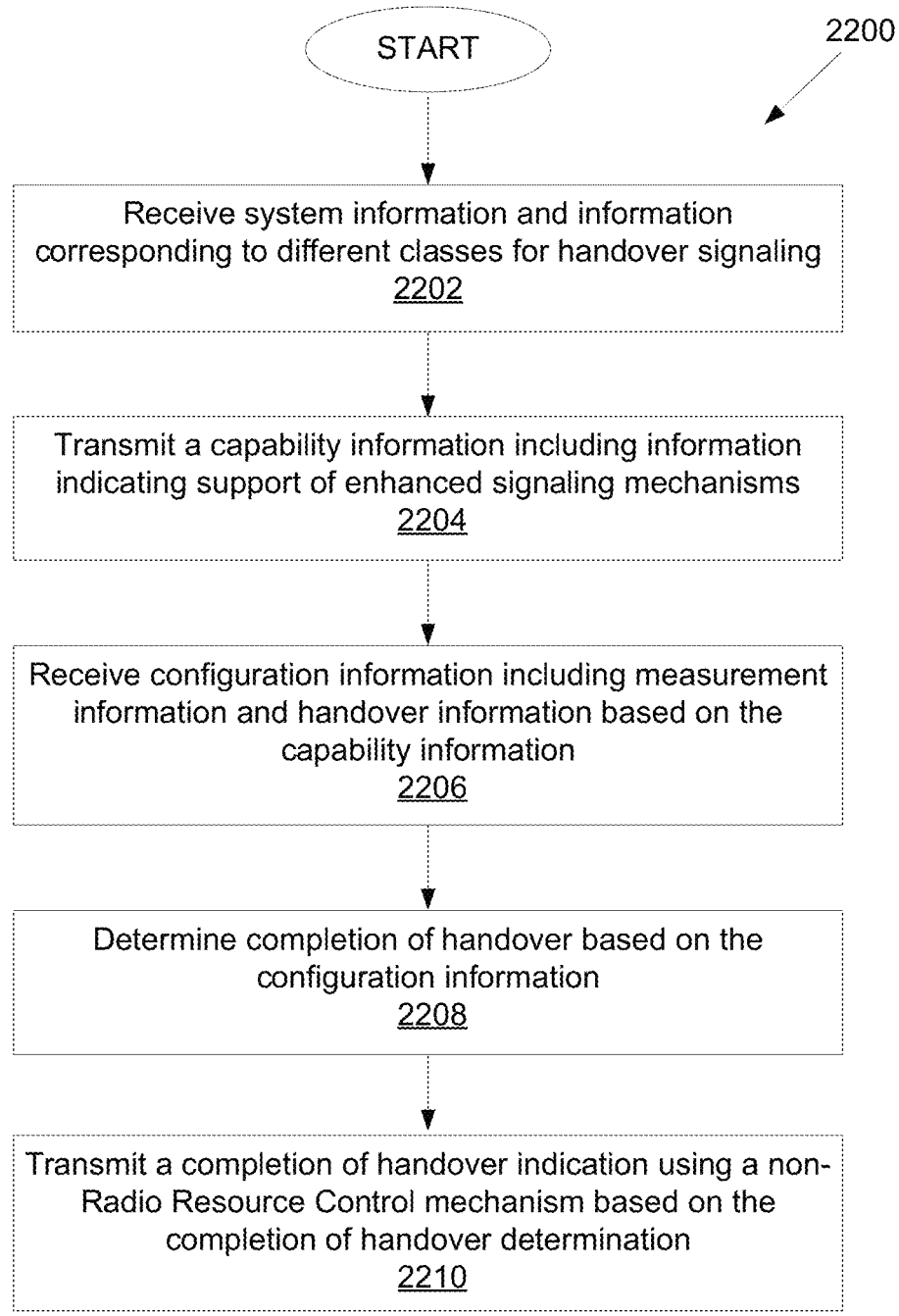
FIG. 22 illustrates a flow chart of a method for operating a user equipment (UE) according to embodiments of the present disclosure.

FIG. 22 illustrates a flow chart of a method 2200 for operating a user equipment (UE), as may be performed by a UE such as UE 116, according to embodiments of the present disclosure. The embodiment of the method 2200 illustrated in FIG. 22 is for illustration only. FIG. 22 does not limit the scope of this disclosure to any particular implementation.

As illustrated in FIG. 22, the method 2200 begins at operation 2202. In operation 2202, the UE (e.g., 111-116 as illustrated in FIG. 1) receives system information and information corresponding to different classes for handover signaling.

In operation 2204, the UE transmits a capability information including information indicating support of enhanced signaling mechanisms.

In operation 2206, the UE receives configuration information including measurement information and handover information based on the capability information.

In operation 2208, the UE determines completion of handover based on the configuration information.

In operation 2210, the UE transmits a completion of handover indication using a non-Radio Resource Control mechanism based on the completion of handover determination.

In one embodiment, the information corresponding to different classes for handover signaling comprises at least one of information indicating a cell class, information indicating a group class, and information indicating a UE class.

In one embodiment, information that is applicable to all UEs in a cell is classified into the cell class; information that is applicable to all UEs of a group is classified into the group class; and information that is UE-specific is classified into the UE class.

In one embodiment, a group type of UEs of the group class is based on: quality of service (QoS) characteristics; radio link control/medium access control (RLC/MAC); or information applicable to a neighbor cell.

In one embodiment, the enhanced signaling mechanisms comprise at least one of: time intervals shorter than 80 ms or 160 ms; a flexible number of repetitions; and support for transmission time interval (TTI) bundling.

In one embodiment, the enhanced signaling mechanisms comprise groupcast/multicast signaling for handover, wherein the groupcast/multicast signaling comprises a message that is not intended for all UEs in a cell; and the UE is part of one or more groups at a given time, and a given group is associated with one or more Radio Network Temporary Identifiers In one embodiment, multiple UEs share a same radio time-frequency resource for an uplink transmission of the completion of handover indication.

In one embodiment, the system information further includes information regarding a center, a minor axis or a semi-minor axis, and a major axis or a semi-major axis, of an inner area of a serving cell; the processor is further configured to determine, based on the system information, whether the UE is within the inner area of the serving cell; and when the UE is outside the inner area of the serving cell and when a reference signal quantity from a neighbor cell satisfies a threshold value, the processor is configured to transmit a measurement report and subsequently receive a handover command.

Figure 23:
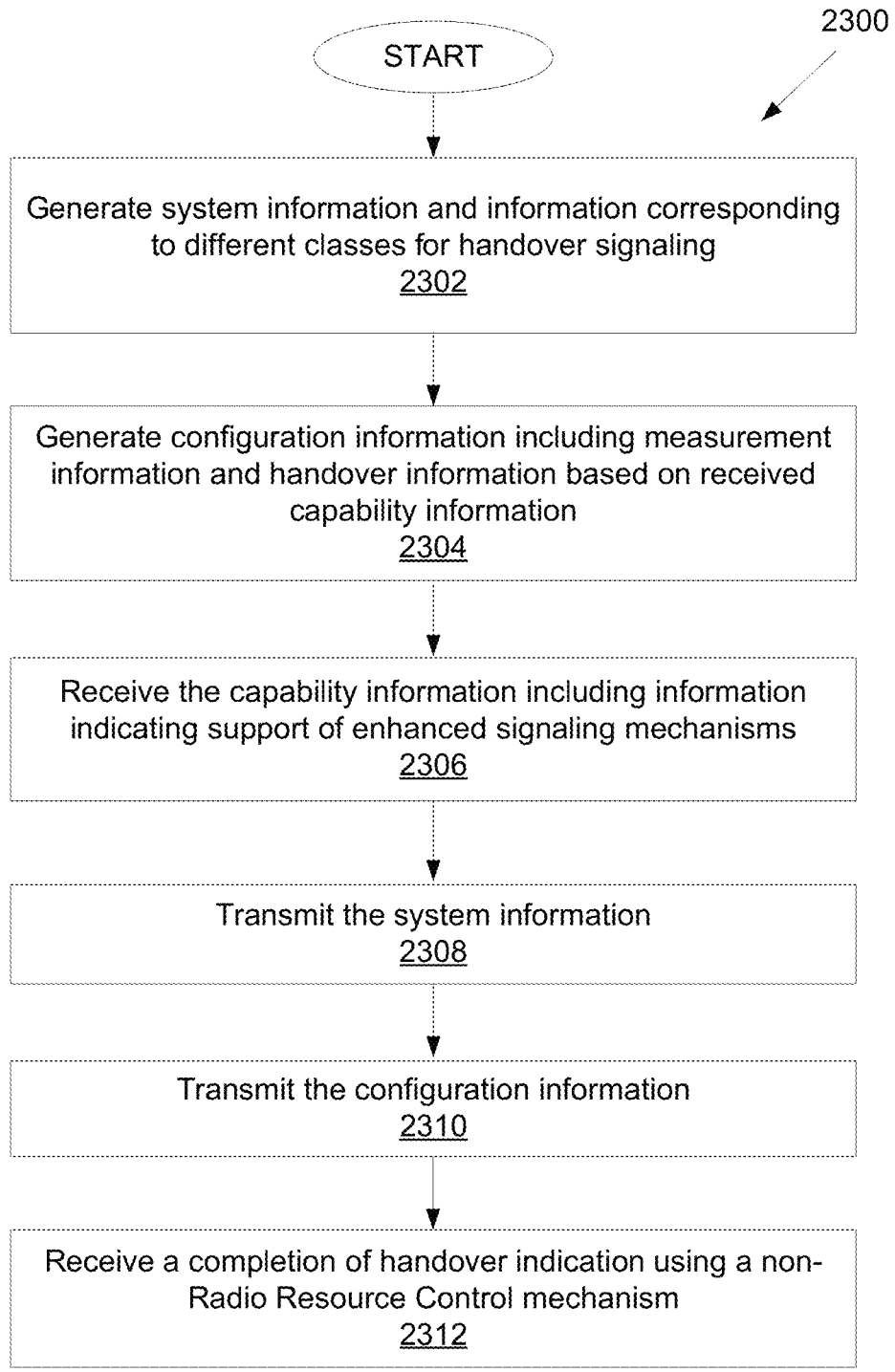
FIG. 23 illustrates a flow chart of another method as may be performed by a BS, according to embodiments of the present disclosure.

FIG. 23 illustrates a flow chart of another method 2300, as may be performed by a base station (BS) such as BS 102, according to embodiments of the present disclosure. The embodiment of the method 2300 illustrated in FIG. 23 is for illustration only. FIG. 23 does not limit the scope of this disclosure to any particular implementation.

As illustrated in FIG. 23, the method 2300 begins at operation 2302. In operation 2302, the BS (e.g., 101-103 as illustrated in FIG. 1) generates system information and information corresponding to different classes for handover signaling.

In operation 2304, the BS generates configuration information including measurement information and handover information based on received capability information.

In operation 2306, the BS receives the capability information including information indicating support of enhanced signaling mechanisms.

In operation 2308, the BS transmits the system information.

In operation 2310, the BS transmits the configuration information.

In operation 2312, the BS receives a completion of handover indication using a non-Radio Resource Control mechanism.

In one embodiment, the information corresponding to different classes for handover signaling comprises at least one of information indicating a cell class, information indicating a group class, and information indicating a user equipment (UE) class.

In one embodiment, information that is applicable to all UEs in a cell is classified into the cell class; information that is applicable to all UEs of a group is classified into the group class; and information that is UE-specific is classified into the UE class.

In one embodiment, a group type of UEs of the group class is based on: quality of service (QoS) characteristics; radio link control/medium access control (RLC/MAC); or information applicable to a neighbor cell.

In one embodiment, the enhanced signaling mechanisms comprise at least one of: time intervals shorter than 80 ms or 160 ms; a flexible number of repetitions; and support for transmission time interval (TTI) bundling.

In one embodiment, the enhanced signaling mechanisms comprise groupcast/multicast signaling for handover, wherein the groupcast/multicast signaling comprises a message that is not intended for all user equipment (UE) in a cell; and a UE is part of one or more groups at a given time, and a given group is associated with one or more Radio Network Temporary Identifiers.

In one embodiment, the system information further includes information regarding a center, a minor axis or a semi-minor axis, and a major axis or a semi-major axis, of an inner area of a serving cell; and when an indication is received that a user equipment (UE) is outside the inner area of the serving cell and when a reference signal quantity from a neighbor cell satisfies a threshold value, the transceiver is configured to receive a measurement report and subsequently transmit a handover command.

The above flowcharts illustrate example methods that can be implemented in accordance with the principles of the present disclosure and various changes could be made to the methods illustrated in the flowcharts herein. For example, while shown as a series of operations, various operations in each figure could overlap, occur in parallel, occur in a different order, or occur multiple times. In another example, operations may be omitted or replaced by other operations.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, operation, or function is an essential element that must be included in the claims scope. The scope of patented subject matter is defined by the claims.

What is claimed is:
1. A user equipment (UE), comprising:
a transceiver configured to:
transmit a capability information including information indicating support for different classes for handover signaling;

receive system information and information corresponding to the different classes for handover signaling; and
receive configuration information including handover information based on the capability information; and
a processor operably coupled to the transceiver, the processor configured to determine completion of handover based on the configuration information;
wherein the transceiver is further configured to transmit a completion of handover indication based on the completion of handover determination, and
wherein the information corresponding to different classes for handover signaling comprises at least one of information indicating a cell class, information indicating a group class, and information indicating a UE class.

2. The UE of claim 1, wherein:
information that is applicable to all UEs in a cell is classified into the cell class;
information that is applicable to all UEs of a group is classified into the group class; and
information that is UE-specific is classified into the UE class.

3. The UE of claim 2, wherein a group type of UEs of the group class is based on:
quality of service (QoS) characteristics;
radio link control/medium access control (RLC/MAC); or
information applicable to a neighbor cell.

4. The UE of claim 1, wherein the information corresponding to different classes for handover signaling comprises at least one of:
time intervals shorter than 80 ms or 160 ms;
a flexible number of repetitions; and
support for transmission time interval (TTI) bundling.

5. The UE of claim 1, wherein:
the information corresponding to different classes for handover signaling comprises groupcast/multicast signaling for handover, wherein the groupcast/multicast signaling comprises a message that is not intended for all UEs in a cell; and
the UE is part of one or more groups at a given time, and a given group is associated with one or more Radio Network Temporary Identifiers.

6. The UE of claim 1, wherein multiple UEs share a same radio time-frequency resource for an uplink transmission of the completion of handover indication.

7. The UE of claim 1, wherein:
the system information further includes information regarding a center, a minor axis or a semi-minor axis, and a major axis or a semi-major axis, of an inner area of a serving cell;
the processor is further configured to determine, based on the system information, whether the UE is within the inner area of the serving cell; and
when the UE is outside the inner area of the serving cell and when a reference signal quantity from a neighbor cell satisfies a threshold value, the processor is configured to transmit a measurement report and subsequently receive a handover command.

8. A base station (BS) comprising:
a processor configured to:
generate system information and information corresponding to different classes for handover signaling; and
generate configuration information including handover information based on received capability information; and
a transceiver operably coupled to the transceiver, the transceiver configured to:
receive the capability information including information indicating support for the different classes for handover signaling;
transmit the system information;
transmit the configuration information; and
receive a completion of handover indication,
wherein the information corresponding to different classes for handover signaling comprises at least one of information indicating a cell class, information indicating a group class, and information indicating a UE class.

9. The BS of claim 8, wherein:
information that is applicable to all UEs in a cell is classified into the cell class;
information that is applicable to all UEs of a group is classified into the group class; and
information that is UE-specific is classified into the UE class.

10. The BS of claim 9, wherein a group type of UEs of the group class is based on:
quality of service (QoS) characteristics;
radio link control/medium access control (RLC/MAC); or
information applicable to a neighbor cell.

11. The BS of claim 8, wherein the information corresponding to different classes for handover signaling comprises at least one of:
time intervals shorter than 80 ms or 160 ms;
a flexible number of repetitions; and
support for transmission time interval (TTI) bundling.

12. The BS of claim 8, wherein:
the information corresponding to different classes for handover signaling comprises groupcast/multicast signaling for handover, wherein the groupcast/multicast signaling comprises a message that is not intended for all user equipment (UE) in a cell; and
a UE is part of one or more groups at a given time, and a given group is associated with one or more Radio Network Temporary Identifiers.

13. The BS of claim 8, wherein:
the system information further includes information regarding a center, a minor axis or a semi-minor axis, and a major axis or a semi-major axis, of an inner area of a serving cell; and
when an indication is received that a user equipment (UE) is outside the inner area of the serving cell and when a reference signal quantity from a neighbor cell satisfies a threshold value, the transceiver is configured to receive a measurement report and subsequently transmit a handover command.

14. A method for operating a user equipment (UE), the method comprising:
transmitting a capability information including information indicating support for different classes for handover signaling;
receiving system information and information corresponding to the different classes for handover signaling;
receiving configuration information including handover information based on the capability information;
determining completion of handover based on the configuration information; and
transmitting a completion of handover indication based on the completion of handover determination,
wherein the information corresponding to different classes for handover signaling comprises at least one of information indicating a cell class, information indicating a group class, and information indicating a UE class.

15. The method of claim 14, wherein:

information that is applicable to all UEs in a cell is classified into the cell class;

information that is applicable to all UEs of a group is classified into the group class; and information that is UE-specific is classified into the UE class.

16. The method of claim 15, wherein a group type of UEs of the group class is based on:

quality of service (QoS) characteristics;

radio link control/medium access control (RLC/MAC); or information applicable to a neighbor cell.

17. The method of claim 14, wherein the information corresponding to different classes for handover signaling comprises at least one of:

time intervals shorter than 80 ms or 160 ms;

a flexible number of repetitions; and support for transmission time interval (TTI) bundling.

\* \* \* \* \*

UNITED STATES PATENT AND TRADEMARK OFFICE
CERTIFICATE OF CORRECTION

PATENT NO. : 11,838,807 B2
APPLICATION NO. : 17/394277
DATED : December 5, 2023
INVENTOR(S) : Tripathi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 161 days.

Signed and Sealed this
First Day of July, 2025

Coke Morgan Stewart
*Acting Director of the United States Patent and Trademark Office*